(12) United States Patent
Nakagawa et al.

(10) Patent No.: US 9,177,527 B2
(45) Date of Patent: Nov. 3, 2015

(54) MULTI-PRIMARY COLOR DISPLAY DEVICE

(75) Inventors: Shinji Nakagawa, Osaka (JP);
Kazuyoshi Yoshiyama, Osaka (JP);
Hiroyuki Furukawa, Osaka (JP);
Naoko Kondoh, Osaka (JP); Yasuhiro Yoshida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 171 days.

(21) Appl. No.: 14/232,133

(22) PCT Filed: Jul. 12, 2012

(86) PCT No.: PCT/JP2012/067838
§ 371 (c)(1),
(2), (4) Date: Jan. 10, 2014

(87) PCT Pub. No.: WO2013/008887
PCT Pub. Date: Jan. 17, 2013

(65) Prior Publication Data
US 2014/0152714 A1 Jun. 5, 2014

(30) Foreign Application Priority Data
Jul. 13, 2011 (JP) .................................. 2011-154404

(51) Int. Cl.
*G09G 5/10* (2006.01)
*G09G 5/02* (2006.01)
(Continued)

(52) U.S. Cl.
CPC ............... *G09G 5/02* (2013.01); *G09G 3/2003* (2013.01); *G09G 3/3607* (2013.01); *G09G 3/3648* (2013.01); *H04N 9/67* (2013.01);
(Continued)

(58) Field of Classification Search
None
See application file for complete search history.

(56) References Cited

U.S. PATENT DOCUMENTS

| 2007/0268208 A1 | 11/2007 | Okada et al. |
| 2008/0043045 A1* | 2/2008 | Natori .................... G09F 9/33 345/690 |

(Continued)

FOREIGN PATENT DOCUMENTS

| JP | 2001-169306 A | 6/2001 |
| JP | 2005-326437 A | 11/2005 |

(Continued)

OTHER PUBLICATIONS

English translation of Official Communication issued in corresponding International Application PCT/JP2012/067838, mailed on Jan. 23, 2014.

(Continued)

*Primary Examiner* — Grant Sitta
*Assistant Examiner* — Kirk Hermann
(74) *Attorney, Agent, or Firm* — Keating & Bennett, LLP

(57) ABSTRACT

A multiple primary color display device includes a plurality of pixels located in a matrix including a plurality of rows and columns. The pixels are each formed of at least four sub pixels for displaying different primary colors, which can be sorted into n number of virtual pixels, and use each of the n number of virtual pixels as a minimum color display unit for providing display. The sub pixels which form each of the virtual pixels include a sub pixel common to another of the virtual pixels. When a line having a width corresponding to the n number of virtual pixels is displayed, two sub pixels which are located at both of two ends, in a width direction, of the line and display a certain identical primary color to each other have a luminance lower than the original luminance that the two sub pixels.

14 Claims, 39 Drawing Sheets

(51) Int. Cl.
*H04N 9/67* (2006.01)
*G09G 3/36* (2006.01)
*G09G 3/20* (2006.01)

(52) U.S. Cl.
CPC .................. *G09G2300/0452* (2013.01); *G09G 2340/0457* (2013.01); *G09G 2340/06* (2013.01)

(56) References Cited

U.S. PATENT DOCUMENTS

| 2008/0252558 | A1* | 10/2008 | Kim ..................... G09G 3/2003 345/55 |
| 2009/0167657 | A1 | 7/2009 | Tomizawa |
| 2009/0232395 | A1 | 9/2009 | Sumiya et al. |
| 2010/0053235 | A1 | 3/2010 | Tomizawa et al. |

FOREIGN PATENT DOCUMENTS

| JP | 2007-086577 A | 4/2007 |
| WO | 2006/018926 A1 | 2/2006 |
| WO | 2007/097080 A1 | 8/2007 |
| WO | 2008/065935 A1 | 6/2008 |

OTHER PUBLICATIONS

Official Communication issued in International Patent Application No. PCT/JP2012/067838, mailed on Oct. 16, 2012.
Pointer, "The Gamut of Real Surface Colours", Color Research and Application, vol. 5, No. 3, Fall 1980, pp. 145-155.

* cited by examiner

FIG.14

| | | | | | | | | | | | | |
|---|---|---|---|---|---|---|---|---|---|---|---|---|
| LOW RANGE COMPONENT | L(2n−2,4) | L(2n−2,5) | L(2n−2,6) | L(2n,1) | L(2n,2) | L(2n,3) | L(2n,4) | L(2n,5) | L(2n,6) | L(2n+2,1) | L(2n+2,2) | L(2n+2,3) |
| | L(2n−1,4) | L(2n−1,5) | L(2n−1,6) | L(2n−1,1) | L(2n−1,2) | L(2n−1,3) | L(2n+1,4) | L(2n+1,5) | L(2n+1,6) | L(2n+1,1) | L(2n+1,2) | L(2n+1,3) |
| HIGH RANGE COMPONENT | H(2n−2) | | | | | | H(2n) | | | H(2n+2) | | |
| | | | | H(2n−1) | | | | | | H(2n+1) | | |
| PIXEL VALUE | P(2n−2,4) | P(2n−2,5) | P(2n−2,6) | P(2n,1) | P(2n,2) | P(2n,3) | P(2n,4) | P(2n,5) | P(2n,6) | P(2n+2,1) | P(2n+2,2) | P(2n+2,3) |
| | P(2n−1,4) | P(2n−1,5) | P(2n−1,6) | P(2n−1,1) | P(2n−1,2) | P(2n−1,3) | P(2n+1,4) | P(2n+1,5) | P(2n+1,6) | P(2n+1,1) | P(2n+1,2) | P(2n+1,3) |
| 1ST VIRTUAL PIXEL WEIGHT | W(1,4) | W(1,5) | W(1,6) | W(1,1) | W(1,2) | W(1,3) | W(1,4) | W(1,5) | W(1,6) | W(1,1) | W(1,2) | W(1,3) |
| 2ND VIRTUAL PIXEL WEIGHT | W(2,4) | W(2,5) | W(2,6) | W(2,1) | W(2,2) | W(2,3) | W(2,4) | W(2,5) | W(2,6) | W(2,1) | W(2,2) | W(2,3) |
| VIRTUAL PIXEL RENDERING RESULT | V(n−1,4) | V(n−1,5) | V(n−1,6) | V(n,1) | V(n,2) | V(n,3) | V(n,4) | V(n,5) | V(n,6) | V(n+1,1) | V(n+1,2) | V(n+1,3) |

FIG.15

| PIXEL VALUE | $P(2n,1)$ $P(2n-1,1)$ | $P(2n,2)$ $P(2n-1,2)$ | $P(2n,3)$ $P(2n-1,3)$ | $P(2n,4)$ $P(2n+1,4)$ | $P(2n,5)$ $P(2n+1,5)$ | $P(2n,6)$ $P(2n+1,6)$ |
|---|---|---|---|---|---|---|
| 1ST VIRTUAL PIXEL WEIGHT | 0 | 0.5 | 1 | 1 | 0.5 | 0 |
| 2ND VIRTUAL PIXEL WEIGHT | 1 | 0.5 | 0 | 0 | 0.5 | 1 |
| VIRTUAL PIXEL RENDERING RESULT | $V(n,1)$ $= P(2n-1,1)$ | $V(n,2)$ $= [P(2n-1,2)+P(2n,2)]/2$ | $V(n,3)$ $= P(2n,3)$ | $V(n,4)$ $= P(2n,4)$ | $V(n,5)$ $= [P(2n,5)+P(2n+1,5)]/2$ | $V(n,6)$ $= P(2n+1,6)$ |

| | P(3n−1,1) | P(3n−1,2) | P(3n−1,3) | P(3n−1,4) | P(3n+2,5) | P(3n+2,6) |
|---|---|---|---|---|---|---|
| PIXEL VALUE | P(3n,1) | P(3n,2) | P(3n,3) | P(3n,4) | P(3n,5) | P(3n,6) |
| | P(3n−2,1) | P(3n−2,2) | P(3n+1,3) | P(3n+1,4) | P(3n+1,5) | P(3n+1,6) |
| 1ST VIRTUAL PIXEL WEIGHT | 1 | 0.5 | 0 | 0 | 0 | 0.5 |
| 2ND VIRTUAL PIXEL WEIGHT | 0 | 0.5 | 1 | 0.5 | 0 | 0 |
| 3RD VIRTUAL PIXEL WEIGHT | 0 | 0 | 0 | 0.5 | 1 | 0.5 |
| VIRTUAL PIXEL RENDERING RESULT | $V(n,1)$ $= P(3n-1,1)$ | $V(n,2)$ $= [P(3n-1,2)+P(3n,2)]/2$ | $V(n,3)$ $= P(3n,3)$ | $V(n,4)$ $= [P(3n,4)+P(3n+1,4)]/2$ | $V(n,5)$ $= P(3n+1,5)$ | $V(n,6)$ $= [P(3n+1,6)+P(3n+2,6)]/2$ |

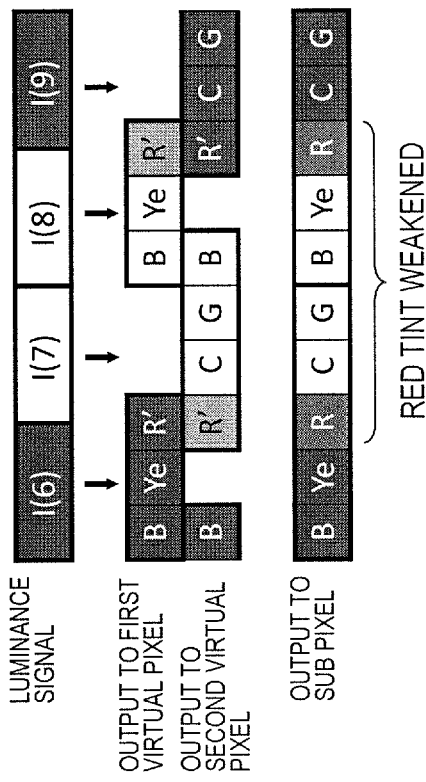
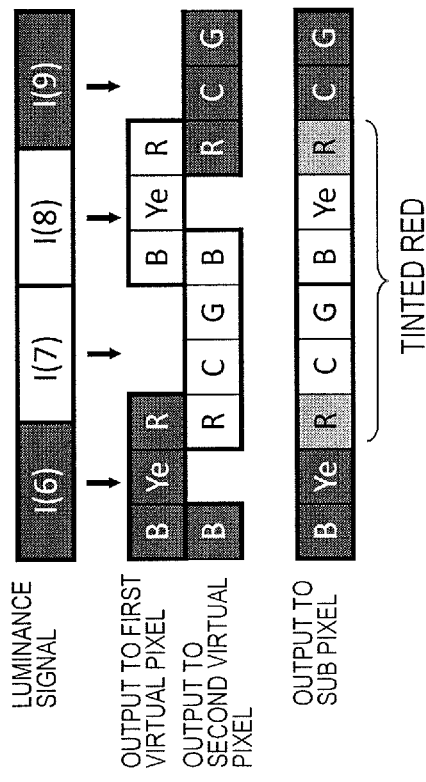
FIG.37

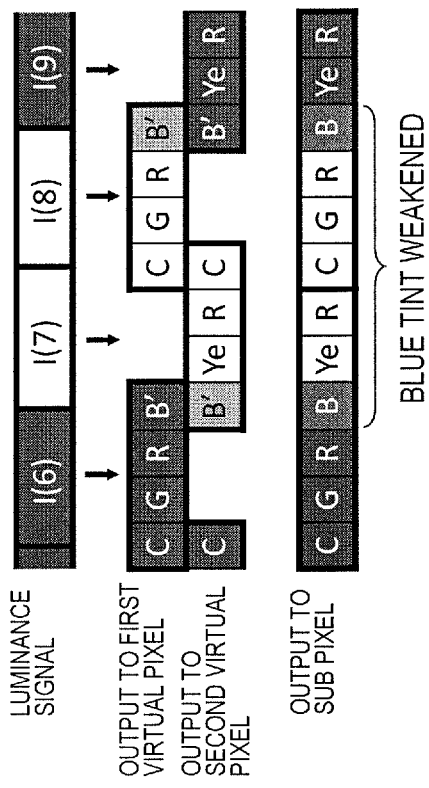
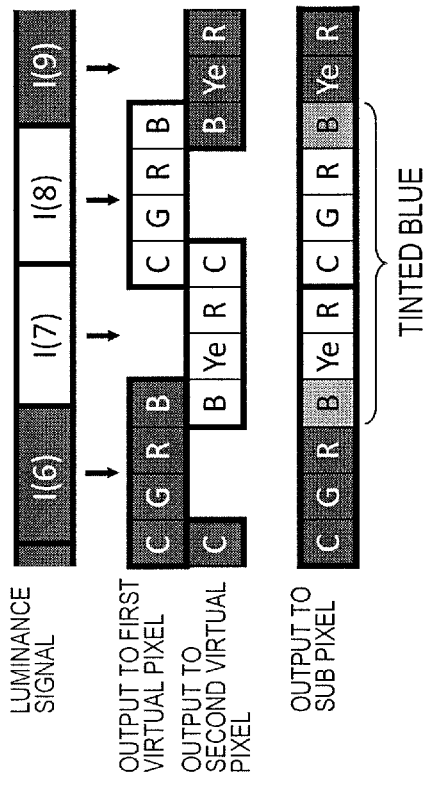
FIG. 46

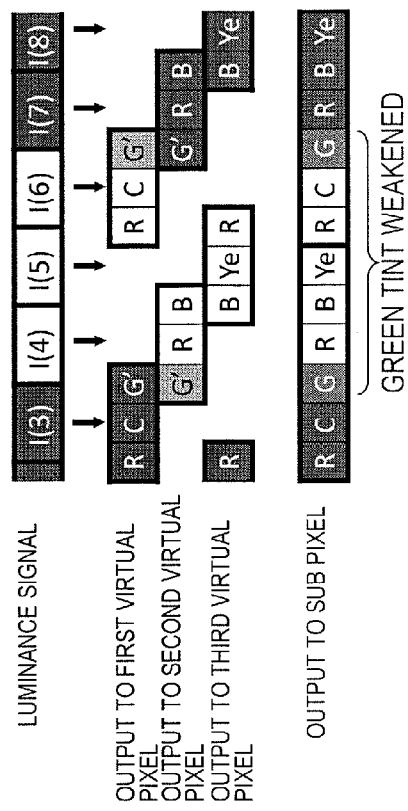
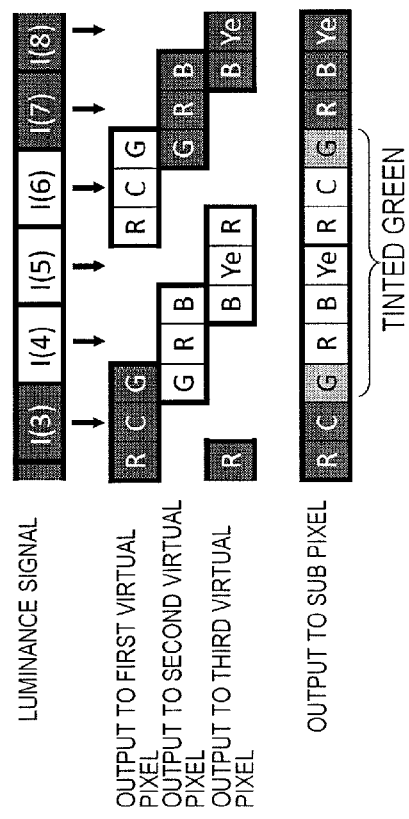
FIG. 55

MULTI-PRIMARY COLOR DISPLAY DEVICE

TECHNICAL FIELD

The present invention relates to a display device, and specifically to a multiple primary color display device for providing display by use of four or more primary colors.

BACKGROUND ART

In a general display device, one pixel is formed of three sub pixels for respectively displaying red, green and blue, which are primary colors of light, and thus is capable of providing color display.

However, conventional display devices have a problem that the range of colors which can be reproduced (referred to as the "color reproduction range") is narrow. When the color reproduction range is narrow, a part of object colors (colors of various objects existing in the natural world; see Non-patent Document 1) cannot be displayed. In order to broaden the color reproduction range of display devices, techniques of increasing the number of primary colors used for display have been proposed.

For example, Patent Document 1 discloses a display device for providing display by use of six primary colors. Patent Document 1 also discloses a display device for providing display by use of four primary colors, and a display device for providing display by use of five primary colors. FIG. 63 shows an example of display device for providing display by use of six primary colors. In a display device 800 shown in FIG. 63, one pixel P is formed of a red sub pixel R, a green sub pixel G, a blue sub pixel B, a cyan sub pixel C, a magenta sub pixel M and a yellow sub pixel Ye. In the display device 800, the six primary colors of red, green, blue, cyan, magenta and yellow, which are displayed by the six sub pixels, are mixed to provide color display.

A display device having an increased number of primary colors usable for display, namely, a display device using four or more primary colors to provide display can broaden the color reproduction range as compared with the conventional display devices which provide display by use of three primary colors. In this specification, a display device for providing display by use of four or more primary colors will be referred to as a "multiple primary color display device", and a display device for providing display by use of three primary colors (namely, a conventionally common display device) will be referred to as a "three primary color display device".

CITATION LIST

Patent Literature

Patent Document 1: International Publication No. 2006/018926

Non-Patent Literature

Non-Patent Document 1: M. R. Pointer, "The gamut of real surface colors," Color Research and Application, Vol. 5, No. 3, pp. 145-155 (1980)

SUMMARY OF INVENTION

Technical Problem

However, in order to display an image having a resolution equivalent to that of an image displayed by a three primary color display device, a multiple primary color display device is required to have a more precise device structure for the same size of screen. This increases the production cost. A reason for this is as follows. A multiple primary color display device includes four or more sub pixels, instead of three sub pixels, in one pixel; and therefore needs to have a smaller size of sub pixels than that in a three primary color display device in order to have the same number of pixels in the same size of screen. Specifically, where the number of primary colors used for display is m (m≥4), the size of each sub pixel needs to be 3/m. In a multiple primary color display device for providing display by use of, for example, six primary colors, the size of each sub pixel needs to be ½ (=3/6).

The present invention made in light of the above-described problem has an object of providing a multiple primary color display device capable of displaying an image having a resolution equivalent to, or higher than, that of an image provided by a three primary color display device without reducing the size of sub pixels as compared with the three primary color display device.

Solution to Problem

A multiple primary color display device in an embodiment of the present invention includes a plurality of pixels located in a matrix including a plurality of rows and a plurality of columns, the plurality of pixels being each formed of a plurality of sub pixels including at least four sub pixel for displaying different primary colors from one another. The plurality of sub pixels which form each of the pixels are sorted into n number of virtual pixels (n is an integer of 2 or greater), each of which is formed of two or more sub pixels, and the n number of virtual pixels are each used as a minimum color display unit for providing display; the two or more sub pixels which form each of the n number of virtual pixels include a sub pixel common to another of the n number of virtual pixels; and when a line having a width corresponding to the n number of virtual pixels is displayed, two sub pixels which are located at both of two ends, in a width direction, of the line and which display a certain identical primary color to each other have a luminance lower than the luminance that the two sub pixels originally have.

In a preferable embodiment, the multiple primary color display device according to the present invention further includes a signal conversion circuit that converts an input image signal corresponding to three primary colors into a multiple primary color image signal corresponding to four or more primary colors.

In a preferable embodiment, the signal conversion circuit includes a false color suppression processing section that performs a process for decreasing the luminance of the two sub pixels from the luminance that the two sub pixels originally have.

In a preferable embodiment, the false color suppression processing section includes a detection section that detects that the line having a width corresponding to the n number of virtual pixels is to be displayed; and a weight selection section that selects a weight for each of the primary colors in each of the n number of virtual pixels in accordance with a detection result provided by the detection section.

In a preferable embodiment, when the detection section detects that the line having a width corresponding to the n number of virtual pixels is to be displayed, the weight selection section performs the selection such that the certain primary color displayed by the two sub pixels has a weight smaller than the weight when the detection section does not so detect.

In a preferable embodiment, the signal conversion circuit includes a low range multiple primary color signal generation section that generates, based on the input image signal, a low range multiple primary color signal obtained as a result of a low range component of the input image signal being multiple-primary-colored; a high range luminance signal generation section that generates, based on the input image signal, a high range luminance signal obtained as a result of a luminance of a high range component of the input image signal being converted; and a rendering processing section that performs a rendering process on the n number of virtual pixels based on the low range multiple primary color signal generated by the low range multiple primary color signal generation section and the high range luminance signal generated by the high range luminance signal generation section.

In a preferable embodiment, the low range multiple primary color signal generation section includes a low range component extraction section that extracts a low range component from the input image signal; and a multiple primary color conversion section that performs multiple primary coloring on the low range component of the input image signal that is extracted by the low range component extraction section.

In a preferable embodiment, the high range luminance signal generation section includes a luminance conversion section that converts a luminance of the input image signal to generate a luminance signal; and a high range component extraction section that extracts a high range component of the luminance signal generated by the luminance conversion section as a high range luminance signal.

In a preferable embodiment, the multiple primary color display device according to the present invention further includes a multiple primary color display panel including the plurality of sub pixels in each of the plurality of pixels.

In a preferable embodiment, the plurality of rows are generally parallel to a horizontal direction of a display plane; the plurality of sub pixels are arrayed in one row by a plurality of columns in each of the plurality of pixels; and the line extends in a column direction.

In a preferable embodiment, the plurality of sub pixels include a red sub pixel for displaying red, a green sub pixel for displaying green, and a blue sub pixel for displaying blue.

In a preferable embodiment, the plurality of sub pixels include at least one of a cyan sub pixel for displaying cyan, a magenta sub pixel for displaying magenta, a yellow sub pixel for displaying yellow, and a white sub pixel for displaying white.

In a preferable embodiment, the plurality of sub pixels include another red sub pixel for displaying red.

The multiple primary color display device in a preferable embodiment of the present invention is a liquid crystal display device.

Advantageous Effects of Invention

An embodiment of the present invention provides a multiple primary color display device capable of displaying an image having a resolution equivalent to, or higher than, that of an image provided by a three primary color display device without reducing the size of sub pixels as compared with the three primary color display device. According to the present invention, when display is provided by use of a plurality of virtual pixels in order to raise the resolution, generation of a false color, which would otherwise be caused when the display is provided in a particular manner, can be suppressed.

BRIEF DESCRIPTION OF DRAWINGS

FIG. 14 provides a table showing, regarding a part of a certain pixel row, the low range component, the high range component, the pixel value, the weight of each primary color in the first virtual pixel, the weight of each primary color in the second virtual pixel, and the rendering result obtained in consideration of the virtual pixels.

FIG. 15 provides a table showing the pixel value and the rendering result when the weight W(1, m) of the m'th primary color in the first virtual pixel and the weight W(2, m) of the m'th primary color in the second virtual pixel are set to certain values.

FIG. 17 provides a table showing, regarding a part of a certain pixel row, the low range component, the high range component, the pixel value, the weight of each primary color in the first virtual pixel, the weight of each primary color in the second virtual pixel, the weight of each primary color in the third virtual pixel, and the rendering result obtained in consideration of the virtual pixels.

FIG. 18 provides a table showing the pixel value and the rendering result when the weight W(1, m) of the m'th primary color in the first virtual pixel, the weight W(2, m) of the m'th primary color in the second virtual pixel, the weight W(3, m) of the m'th primary color in the third virtual pixel are set to certain values.

FIG. 37 shows the relationship among the luminance signal, the outputs to the plurality of virtual pixels, and the final output to each sub pixel; (a) shows such a relationship when a process for suppressing a false color is not performed, and (b) shows such a relationship when a process for suppressing a false color is performed.

FIG. 46 shows the relationship among the luminance signal, the outputs to the plurality of virtual pixels, and the final output to each sub pixel; (a) shows such a relationship when a process for suppressing a false color is not performed, and (b) shows such a relationship when a process for suppressing a false color is performed.

FIG. 55 shows the relationship among the luminance signal, the outputs to the plurality of virtual pixels, and the final output to each sub pixel; (a) shows such a relationship when a process for suppressing a false color is not performed, and (b) shows such a relationship when a process for suppressing a false color is performed.

DESCRIPTION OF EMBODIMENTS

Hereinafter, an embodiment of the present invention will be described with reference to the drawings. In the following, a liquid crystal display device will be described as an example, but the present invention is not limited to liquid crystal display devices and is preferably applicable to other types of display devices including organic EL display devices and the like.

Figure 1:
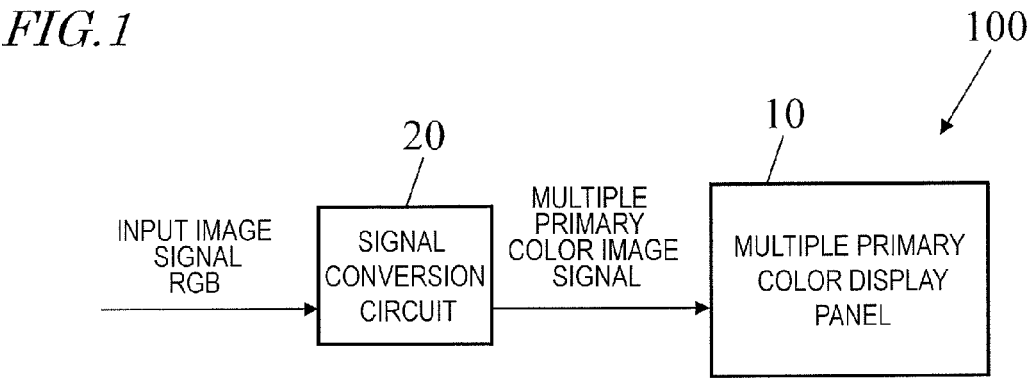
FIG. 1 is a block diagram schematically showing a liquid crystal display device (multiple primary color display device) 100 in a preferable embodiment according to the present invention.

FIG. 1 shows an liquid crystal display device 100 in this embodiment. As shown in FIG. 1, the liquid crystal display device 100 is a multiple primary color display device for providing display by use of four or more primary colors, and includes a multiple primary color display panel 10 and a signal conversion circuit 20.

Figure 2:
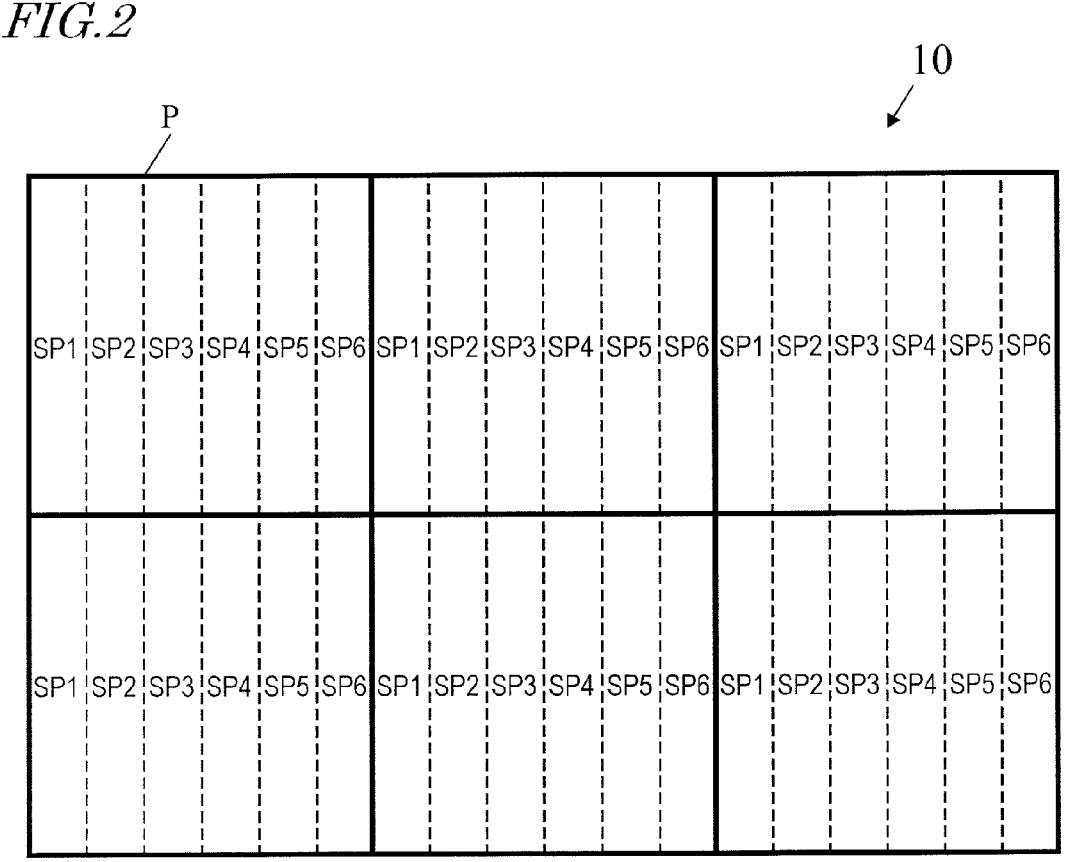
FIG. 2 shows an example of arrangement of sub pixels of a multiple primary color display panel 10 included in the liquid crystal display device 100.

Although not shown in FIG. 1, the multiple primary color display panel 10 includes a plurality of pixels located in a matrix including a plurality of rows and a plurality of columns. The plurality of pixels are each formed of a plurality of sub pixels. The plurality sub pixels which form each pixel include at least four sub pixels for displaying different primary colors from one another. FIG. 2 shows an example of specific pixel structure (sub pixel array) of the multiple primary color display panel 10.

In the multiple primary color display panel 10 shown in FIG. 2, a plurality of pixels P located in a matrix are each formed of six sub pixels SP1 through SP6. In each of the pixels P, the six sub pixels SP1 through SP6 are arrayed in one row by six columns. The six sub pixels SP1 through SP6 are, for example, a red sub pixel R for displaying red, a green sub pixel G for displaying green, a blue sub pixel B for displaying blue, a cyan sub pixel C for displaying cyan, a magenta sub pixel M for displaying magenta, and a yellow sub pixel Ye for displaying yellow.

Figure 3:
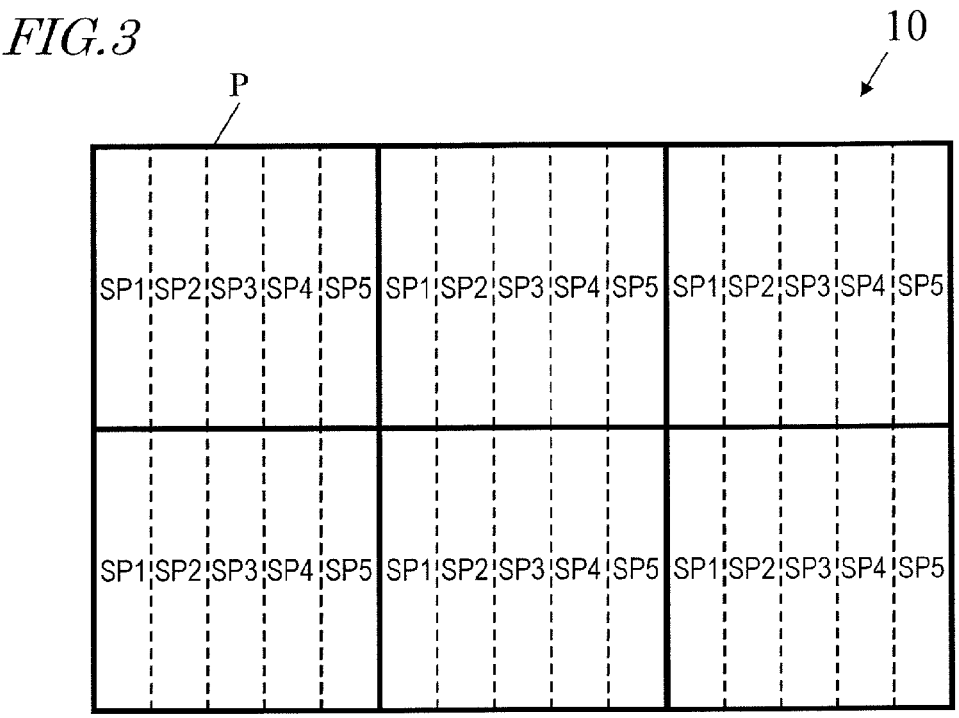
FIG. 3 shows an example of arrangement of the sub pixels of the multiple primary color display panel 10 included in the liquid crystal display device 100.
Figure 4:
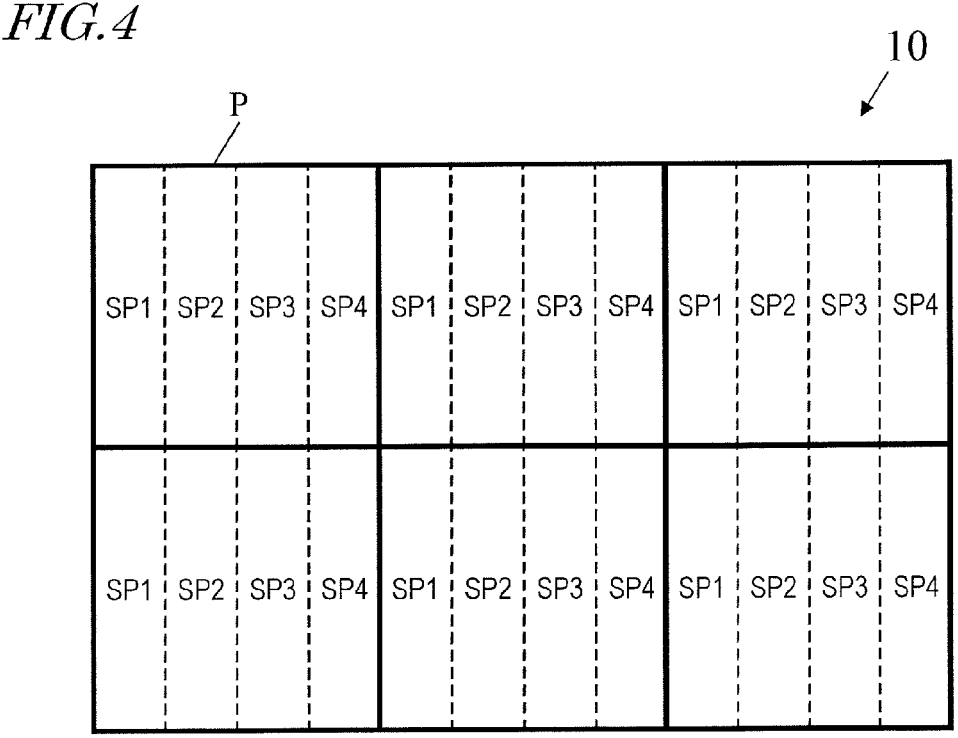
FIG. 4 shows an example of arrangement of the sub pixels of the multiple primary color display panel 10 included in the liquid crystal display device 100.

The pixel structure of the multiple primary color display panel 10 is not limited to the example shown in FIG. 2. FIG. 3 and FIG. 4 each show another pixel structure of the multiple primary color display panel 10.

In the multiple primary color display panel 10 shown in FIG. 3, a plurality of pixels P located in a matrix are each formed of five sub pixels SP1 through SP5. In each of the pixels P, the five sub pixels SP1 through SP5 are arrayed in one row by five columns. The five sub pixels SP1 through SP5 are, for example, a red sub pixel R, a green sub pixel G, a blue sub pixel B, and either two among a cyan sub pixel C, a magenta sub pixel M and a yellow sub pixel Ye.

In the multiple primary color display panel 10 shown in FIG. 4, a plurality of pixels P located in a matrix are each formed of four sub pixels SP1 through SP4. In each of the pixels P, the four sub pixels SP1 through SP4 are arrayed in one row by four columns. The four sub pixels SP1 through SP4 are, for example, a red sub pixel R, a green sub pixel G, a blue sub pixel B, and either one among a cyan sub pixel C, a magenta sub pixel M and a yellow sub pixel Ye.

The plurality of sub pixels which form each pixel P do not need to include only sub pixels for displaying different colors from one another. For example, either one of the cyan sub pixel C, the magenta sub pixel M and the yellow sub pixel Ye may be replaced with another red sub pixel R for displaying red. In the case where two red sub pixels R are provided in one pixel P, bright red (red having a high brightness) can be displayed. Alternatively, either one of the cyan sub pixel C, the magenta sub pixel M and the yellow sub pixel Ye may be replaced with a white sub pixel W for displaying white. In the case where a white sub pixels W is provided, the display luminance of the entire pixel P can be increased.

FIG. 2 through FIG. 4 each show a structure in which the plurality of sub pixels are arrayed in one row by a plurality of columns in each pixel P. The array of the sub pixels in each pixel P is not limited to this. For example, the plurality of sub pixels may be arrayed in a plurality of rows by one column in each pixel P. However, it should be noted that in order to raise the resolution in a certain direction, it is preferable that there are a plurality of sub pixels in the direction in each pixel P. Therefore, from the viewpoint of providing an effect of raising the resolution in a row direction, it is preferable that the plurality of sub pixels are arrayed in two or more columns in each pixel P. From the viewpoint of providing an effect of raising the resolution in a column direction, it is preferable that the plurality of sub pixels are arrayed in two or more rows in each pixel P. In addition, the resolving power of the human eye is lower for the vertical direction than for the horizontal direction. Therefore, it is preferable to raise the resolution at least in the horizontal direction. Typically, the row direction (namely, the plurality of rows formed of a plurality of pixels P) is generally parallel to a horizontal direction of a display plane. Therefore, for a general use of the liquid crystal display device 100, it is considered to be preferable that the plurality of sub pixels are arrayed in one row by a plurality of columns in each pixel P. In the following examples, unless otherwise specified, the pixel row is generally parallel to the horizontal direction of the display plane, and the plurality of sub pixels are arrayed in one row by a plurality of columns in each pixel P.

As shown in FIG. 1, the signal conversion circuit 20 converts an input image signal (three primary color image signal) corresponding to three primary colors (RGB) into an image signal corresponding to four or more primary colors (such an image signal will be referred to as a "multiple primary color image signal"). The multiple primary color image signal which is output from the signal conversion circuit 20 is input to the multiple primary color display panel 10, and thus color display is provided by use of four or more primary colors. A specific structure of the signal conversion circuit 20 will be described later in detail.

In this specification, the total number of the plurality of pixels P included in the multiple primary color display panel 10 will be referred to as a "panel resolution". In the case where A number of pixels P are located in the row direction and B number of pixels P are located in the column row direction, the panel resolution is expressed as "A×B". In this specification, the minimum display unit of an input image will also be referred to as a "pixel" for the sake of convenience, and the total number of pixels in an input image will be referred to as the "resolution of an input image". In this case also, the resolution of an input image formed of A number of pixels in the row direction and B number of pixels in the column direction is expressed as "A×B".

Figure 5:
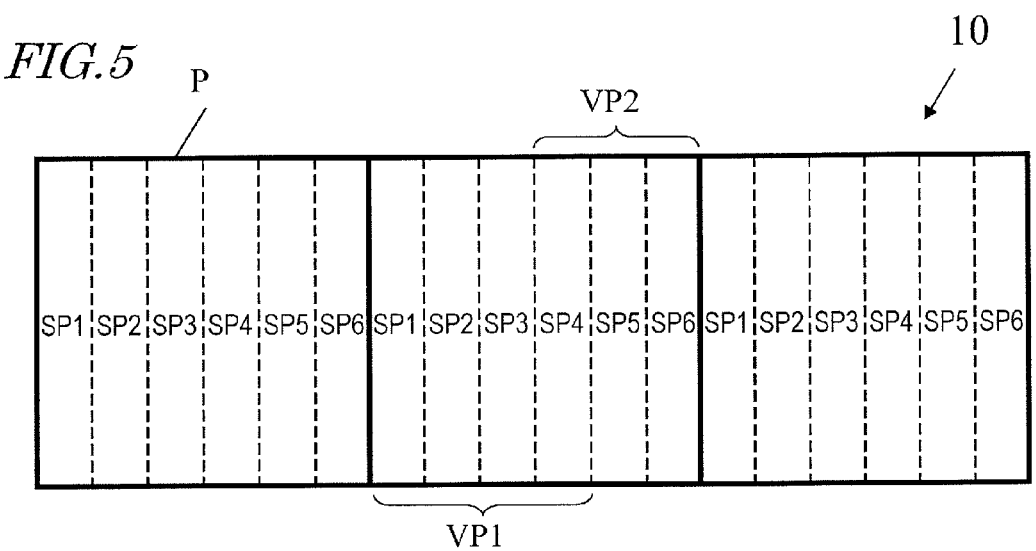
FIG. 5 shows an example of sorting pattern of the plurality of sub pixels into a plurality of virtual pixels.
Figure 6:
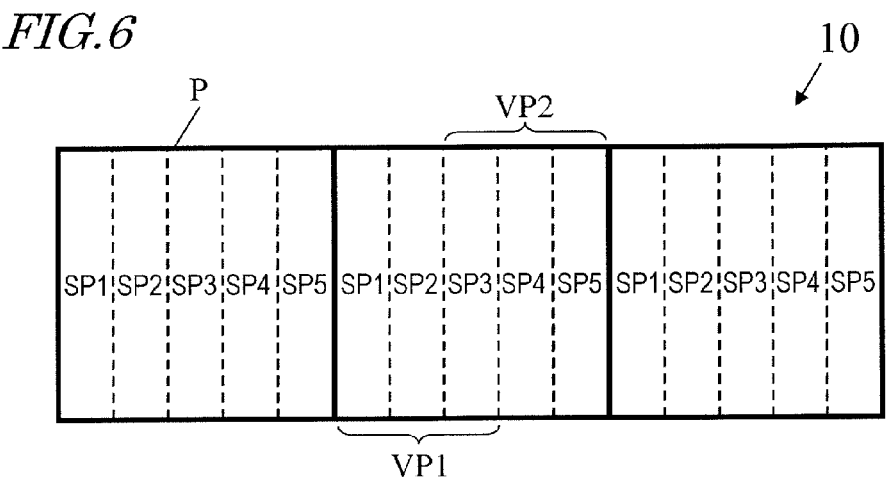
FIG. 6 shows an example of sorting pattern of the plurality of sub pixels into a plurality of virtual pixels.
Figure 7:
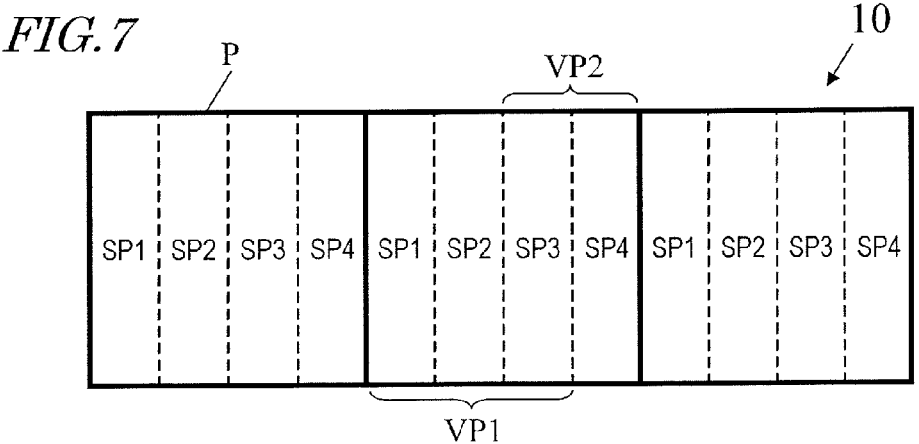
FIG. 7 shows an example of sorting pattern of the plurality of sub pixels into a plurality of virtual pixels.

The liquid crystal display device 100 in this embodiment can sort the plurality of sub pixels which form each pixel P into a plurality of virtual pixels, and use each of the plurality of virtual pixels as a minimum color display unit to provide display. FIG. 5, FIG. 6 and FIG. 7 each show an example of pattern of sorting the plurality of sub pixels into a plurality of virtual pixels.

In the sorting pattern shown in FIG. 5, the six sub pixels SP1 through SP6 which form each pixel P are sorted into two virtual pixels (first and second virtual pixels) VP1 and VP2. The first virtual pixel VP1 is formed of four sub pixels SP1, SP2, SP3 and SP4 among the six sub pixels SP1 through SP6. The second virtual pixel VP2 is formed of three sub pixels SP4, SP5 and SP6. In the example shown in FIG. 5, the sub pixels SP4 located at the fourth position from the left in each pixel P is included in both of the first virtual pixel VP1 and the second virtual pixel VP2. Namely, the first virtual pixel VP1 and the second virtual pixel VP2 include the common sub pixel SP4, i.e., shares the sub pixel SP4.

In the sorting pattern shown in FIG. 6, the five sub pixels SP1 through SP5 which form each pixel P are sorted into two virtual pixels (first and second virtual pixels) VP1 and VP2. The first virtual pixel VP1 is formed of three sub pixels SP1, SP2 and SP3 among the five sub pixels SP1 through SP5. The second virtual pixel VP2 is formed of three sub pixels SP3, SP4 and SP5. In the example shown in FIG. 6, the sub pixels SP3 located at the center of each pixel P is included in both of the first virtual pixel VP1 and the second virtual pixel VP2. Namely, the first virtual pixel VP1 and the second virtual pixel VP2 include the common sub pixel SP3, i.e., shares the sub pixel SP3.

In the sorting pattern shown in FIG. 7, the four sub pixels SP1 through SP4 which form each pixel P are sorted into two virtual pixels (first and second virtual pixels) VP1 and VP2. The first virtual pixel VP1 is formed of three sub pixels SP1, SP2 and SP3 among the four sub pixels SP1 through SP4. The second virtual pixel VP2 is formed of two sub pixels SP3 and SP4. In the example shown in FIG. 7, the sub pixels SP3 located at the third position from the left in each pixel P is included in both of the first virtual pixel VP1 and the second virtual pixel VP2. Namely, the first virtual pixel VP1 and the second virtual pixel VP2 include the common sub pixel SP3, i.e., shares the sub pixel SP3.

Figure 8:
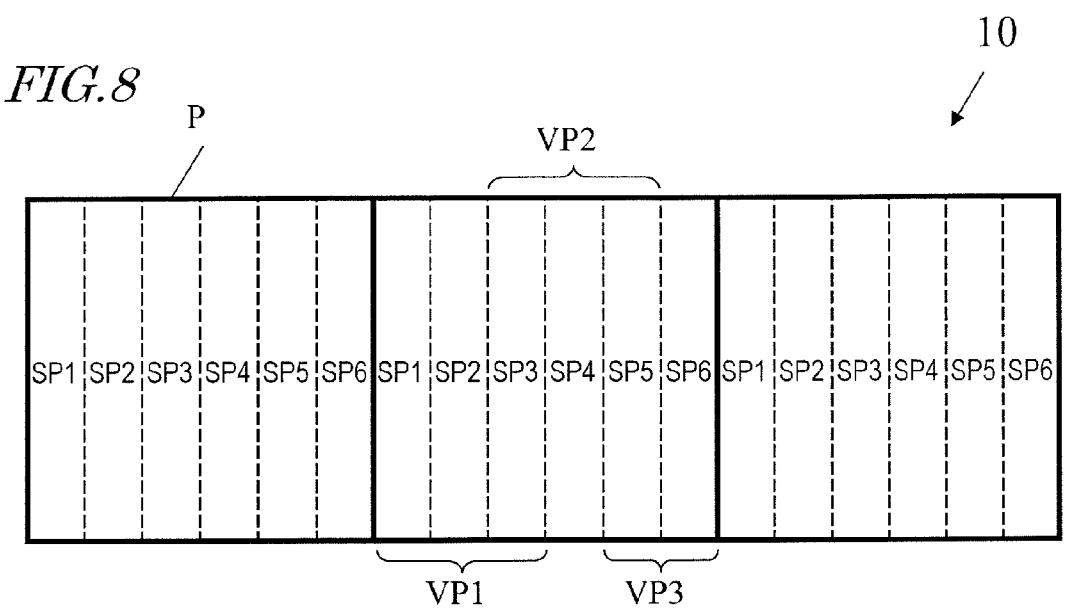
FIG. 8 shows an example of sorting pattern of the plurality of sub pixels into a plurality of virtual pixels.

In the sorting patterns shown in FIG. 5, FIG. 6 and FIG. 7, there are two virtual pixels. The number of virtual pixels is not limited to two, and may be three or more. The plurality of sub pixels which form each pixel P are sorted into n number of virtual pixels (n is an integer of 2 or greater). FIG. 8 shows another example of sorting pattern.

In the sorting pattern shown in FIG. 8, the six sub pixels SP1 through SP6 which form each pixel P are sorted into three virtual pixels (first, second and third virtual pixels) VP1, VP2 and VP3. The first virtual pixel VP1 is formed of three sub pixels SP1, SP2 and SP3 among the six sub pixels SP1 through SP6. The second virtual pixel VP2 is formed of three sub pixels SP3, SP4 and SP5. The third virtual pixel VP3 is formed of two sub pixels SP5 and SP6. In the example shown in FIG. 8, the sub pixels SP3 located at the third position from the left in each pixel P is included in both of the first virtual pixel VP1 and the second virtual pixel VP2. Namely, the first virtual pixel VP1 and the second virtual pixel VP2 include the common sub pixel SP3, i.e., shares the sub pixel SP3. The sub pixels SP5 located at the fifth position from the left in each pixel P is included in both of the second virtual pixel VP2 and the third virtual pixel VP3. Namely, the second virtual pixel VP2 and the third virtual pixel VP3 include the common sub pixel SP5, i.e., shares the sub pixel SP5.

In the sorting patterns shown in FIG. 5 through FIG. 8, the plurality of virtual pixels are each formed of two or more sub pixels continuous in each pixel P. The present invention is not limited to such a manner of sorting. FIG. 9 through FIG. 12 each show still another example of sorting pattern.

Figure 9:
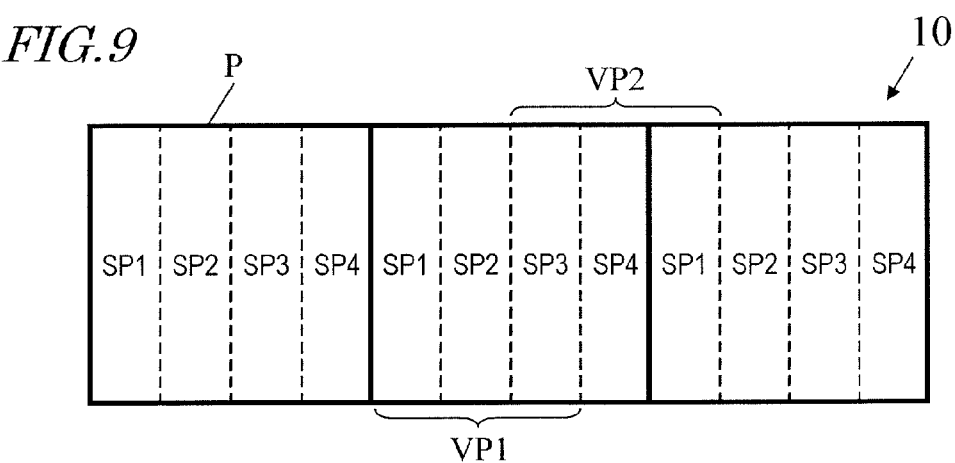
FIG. 9 shows an example of sorting pattern of the plurality of sub pixels into a plurality of virtual pixels.

In the sorting pattern shown in FIG. 9, the plurality of sub pixels SP1 through SP4 are sorted into two virtual pixels VP1 and VP2. In the sorting pattern shown in FIG. 10, the plurality of sub pixels SP1 through SP5 are sorted into two virtual pixels VP1 and VP2. In the sorting pattern shown in FIG. 11, the plurality of sub pixels SP1 through SP6 are sorted into two virtual pixels VP1 and VP2. In the sorting pattern shown in FIG. 12, the plurality of sub pixels SP1 through SP6 are sorted into three virtual pixels VP1, VP2 and VP3.

Among the two virtual pixels VP1 and VP2 located in the vicinity of the center of FIG. 9, the first virtual pixel VP1 is formed of three sub pixels SP1, SP2 and SP3 in the pixel P at the center. The second virtual pixel VP2 is formed of two sub pixels SP3 and SP4 in the center pixel P and one sub pixel SP1 in the pixel P at the right. In this example, the first virtual pixel VP1 shares the sub pixel SP3 located at the third position from the left in the pixel P with the second virtual pixel VP2. The second virtual pixel VP2 shares the sub pixel SP1 located at the leftmost position in the pixel P with another first virtual pixel (virtual pixel formed of three sub pixels SP1, SP2 and SP3 in the right pixel P) VP1.

Figure 10:
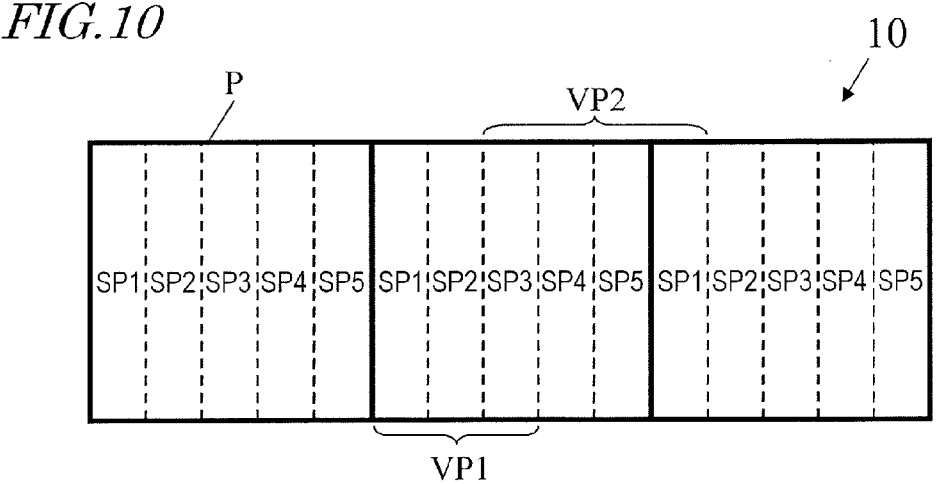
FIG. 10 shows an example of sorting pattern of the plurality of sub pixels into a plurality of virtual pixels.

Among the two virtual pixels VP1 and VP2 located in the vicinity of the center of FIG. 10, the first virtual pixel VP1 is formed of three sub pixels SP1, SP2 and SP3 in the center pixel P. The second virtual pixel VP2 is formed of three sub pixels SP3, SP4 and SP5 in the center pixel P and one sub pixel SP1 in the right pixel P. In this example, the first virtual pixel VP1 shares the sub pixel SP3 located at the third position from the left in the pixel P with the second virtual pixel VP2. The second virtual pixel VP2 shares the sub pixel SP1 located at the leftmost position in the pixel P with another first virtual pixel (virtual pixel formed of three sub pixels SP1, SP2 and SP3 in the right pixel P) VP1.

Figure 11:
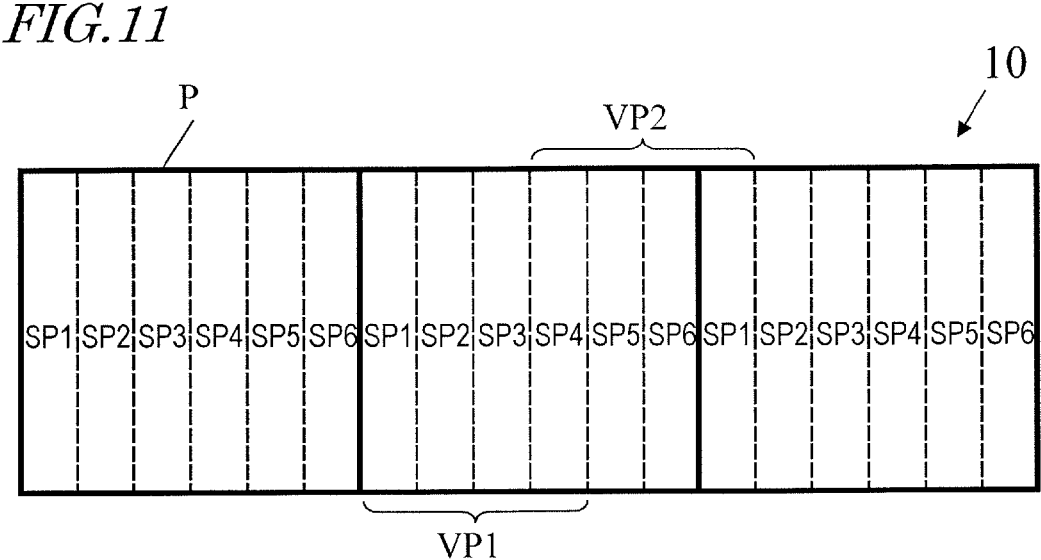
FIG. 11 shows an example of sorting pattern of the plurality of sub pixels into a plurality of virtual pixels.

Among the two virtual pixels VP1 and VP2 located in the vicinity of the center of FIG. 11, the first virtual pixel VP1 is formed of four sub pixels SP1, SP2, SP3 and SP4 in the center pixel P. The second virtual pixel VP2 is formed of three sub pixels SP4, SP5 and SP6 in the center pixel P and one sub pixel SP1 in the right pixel P. In this example, the first virtual pixel VP1 shares the sub pixel SP4 located at the fourth position from the left in the pixel P with the second virtual pixel VP2. The second virtual pixel VP2 shares the sub pixel SP1 located at the leftmost position in the pixel P with another first virtual pixel (virtual pixel formed of four sub pixels SP1, SP2, SP3 and SP4 in the right pixel P) VP1.

Figure 12:
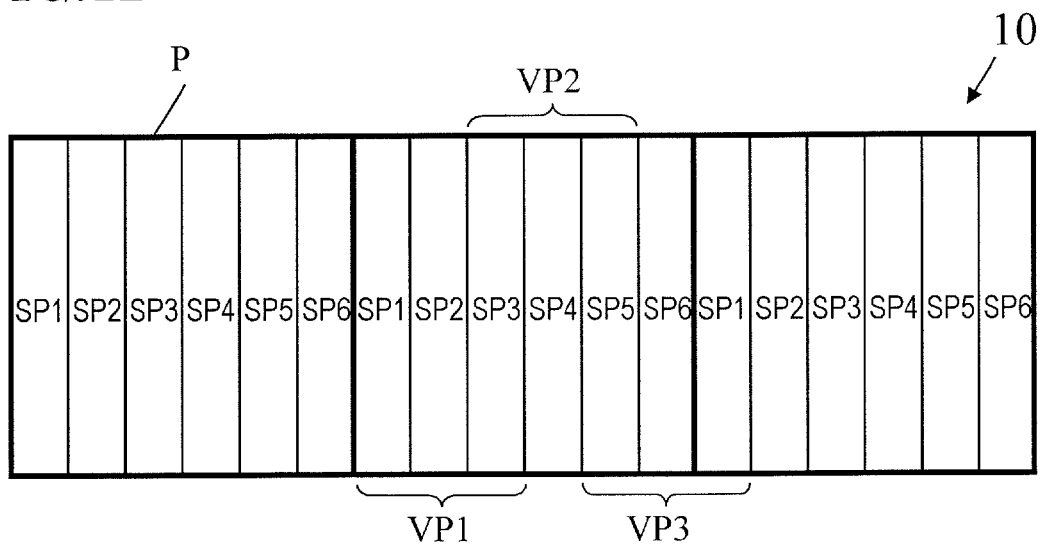
FIG. 12 shows an example of sorting pattern of the plurality of sub pixels into a plurality of virtual pixels.

Among the three virtual pixels VP1, VP2 and VP3 located in the vicinity of the center of FIG. 12, the first virtual pixel VP1 is formed of three sub pixels SP1, SP2 and SP3 in the center pixel P. The second virtual pixel VP2 is formed of three sub pixels SP3, SP4 and SP5 in the center pixel P. The third virtual pixel VP3 is formed of two sub pixels SP5 and SP6 in the center pixel P1 and one sub pixel SP1 in the right pixel P. In this example, the first virtual pixel VP1 shares the sub pixel SP3 located at the third position from the left in the pixel P with the second virtual pixel VP2. The second virtual pixel VP2 shares the sub pixel SP5 located at the fifth position from the left in the pixel P with the third virtual pixel VP3. The third virtual pixel VP3 shares the sub pixel SP1 located at the leftmost position in the pixel P with another first virtual pixel (virtual pixel formed of three sub pixels SP1, SP2 and SP3 in the right pixel P) VP1.

In the examples shown in shown in FIG. 9 through FIG. 12, the second virtual pixel VP2 and the third virtual pixel VP3 are each formed of a plurality of sub pixels provided continuously over two pixels P. In this manner, a part of the virtual pixels may extend over two pixels P.

As described above, the liquid crystal display device 100 in this embodiment can sort the plurality of sub pixels which form each pixel P into n number of (plurality of) virtual pixels and use each virtual pixel as a minimum color display unit to provide display. Therefore, the display resolution (resolution of an image displayed on the display plane) can be made higher than the panel resolution (physical resolution inherent to the panel that is defined by the total number of pixels P).

For example, when any of the patterns shown in FIG. 5 through FIG. 7 and FIG. 9 through FIG. 11 is used, two virtual pixels VP1 and VP2 adjoining each other in the row direction (horizontal direction) are provided for each pixel P. Therefore, the display resolution can be made twice as high in the horizontal direction. This allows an input image having a resolution of "2A×B" to be displayed by the multiple primary color display device 10 having a panel resolution of "A×B". When any of the patterns shown in FIG. 8 and FIG. 12 is used, three virtual pixels VP1, VP2 and VP3 adjoining each other in the row direction (horizontal direction) are provided for each pixel P. Therefore, the display resolution can be made three times as high in the horizontal direction. This allows an input image having a resolution of "3A×B" to be displayed by the multiple primary color display device 10 having a panel resolution of "A×B".

Therefore, the liquid crystal display device 100 in this embodiment can provide display in a preferable manner even when the resolution of the input image is higher than the panel resolution. Alternatively, the liquid crystal display device 100 can display an input image as being reduced in a part of the display plane.

As can be seen, the liquid crystal display device (multiple primary color display device) 100 in this embodiment can make the display resolution higher than the panel resolution, and therefore can display an image having a resolution equivalent to, or higher than, that of an image provided by a three primary color display device with the same size of sub pixels and the same size of display plane as those of the three primary color display device. In addition, the liquid crystal display device 100 in this embodiment can be produced at a cost equivalent to that of the three primary color display device.

In the liquid crystal display device 100 in this embodiment, the plurality of sub pixels which form each pixel each include a sub pixel common to another virtual pixel (namely, each virtual pixel has a sub pixel for displaying one color assigned thereto commonly with another virtual pixel). Such a structure in which the plurality of virtual pixels share a sub pixel increases the number and the type of sub pixels which form each virtual pixel. This makes it easier for each virtual pixel to have a sufficient level of luminance and also to reproduce a desired color (e.g., white).

However, studies made by the present inventors have clarified that in the case where the sub pixels which form each virtual pixel include a sub pixel common to another virtual pixel, a false color may be displayed when the display is provided in a particular manner. Specifically, it has been found that when a line having a width corresponding to n number of virtual pixels is displayed (namely, when a line having a width corresponding to n number of pixels in an input image signal is displayed in an embodiment of raising the resolution to a level n times as high), the line is tinted with a specific primary color. In the following description, such a line may be referred to as a "n-pixel width line". In the case where, as shown in FIG. 5 through FIG. 12, n number of virtual pixels adjoining each other in the row direction (horizontal direction) are provided for each pixel P, the n-pixel width line is a line extending in the column direction (vertical direction).

When an n-pixel width line is to be displayed, the liquid crystal display device 100 in this embodiment provides display such that two sub pixels which are located at both of two ends, in a width direction, of the n-pixel width line and which display a certain identical primary color to each other are displayed so as to have a luminance lower than the luminance that the two sub pixels originally have. Owing to this, tinting of the n-pixel width line (generation of a false color) is suppressed. A reason why such an effect is provided, a cause of a false color and the like will be described later in detail.

Figure 13:
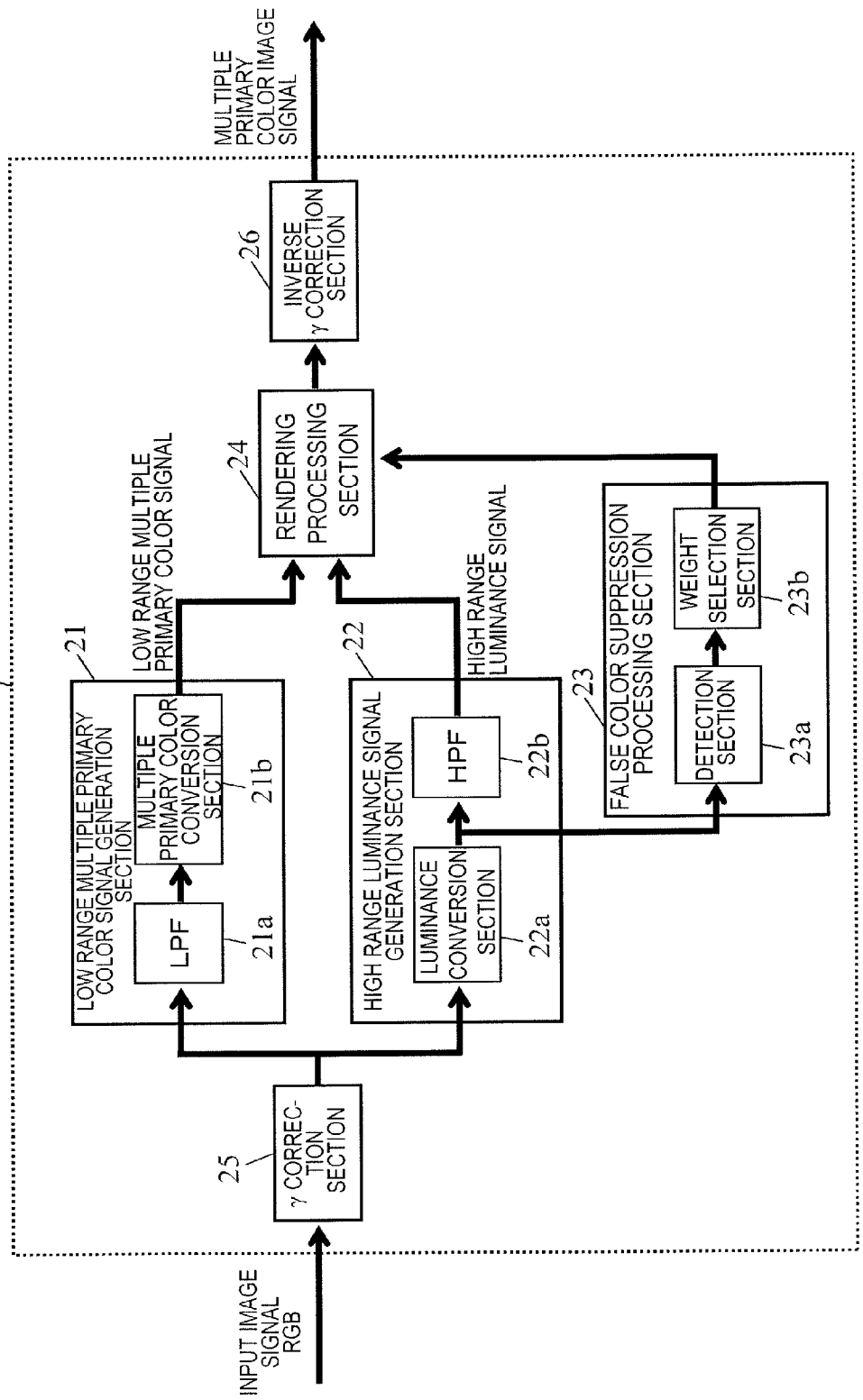
FIG. 13 is a block diagram showing an example of specific structure of a signal conversion circuit 20 included in the liquid crystal display device 100.

Now, a specific structure of the signal conversion circuit 20 will be described. FIG. 13 shows an example of specific structure of the signal conversion circuit 20.

As shown in FIG. 13, the signal conversion circuit includes a low range multiple primary color signal generation section 21, a high range luminance signal generation section 22, a false color suppression processing section 23, and a rendering processing section 24. The signal conversion circuit 20 further includes a γ correction section 25 and an inverse γ correction section 26.

An image signal which is input to the signal conversion circuit 20 is first subjected to γ correction by the γ correction section 25. The image signal processed with γ correction is next input to each of the low range multiple primary color signal generation section 21 and the high range luminance signal generation section 22.

The low range multiple primary color signal generation section 21 generates a low range multiple primary color signal based on the input image signal. The low range multiple primary color signal is obtained as a result of a low range component of the input image signal (component having a relatively low spatial frequency) being multiple-primary-colored (namely, being converted so as to correspond to four or more primary colors).

The low range multiple primary color signal generation section 21 specifically includes a low range component extraction section (in this example, low pass filter LPF) 21a and a multiple primary color conversion section 21b. The low pass filter 21a extracts a low range component from the input image signal. The low range component of the input image signal that is extracted by the low pass filter 21a is multiple-primary-colored by the multiple primary color conversion section 21b. The multiple-primary-colored low range component is output as a low range multiple primary color signal. The multiple primary color conversion section 21b may perform multiple primary coloring by use of any of various known techniques. For example, the technique disclosed in International Publication No. 2008/065935 or 2007/097080 may be used.

The high range luminance signal generation section 22 generates a high range luminance signal based on the input image signal The high range luminance signal is obtained as a result of the luminance of a high range component of the input image signal (component having a relatively high spatial frequency) being converted.

The high range luminance signal generation section specifically includes a luminance conversion section 22a and a high range component extraction section (in this example, high pass filter HPF) 22b. The luminance conversion section 22a performs luminance conversion on the input image signal to generate a luminance signal (hereinafter, may be referred to as a "luminance component"). The high pass filter 22b extracts a high range component of the luminance signal that is generated by the luminance conversion section 22a as a high range luminance signal.

When an n-pixel width line is to be displayed, the false color suppression processing section 23 performs a process for decreasing the luminance of two sub pixels, which are located at both of two ends, in the width direction, of the n-pixel width line and which display a certain identical primary color, as compared with the luminance that the two sub pixels originally have.

The false color suppression processing section 23 specifically includes a detection section 23a and a weight selection section 23b. The detection section 23a detects that the n-pixel width line is to be displayed. Namely, the detection section 23a makes a determination on whether or not the n-pixel width line is to be displayed. The determination (detection) by the detection section 23a is made based on the luminance signal (luminance component) generated by the luminance conversion section 22a. The weight selection section 23b selects a weight of each primary color in each of n number of virtual pixels in accordance with the result of detection made by the detection section 23a. Herein, the term "weight" indicates a degree of contribution of each primary color in the virtual pixel to display. For example, as described later, the weight is a coefficient having a value which is equal to or greater than 0 and equal to or less than 1. The weight selection section 23b specifically makes a selection such that when the detection section 23a detects that the n-pixel width line is to be displayed, the weight of the primary color displayed by the above-described two sub pixels (sub pixels located at both of two ends, in the width direction, of the n-pixel width line) is smaller than the weight when the detection section 23a does not so detect (namely, when the detection section 23a does not detect that the n-pixel width line is to be displayed).

The rendering processing section 24 performs a rendering process to a plurality of virtual pixels based on the low range multiple primary color signal generated by the low range multiple primary color signal generation section 21 and the high range luminance signal generated by the high range luminance signal generation section 22. The rendering process by the rendering processing section 24 is performed in accordance with the weight selected by the weight selection section 23b of the false color suppression processing section 23. An image signal generated by the rendering process is subjected to inverse γ correction by the inverse γ correction section 26 and is output as a multiple primary color image signal.

As can be seen, the signal conversion circuit 20 performs a multiple primary coloring process on a low range component of an input image signal and performs a luminance conversion process on a high component thereof, in consideration of the visual characteristic of the human eye that the sensitivity to a luminance signal is higher than the sensitivity to a color signal (namely, the visual characteristic of the human eye that the visual sensitivity to the color difference is lower than the visual sensitivity to the luminance). The low range multiple primary color signal and the high range luminance signal obtained by these processes are combined and rendered to the virtual pixels, and thus an image signal corresponding to four or more primary colors (multiple primary color image signal) can be output.

Now, rendering to the virtual pixels will be described specifically.

First, a case where two virtual pixels (first virtual pixel and second virtual pixel) are provided for each pixel P will be described. In the case where two virtual pixels are provided for each pixel P (namely, in the case where the plurality of sub pixels are sorted into two virtual pixels), a rendering result V(n, m) obtained in consideration of the virtual pixels is calculated by the following expressions.

$$P(n, m) = L(n, m) + \alpha H(n) \quad \text{[Expression 1]}$$

$$V(n, m) = \begin{cases} W(1, m)P(2n, m) + W(2, m)P(2n-1, m) & (m = 1, 2, 3) \\ W(1, m)P(2n, m) + W(2, m)P(2n+1, m) & (m = 4, 5, 6) \end{cases}$$

In the expressions, n is the pixel position in the row direction, m is the sub pixel position in the pixel, L(n, m) is the low range component of the m'th primary color at the pixel position n, and H(n) is the high range component of the luminance at the pixel position n. P(n, m) is the pixel value calculated from L(n, m) and H(n), α is the emphasis coefficient of the high range component (usually, α=1), and W(g, m) is the weight of the m'th primary color in the g'th virtual pixel (also referred to as "weight coefficient"). FIG. 14 shows, regarding a part of a certain pixel row, the low range component, the high range component, the pixel value, the weight of each primary color in the first virtual pixel, the weight of each primary color in the second virtual pixel, and the rendering result obtained in consideration of the virtual pixels.

From the above expressions and FIG. 14, it is seen that the pixel values P(2n−1, m) and P(2n, m), or P(2n, m) and P(2n+1, m), of two pixels on the input side are rendered for one pixel on the output side (represented by the rendering result V(n, m)) by the two virtual pixels. Namely, it is seen that information on two pixels on the input side can be displayed by one pixel on the output side.

FIG. 15 shows the pixel value and the rendering result when the weight W(1, m) of the m'th primary color in the first virtual pixel and the weight W(2, m) of the m'th primary color in the second virtual pixel are set as shown in Table 1 below. FIGS. 16(a), 16(b) and 16(c) schematically show a part of a certain pixel row represented by the rendering result shown in FIG. 15 on the input side, on the input side (after multiple primary coloring) and on the output side, respectively.

TABLE 1

| m | 1 | 2 | 3 | 4 | 5 | 6 |
|---|---|---|---|---|---|---|
| W(1, m) | 0 | 0.5 | 1 | 1 | 0.5 | 0 |
| W(2, m) | 1 | 0.5 | 0 | 0 | 0.5 | 1 |

The weights (weight coefficients) shown in Table 1 are all set to "0", "1" or "0.5". In a certain virtual pixel, a sub pixel for displaying a primary color having a weight set to 1 allows the entire luminance which can be output to contribute to display of the virtual pixel. A sub pixel for displaying a primary color having a weight set to 0 does not contribute to display of the virtual pixel at all. Namely, a sub pixel for displaying a primary color having a weight set to 0 is considered not to be included in the virtual pixel. A sub pixel for displaying a primary color having a weight set to 0.5 allows half of the luminance which can be output to contribute to display of the virtual pixel. As can be seen, in a plurality of pixels, a sub pixel for displaying a primary color having a weight set to more than 0 (but to less than 1) contributes to display of a plurality of virtual pixels, and therefore is commonly included in the plurality of virtual pixels (shared by the plurality of virtual pixels). In the case where the weights are set as shown in Table 1, the first virtual pixel is formed of four sub pixels for displaying second, third, fourth and fifth primary colors, and the second virtual pixel is formed of four sub pixels for displaying first, second, fifth and sixth primary colors.

Figure 16:
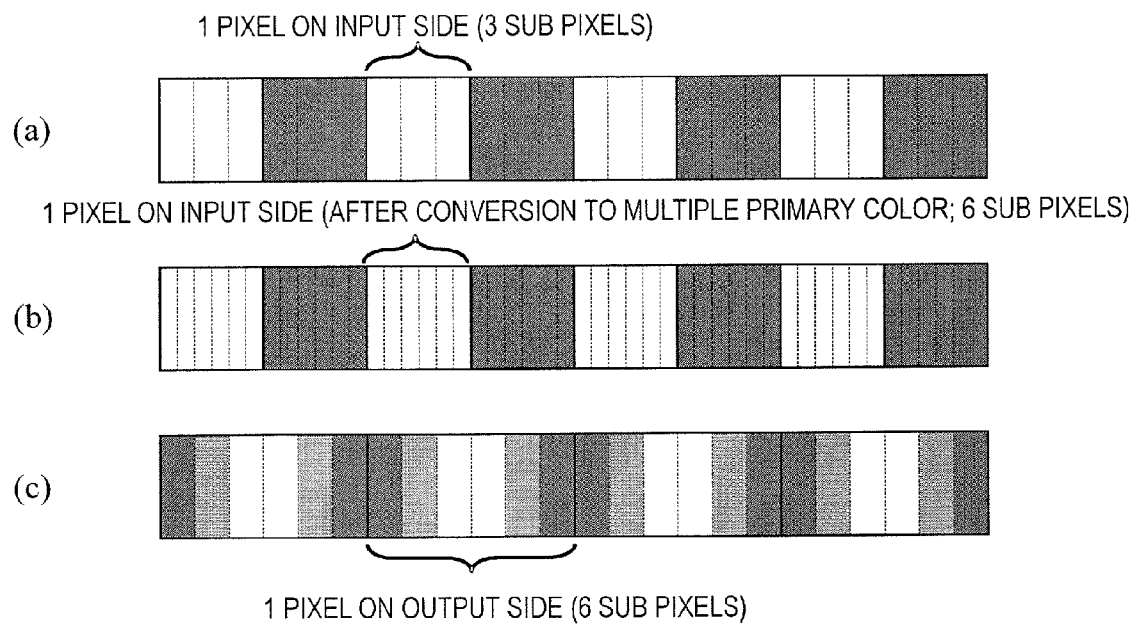
FIGS. 16(a), 16(b) and 16(c) schematically show a part of a certain pixel row represented by the rendering result shown in FIG. 15 on the input side, on the input side (after multiple primary coloring) and on the output side, respectively.

In the example shown in FIGS. 16(*a*) and 16(*c*), the size of the sub pixels on the output side is the same as the size of the sub pixels on the input side. Therefore, the number of pixels on the output side is ½ of the number of pixels on the input side. Without rendering, in order to display an image having a resolution equivalent to that of the image on the input side, the sub pixels on the output side would need to have the same size as that of the sub pixels on the input side after multiple primary coloring as shown in FIG. 16(*b*). However, owing to the rendering performed by use of two virtual pixels, as shown in FIG. 16(*c*), an image of a resolution equivalent to that on the input side can be displayed on the output side, on which the size of the sub pixels is the same as that on the input side and the number of pixel is ½ of that on the input side.

Now, a case where three virtual pixels (first virtual pixel, second virtual pixel and third virtual pixel) are provided for each pixel P will be described. In the case where three virtual pixels are provided for each pixel P (namely, in the case where the plurality of sub pixels are sorted into three virtual pixels), a rendering result V(n, m) obtained in consideration of the virtual pixels is calculated by the following expressions.

$$P(n, m) = L(n, m) + \alpha H(n) \quad \text{[Expression 2]}$$

$$V(n, m) = \begin{cases} W(1, m)P(3n-1, m) + & (m = 1, 2) \\ W(2, m)P(3n, m) + W(3, m)P(3n-2, m) \\ W(1, m)P(3n-1, m) + & (m = 3, 4) \\ W(2, m)P(3n, m) + W(3, m)P(3n+1, m) \\ W(1, m)P(3n+2, m) + & (m = 5, 6) \\ W(2, m)P(3n, m) + W(3, m)P(3n+1, m) \end{cases}$$

Figure 17:
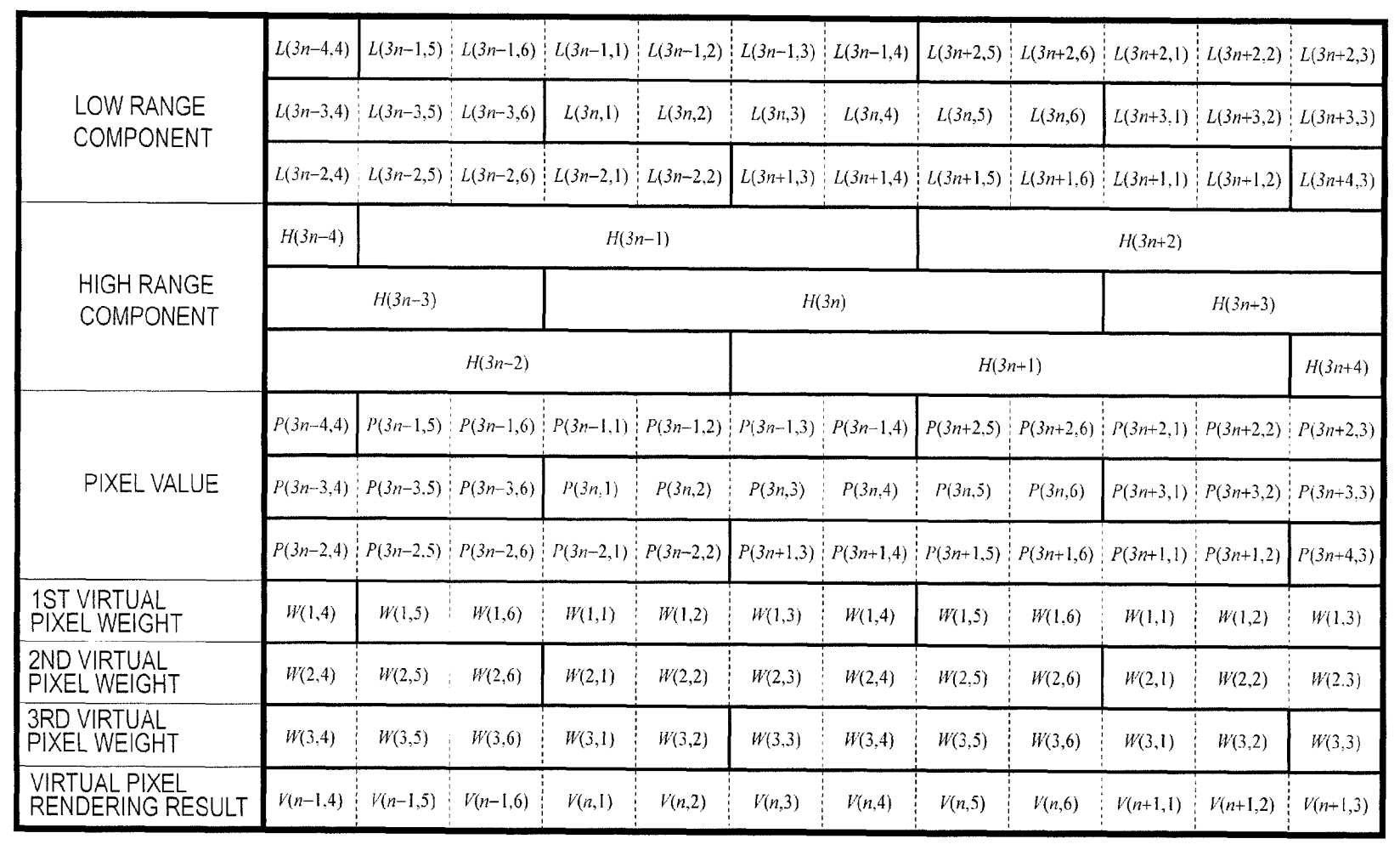

As described above regarding when there are two virtual pixels, n is the pixel position in the row direction, m is the sub pixel position in the pixel, L(n, m) is the low range component of the m'th primary color at the pixel position n, and H(n) is the high range component of the luminance at the pixel position n. P(n, m) is the pixel value calculated from L(n, m) and H(n), α is the emphasis coefficient of the high range component (usually, α=1), and W(g, m) is the weight (weight coefficient) of the m'th primary color in the g'th virtual pixel. FIG. 17 shows, regarding a part of a certain pixel row, the low range component, the high range component, the pixel value, the weight of each primary color in the first virtual pixel, the weight of each primary color in the second virtual pixel, the weight of each primary color in the third virtual pixel, and the rendering result obtained in consideration of the virtual pixels.

From the above expressions and FIG. 17, it is seen that the pixel values P(3n−2, m), P(3n−1, m) and P(3n, m), or P(3n−1, m), P(3n, m) and P(3n+1, m), or P(3n, m), P(3n+1, m) and P(3n+2, m), of three pixels on the input side are rendered for one pixel on the output side (represented by the rendering result V(n, m)) by the three virtual pixels. Namely, it is seen that information on three pixels on the input side can be displayed by one pixel on the output side.

Figure 19:
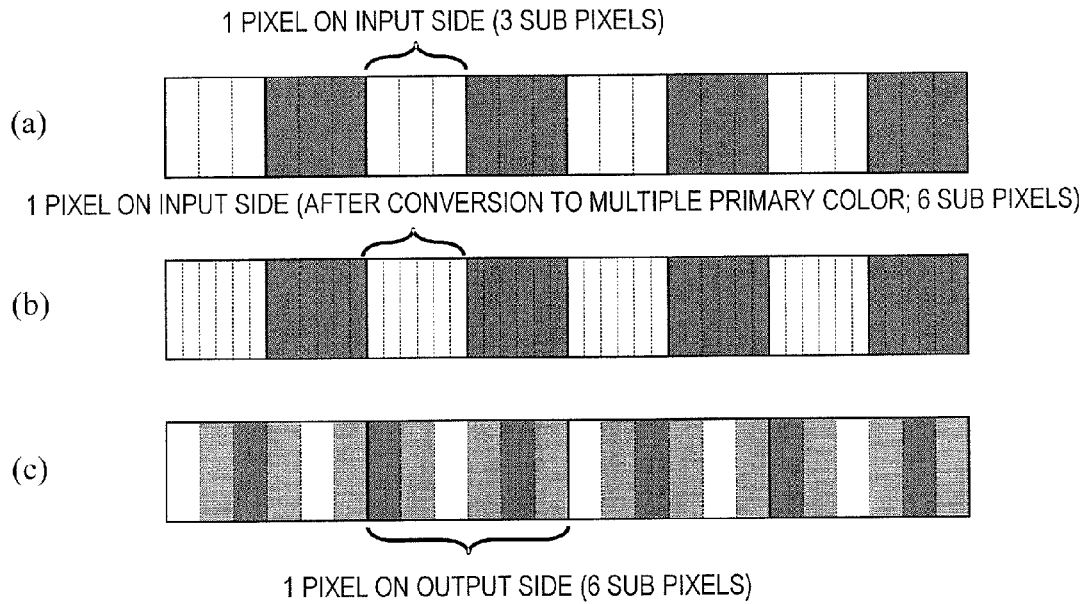
FIGS. 19(a), 19(b) and 19(c) schematically show a part of a certain pixel row represented by the rendering result shown in FIG. 18 on the input side, on the input side (after multiple primary coloring) and on the output side, respectively.

FIG. 18 shows the pixel value and the rendering result when the weight W(1, m) of the m'th primary color in the first virtual pixel, the weight W(2, m) of the m'th primary color in the second virtual pixel, and the weight W(3, m) of the m'th primary color in the third virtual pixel are set as shown in Table 2 below. FIGS. 19(*a*), 19(*b*) and 19(*c*) schematically show a part of a certain pixel row represented by the rendering result shown in FIG. 18 on the input side, on the input side (after multiple primary coloring) and on the output side, respectively.

TABLE 2

| m      | 1 | 2   | 3 | 4   | 5 | 6   |
|--------|---|-----|---|-----|---|-----|
| W(1, m)| 1 | 0.5 | 0 | 0   | 0 | 0.5 |
| W(2, m)| 0 | 0.5 | 1 | 0.5 | 0 | 0   |
| W(3, m)| 0 | 0   | 0 | 0.5 | 1 | 0.5 |

In the case where the weights are set as shown in Table 2, the first virtual pixel is formed of three sub pixels for displaying the first, second and sixth primary colors. The second virtual pixel is formed of three sub pixels for displaying the second, third and fourth primary colors. The third virtual pixel is formed of three sub pixels for displaying the fourth, fifth and sixth primary colors.

In the example shown in FIGS. 19(*a*) and 19(*c*), the size of the sub pixels on the output side is the same as the size of the sub pixels on the input side. Therefore, the number of pixels on the output side is ½ of the number of pixels on the input side. Without rendering, in order to display an image having a resolution higher than that of the image on the input side, the sub pixels on the output side would need to have a smaller size than that of the sub pixels on the input side after multiple primary coloring as shown in FIG. 19(*b*). However, owing to the rendering performed by use of three virtual pixels, as shown in FIG. 19(*c*), an image of a resolution higher than that on the input side can be displayed on the output side, on which the size of the sub pixels is the same as that on the input side and the number of pixel is ½ of that on the input side.

As described above, the rendering process performed in consideration of a plurality of virtual pixels for one pixel P can raise the display resolution. As can be seen from a comparison of the example shown in FIG. 16 and the example shown in FIG. 19, even when the same multiple primary color display panel 10 is used, the display resolution can be changed by the sorting pattern of the virtual pixels. Therefore, an appropriate resolution can be selected in accordance with the type of image to be input (contents) or the method for displaying the image (display on the entire display plane, reduction display, etc.).

Figure 20:
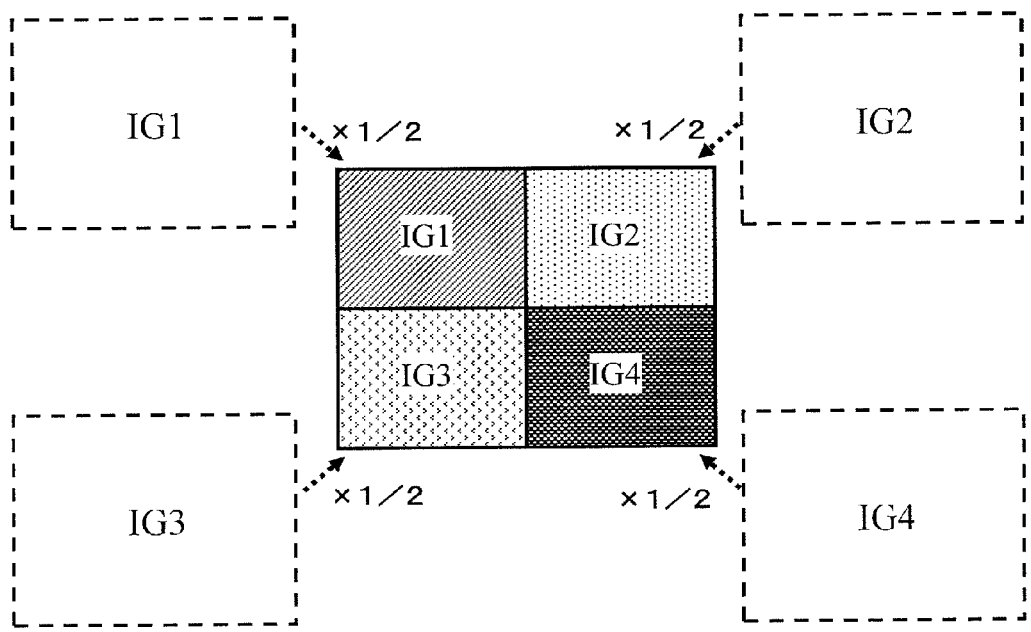
FIG. 20 shows an example of reduction display provided by use of a rendering process.
Figure 21:
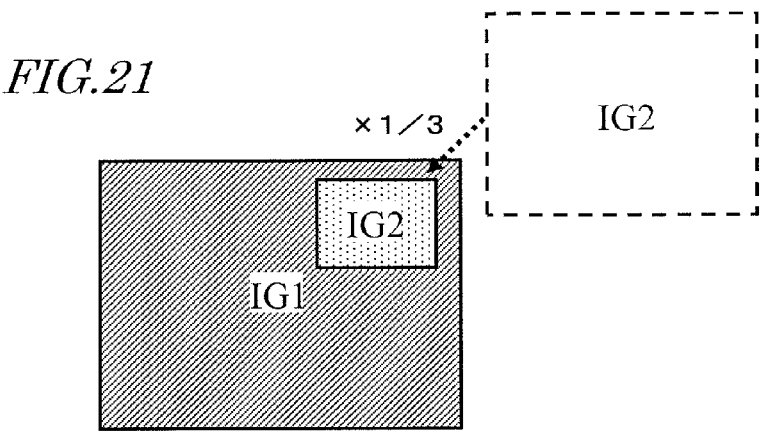
FIG. 21 shows an example of reduction display provided by use of the rendering process.

FIG. 20 and FIG. 21 each show an example of reduction display. In the example shown in FIG. 20, the display plane is divided into four areas of 2 rows by 2 columns, and four images IG1 through IG4 reduced to ½ are respectively shown in the four areas. In this example, a viewer can view images on the four display planes at the same time. In the example shown in FIG. 21, the image IG2 reduced to ⅓ is displayed so as to overlap a part of the image IG1 displayed on the entire display plane. In this example, a viewer can view an image on a main display plane while obtaining secondary information (e.g., whether forecast) on a sub display plane.

In the example shown in FIG. 20, the images IG1 through IG4 are each reduced to ½ both in the horizontal direction and the vertical direction. In the example shown in FIG. 21, the image IG2 is reduced to ⅓ both in the horizontal direction and the vertical direction. As already described above, in the case where a plurality of sub pixels are arrayed in one row by a plurality of columns in each pixel P (namely, arrayed in the horizontal direction), the resolution cannot be raised in the vertical direction. However, the resolving power of the human eye is lower for the vertical direction than for the horizontal direction. In addition, many videos created by an interlace system are provided by, for example, TV broadcasting or the like, and there are often less high frequency components in the vertical direction than those in the horizontal direction. For these reasons, even the rendering process is performed without considering the virtual pixels in the vertical direction, the ability of the human eye of sensing the resolution is not much influenced.

Now, a reason why a false color is caused when an n-pixel width line is displayed, and a reason why generation of the false color is suppressed by the liquid crystal display device 100 in this embodiment, will be described.

As already described above, a false color is generated when an n-pixel width line is displayed in an embodiment of raising the resolution to a level n times as high. Hereinafter, this will be described by way of a specific pixel structure (sub pixel array).

Figure 22:
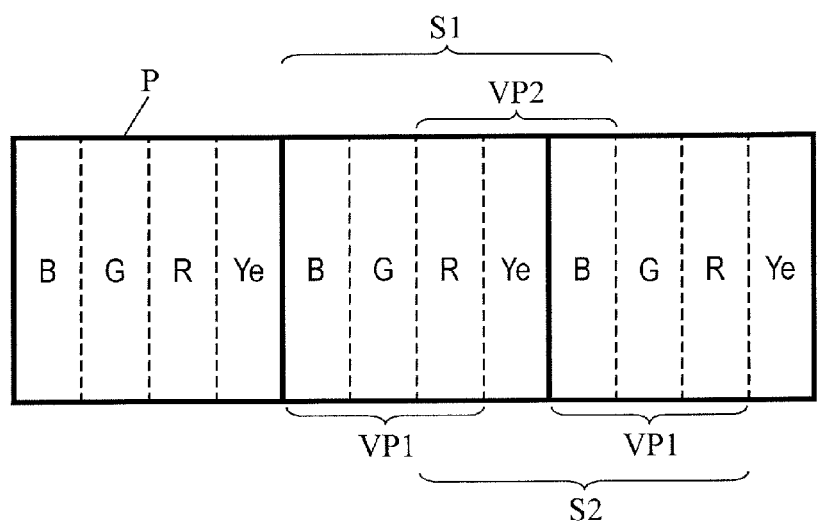
FIG. 22 is provided to explain why a false color is generated when an n-pixel width line is displayed.

In an example shown in FIG. 22, each pixel P is formed of a red sub pixel R, a green sub pixel G, a blue sub pixel B, and a yellow sub pixel Ye. In each pixel P, these sub pixels are located in the order of the blue sub pixel B, the green sub pixel G, the red sub pixel R and the yellow sub pixel Ye from left to right in the row direction. It is assumed that in this arrangement, the first virtual pixel VP1 is formed of the blue sub pixel B, the green sub pixel G and the red sub pixel R, and the second virtual pixel VP2 is formed of the red sub pixel R, the yellow sub pixel Ye and the blue sub pixel B. In this structure, the resolution in the horizontal direction is raised to a level twice as high.

In this case, a 2-pixel width line is displayed by a first sub pixel set S1 formed of the blue sub pixel B, the green sub pixel G, the red sub pixel R, the yellow sub pixel Ye and the blue sub pixel B located in this order (i.e., in the order of BGRYeB) from left to right, or by a second sub pixel set S2 formed of the red sub pixel R, the yellow sub pixel Ye, the blue sub pixel B, the green sub pixel G and the red sub pixel R in this order (i.e., in the order of RYeBGR) from left to right.

Therefore, at both of two ends, in the width direction, of the 2-pixel width line, sub pixels for displaying the same primary color are located. Specifically, when the 2-pixel width line is displayed by use of the first sub pixel set S1, two blue sub pixels B are located at both ends in the width direction. When the 2-pixel width line is displayed by use of the second sub pixel set S2, two red sub pixels R are located at both ends in the width direction. In this manner, the sub pixels for displaying the same primary color are located at both ends, in the width direction, of the 2-pixel width line, and thus this primary color is perceived as a false color. Specifically, when the 2-pixel width line is displayed by use of the first sub pixel set S1, the 2-pixel width line is tinted blue. When the 2-pixel width line is displayed by use of the second sub pixel set S2, the 2-pixel width line is tinted red.

Even when the pixel structure (sub pixel arrangement) is the same, if the sorting pattern to the virtual pixels is different, the pattern in which the false color is generated is different. In an example shown in FIG. 23, like in the example shown in FIG. 22, each pixel P is formed of a red sub pixel R, a green sub pixel G, a blue sub pixel B, and a yellow sub pixel Ye. In each pixel P, these sub pixels are located in the order of the blue sub pixel B, the green sub pixel G, the red sub pixel R and the yellow sub pixel Ye from left to right in the row direction. The first virtual pixel VP1 is formed of the blue sub pixel B, the green sub pixel G and the red sub pixel R, but the second virtual pixel VP2 is formed of the yellow sub pixel Ye and the blue sub pixel B.

In this case, a 2-pixel width line is displayed by a first sub pixel set S1 formed of the blue sub pixel B, the green sub pixel G, the red sub pixel R, the yellow sub pixel Ye and the blue sub pixel B located in this order (i.e., in the order of BGRYeB) from left to right, or by a second sub pixel set S2 formed of the yellow sub pixel Ye, the blue sub pixel B, the green sub pixel G and the red sub pixel R in this order (i.e., in the order of YeBGR) from left to right.

When the 2-pixel width line is displayed by use of the first sub pixel set S1, two blue sub pixels B are located at both ends in the width direction. Therefore, a false color is perceived (the 2-pixel width line is tinted blue). By contrast, when the 2-pixel width line is displayed by use of the second sub pixel set S2, the yellow sub pixel Ye and the red sub pixels R are respectively located at both ends in the width direction. Therefore, no false color is perceived.

Figure 23:
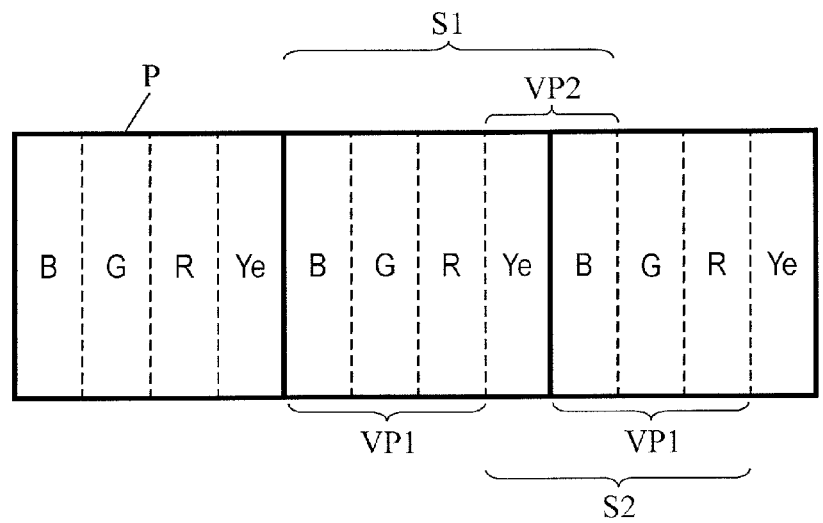
FIG. 23 is provided to explain why a false color is generated when an n-pixel width line is displayed.

FIG. 22 and FIG. 23 each show a pixel structure formed of four sub pixels for displaying four primary colors respectively. A false color is also generated with other pixel structures.

Figure 24:
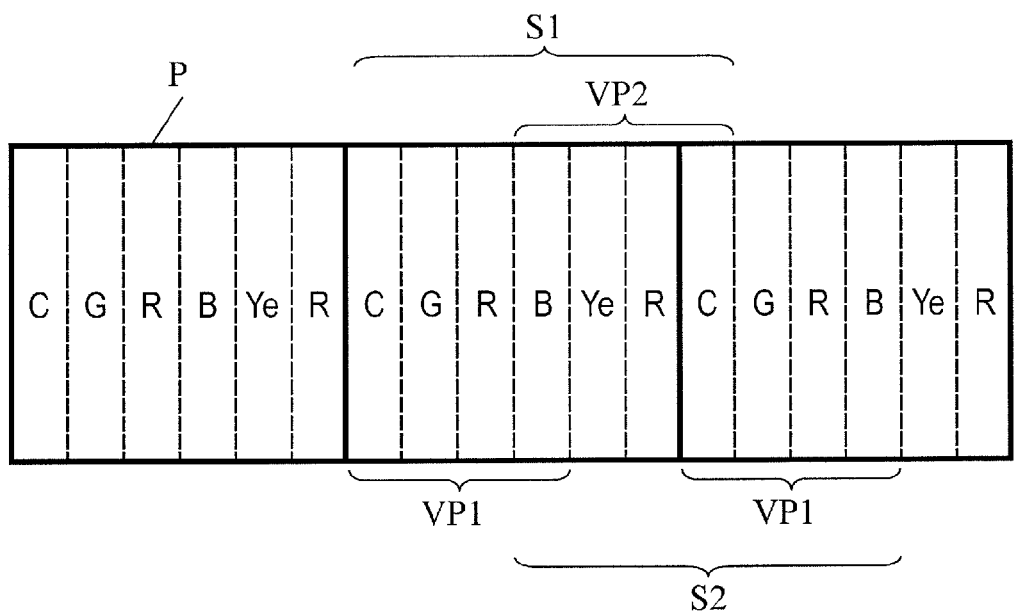
FIG. 24 is provided to explain why a false color is generated when an n-pixel width line is displayed.

In an example shown in FIG. 24, each pixel P is formed of two red sub pixels R, a green sub pixel G, a blue sub pixel B, a cyan sub pixel C, and a yellow sub pixel Ye. In each pixel P, these sub pixels are located in the order of the cyan sub pixel C, the green sub pixel G, the red sub pixel R, the blue sub pixel B, the yellow sub pixel Ye and the red sub pixel R from left to right in the row direction. It is assumed that in this arrangement, the first virtual pixel VP1 is formed of the cyan sub pixel C, the green sub pixel G, the red sub pixel R and the blue sub pixel B, and the second virtual pixel VP2 is formed of the blue sub pixel B, the yellow sub pixel Ye, the red sub pixel R and the cyan sub pixel C. In this structure, the resolution in the horizontal direction is raised to a level twice as high.

In this case, a 2-pixel width line is displayed by a first sub pixel set S1 formed of the cyan sub pixel C, the green sub pixel G, the red sub pixel R, the blue sub pixel B, the yellow sub pixel Ye, the red sub pixel R and the cyan sub pixel C located in this order (i.e., in the order of CGRBYeRC) from left to right, or by a second sub pixel set S2 formed of the blue sub pixel B, the yellow sub pixel Ye, the red sub pixel R, the cyan sub pixel C, the green sub pixel G, the red sub pixel R and the blue sub pixel B in this order (i.e., in the order of BYeRCGRB) from left to right.

Therefore, at both of two ends, in the width direction, of the 2-pixel width line, sub pixels for displaying the same primary color are located. Specifically, when the 2-pixel width line is displayed by use of the first sub pixel set S1, two cyan sub pixels C are located at both ends in the width direction. When the 2-pixel width line is displayed by use of the second sub pixel set S2, two blue sub pixels B are located at both ends in the width direction. In this manner, the sub pixels for displaying the same primary color are located at both ends, in the width direction, of the 2-pixel width line, and thus this primary color is perceived as a false color. Specifically, when the 2-pixel width line is displayed by use of the first sub pixel set S1, the 2-pixel width line is tinted cyan. When the 2-pixel width line is displayed by use of the second sub pixel set S2, the 2-pixel width line is tinted blue.

Figure 25:
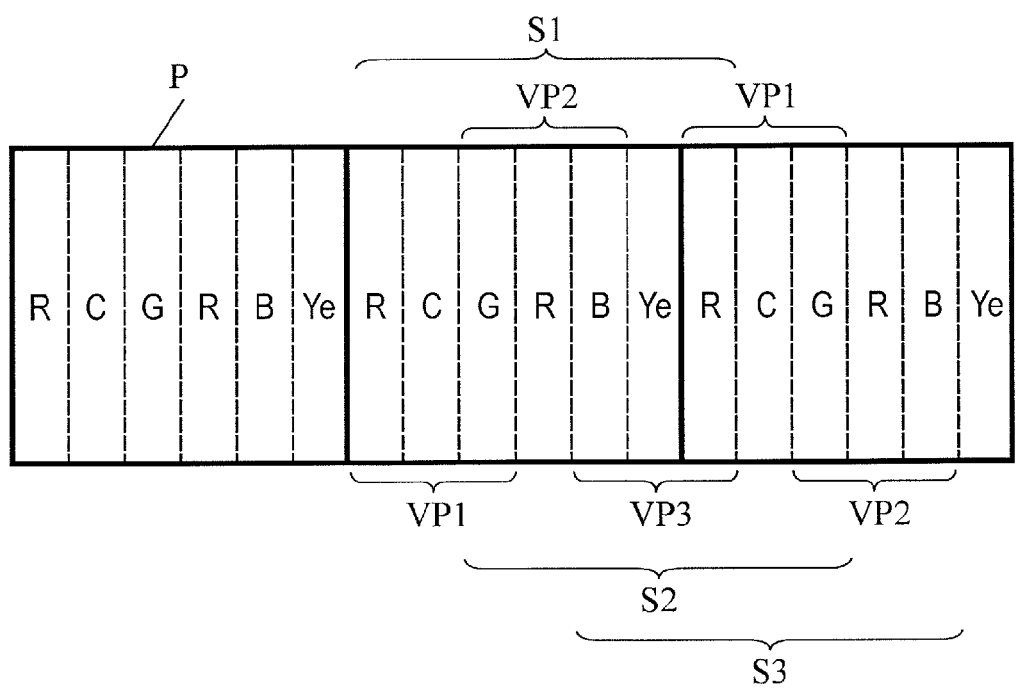
FIG. 25 is provided to explain why a false color is generated when an n-pixel width line is displayed.

In an example shown in FIG. 25, each pixel P is formed of two red sub pixels R, a green sub pixel G, a blue sub pixel B, a cyan sub pixel C, and a yellow sub pixel Ye. In each pixel P, these sub pixels are located in the order of the red sub pixel R, the cyan sub pixel C, the green sub pixel G, the red sub pixel R, the blue sub pixel B and the yellow sub pixel Ye from left to right in the row direction. It is assumed that in this arrangement, the first virtual pixel VP1 is formed of the red sub pixel R, the cyan sub pixel C and the green sub pixel G, the second virtual pixel VP2 is formed of the green sub pixel G, the red sub pixel R and the blue sub pixel B, and the third virtual pixel VP3 is formed of the blue sub pixel B, the yellow sub pixel Ye and the red sub pixel R. In this structure, the resolution in the horizontal direction is raised to a level three times as high.

In this case, a 3-pixel width line is displayed by a first sub pixel set S1 formed of the red sub pixel R, the cyan sub pixel C, the green sub pixel G, the red sub pixel R, the blue sub pixel B, the yellow sub pixel Ye and the red sub pixel R located in this order (i.e., in the order of RCGRBYeR) from left to right, by a second sub pixel set S2 formed of the green sub pixel G, the red sub pixel R, the blue sub pixel B, the yellow sub pixel Ye, the red sub pixel R, the cyan sub pixel C and the green sub pixel G in this order (i.e., in the order of GRBYeRCG) from left to right, or by a third sub pixel set S3 formed of the blue sub pixel B, the yellow sub pixel Ye, the red sub pixel R, the cyan sub pixel C, the green sub pixel G, the red sub pixel R and the blue sub pixel B in this order (i.e., in the order of BYeRCGRB) from left to right.

Therefore, at both of two ends, in the width direction, of the 3-pixel width line, sub pixels for displaying the same primary color are located. Specifically, when the 3-pixel width line is displayed by use of the first sub pixel set S1, two red sub pixels R are located at both ends in the width direction. When the 3-pixel width line is displayed by use of the second sub pixel set S2, two green pixels G are located at both ends in the width direction. When the 3-pixel width line is displayed by use of the third sub pixel set S3, two blue pixels B are located at both ends in the width direction. In this manner, the sub pixels for displaying the same primary color are located at both ends, in the width direction, of the 3-pixel width line, and thus this primary color is perceived as a false color. Specifically, when the 3-pixel width line is displayed by use of the first sub pixel set S1, the 3-pixel width line is tinted red. When the 3-pixel width line is displayed by use of the second sub pixel set S2, the 3-pixel width line is tinted green. When the 3-pixel width line is displayed by use of the third sub pixel set S3, the 3-pixel width line is tinted blue.

Figure 26:
FIG. 26 shows an example of input image.

The above-described 2-pixel width line or 3-pixel width line is often displayed when an input image signal IIG includes a letter as shown in FIG. 26. The input image signal IIG shown in FIG. 26 includes a black letter on a white background. In this case, the 2-pixel width line or the 3-pixel width line is displayed as a black line.

Figure 27:
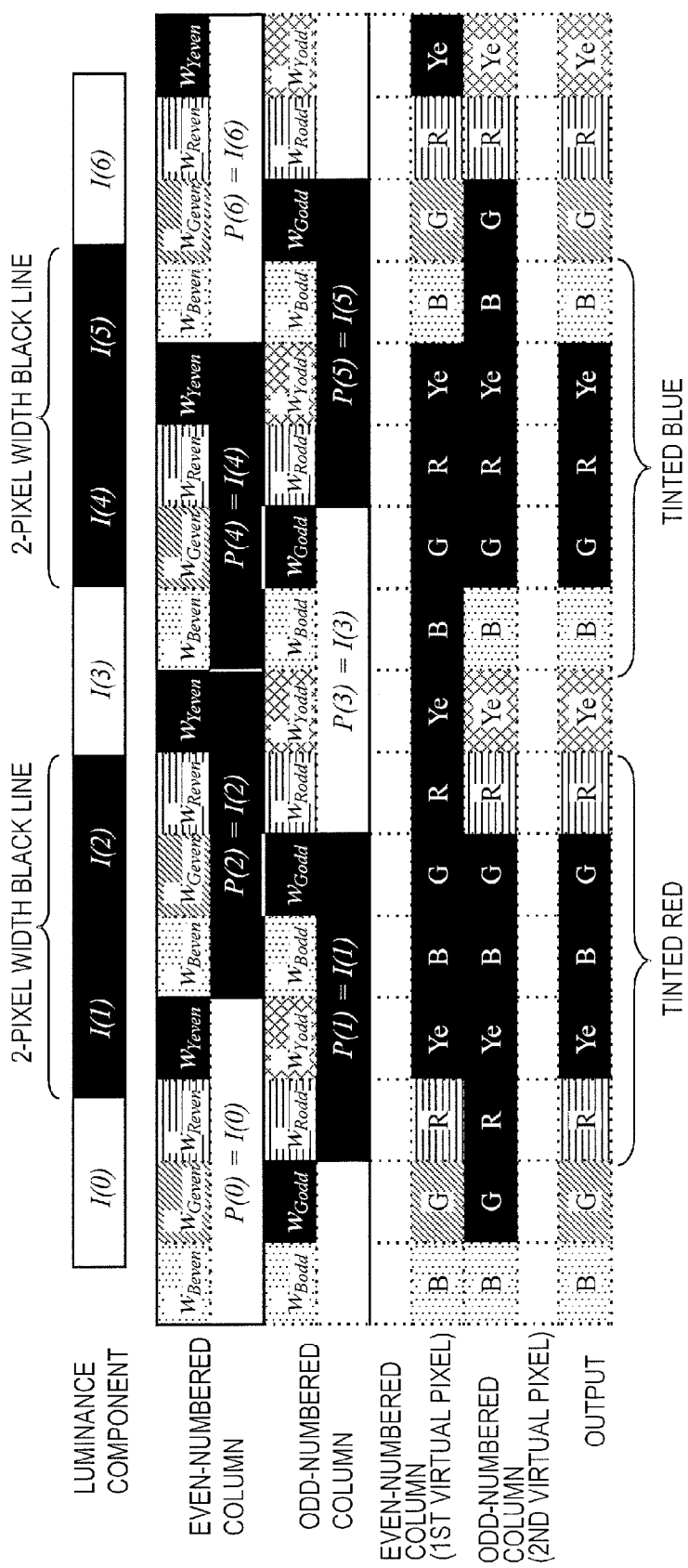
FIG. 27 schematically shows rendering results when a black line having a 2-pixel width is displayed on a white background in the case where the pixel structure and the sorting pattern shown in FIG. 22 are adopted.

FIG. 27 schematically shows rendering results obtained when a black line having a 2-pixel width is displayed on a white background in the case where the pixel structure and the sorting pattern shown in FIG. 22 are adopted.

Referring to FIG. 27, I(n) is a luminance component (luminance signal generated by the luminance conversion section 22a) at the pixel position n. For simplifying the explanation, it is assumed that the multiple primary color conversion section 21b for converting a three-primary-color achromatic color signal R(n)=G(n)=B(n) (=I(n)) into a four-primary-color achromatic color signal P(n, 1)=P(n, 2)=P(n, 3)=P(n, 4) is used. In the case where the input image does not have a color component (e.g., an input image including a black letter on a white background as shown in FIG. 26), the luminance component I(n) and the pixel values P(n, 1), P(n, 2), P(n, 3), P(n, 4) have the relationship of I(n)=P(n, 1)=P(n, 2)=P(n, 3)=P(n, 4). Therefore, in FIG. 27, P(n, 1), P(n, 2), P(n, 3) and P(n, 4), which are equal to one another, are simply represented as P(n). Herein, the luminance components I(0), I(3) and I(6) at the pixel positions 0, 3 and 6 are 1, and the luminance components I(1), I(2), I(4) and I(5) at the pixel positions 1, 2, 4 and 5 are 0.

The resolution in the horizontal direction is raised to a level twice as high. Therefore, the first virtual pixel VP1 (formed of the blue sub pixel B, the green sub pixel G and the red sub pixel R) provides display corresponding to the luminance components of even-numbered columns, and the second virtual pixel VP2 (formed of the red sub pixel R, the yellow sub pixel Ye and the blue sub pixel B) provides display corresponding to the luminance components of odd-numbered columns. Therefore, in FIG. 27, the weights of red, green, blue and yellow in the first virtual pixel VP1 are represented as $W_{Reven}$, $W_{Geven}$, $W_{Beven}$ and $W_{Yeven}$. The weights of red, green, blue and yellow in the second virtual pixel VP2 are represented as $W_{Rodd}$, $W_{Godd}$, $W_{Bodd}$ and $W_{Yodd}$. Since the yellow sub pixel Ye is not included in the first virtual pixel VP1, the weight of yellow in the first virtual pixel VP1, namely, $W_{Yeven}$, is 0. Since the green sub pixel G is not included in the second virtual pixel VP2, the weight of green in the second virtual pixel VP2, namely, $W_{Godd}$, is also 0.

In the example shown in FIG. 27, the 2-pixel width black line at the pixel positions 1 and 2 of the input image is displayed by use of the RYeBGR sub pixel set at a final stage, namely, on the output side. In this case, the two red sub pixels R located at both ends, in the width direction, of the black line is lit up, and therefore the black line is tinted red. The 2-pixel width black line at the pixel positions 4 and 5 of the input image is displayed by use of the BGRYeB sub pixel set at a final stage, namely, on the output side. In this case, the two blue sub pixels B located at both ends, in the width direction, of the black line is lit up, and therefore the black line is tinted blue.

In this example, black lines are displayed. Generation of a false color is not limited to such a case, and a false color is generated when, for example, a white line is displayed.

When an n-pixel width line is to be displayed, the liquid crystal display device 100 in this embodiment provides display such that two sub pixels which are located at both of two ends, in the width direction, of the n-pixel width line and which display a certain identical primary color are displayed so as to have a luminance lower than the luminance that the two sub pixels originally have. Owing to this, the above-described tinting of the n-pixel width line (generation of a false color) is suppressed.

Hereinafter, a process for suppressing a false color (function of the false color suppression processing section 23) will be described in more detail.

Figure 28:
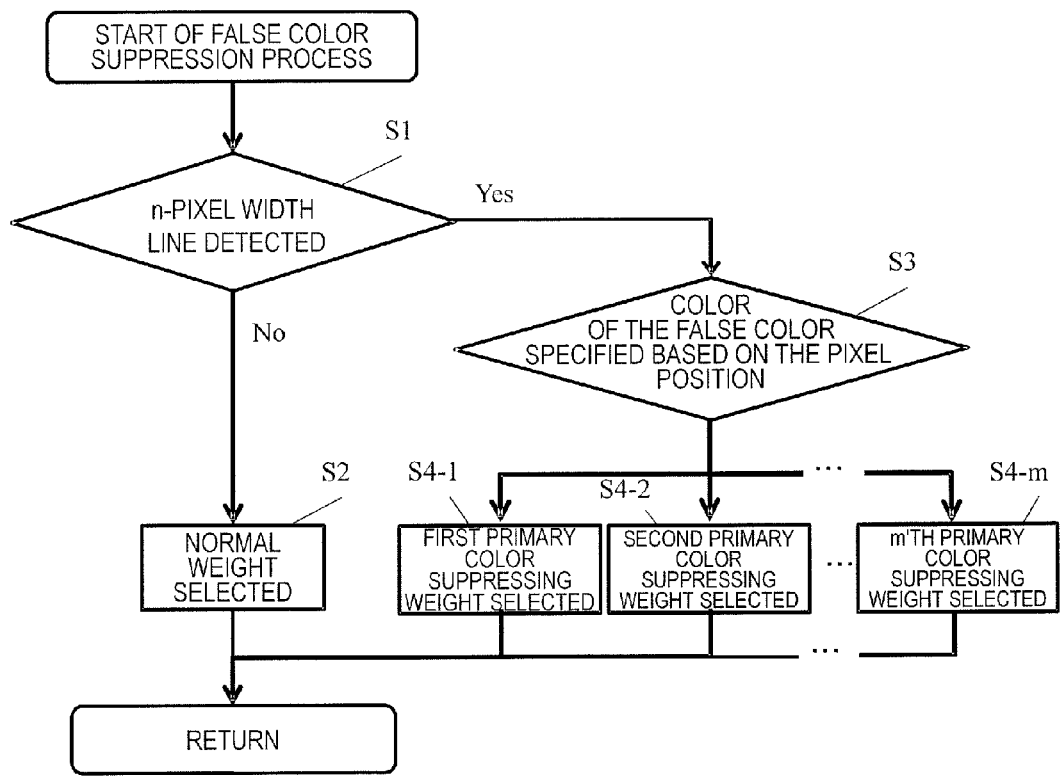
FIG. 28 is a flowchart showing an example of false color suppression process.

FIG. 28 shows an example of false color suppression process. At the start of the false color suppression process, an n-pixel width line is detected (step S1). Step S1 is performed by the detection section 23a of the false color suppression processing section 23.

When no n-pixel width line is detected, a normal weight is selected (step S2). By contrast, an n-pixel width line is detected, the color of the false color is specified based on the pixel position at which the n-pixel width line is detected (step S3). A weight for suppressing the false color of the specified color (primary color) is selected (steps S4-1 through S4-m). Steps S2, S3 and S4-1 through S4-m are performed by the weight selection section 23b of the false color suppression processing section 23.

Now, techniques for detecting the n-pixel width line, the weight for suppressing the false color and the like will be described in more detail by way of specific pixel structures (sub pixel arrangements).

EXAMPLE 1

4 Primary Colors, 4 Sub Pixels, 2 Virtual Pixels

Figure 29:
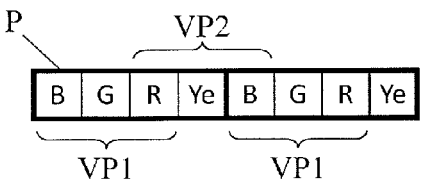
FIG. 29 shows a pixel structure (sub pixel arrangement) in Example 1.

FIG. 29 shows a pixel structure in Example 1. In the example shown in FIG. 29, each pixel P is formed of four sub pixels, specifically, a red sub pixel R, a green sub pixel G, a blue sub pixel B, and a yellow sub pixel Ye. In each pixel P, these sub pixels are located in the order of the blue sub pixel B, the green sub pixel G, the red sub pixel R and the yellow sub pixel Ye from left to right in the row direction. The first virtual pixel VP1 is formed of the blue sub pixel B, the green sub pixel G and the red sub pixel R, and the second virtual pixel VP2 is formed of the red sub pixel R, the yellow sub pixel Ye and the blue sub pixel B. In this case, the sub pixel shared by the first virtual pixel VP1 and the second virtual pixel VP2 is the red sub pixel R or the blue sub pixel B. Therefore, a red or blue false color may be generated.

The detection of the n-pixel width line (namely, detection of an area in which a false color is generated) can be performed by executing convolution (convolution operation) on the luminance component I(n) (luminance signal generated by the luminance conversion section 22a) by use of a prescribed filter and checking a response thereto.

Figure 30:
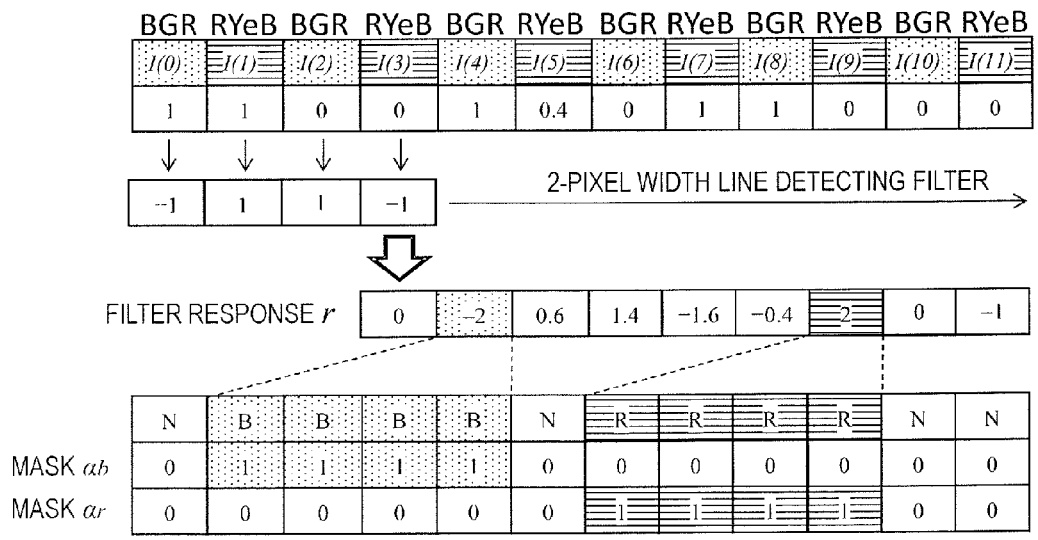
FIG. 30 shows a filter response r in the case where a [−1 1 1 −1] filter is used as a filter for detecting a 2-pixel width line in Example 1.

FIG. 30 shows a filter response r when a [−1 1 1 −1] filter is used as a filter for detecting (extracting) a 2-pixel width line. When the absolute value of the filter response r exceeds a prescribed threshold value th (i.e., |r|>th), it can be regarded that a false color is to be generated (perceived). Herein, the threshold value th is set to 1.75.

In the example shown in FIG. 30, the filter response r corresponding to an area of I(1) through I(4) is −2 (=1·(−1)+0·1+0·1+1·(−1)). Therefore, it is seen that a blue false color is generated in this area (namely, that a 2-pixel width black line corresponding to I(2) and I(3) is tinted blue). The filter response r corresponding to an area of I(6) through I(9) is 2 (=0·(−1)+1·1+1·1+0·(−1)). Therefore, it is seen that a red false color is generated in this area (namely, that a 2-pixel width white line corresponding to I(7) and I(8) is tinted red).

In this manner, areas in which false colors are to be generated are specified, and values of masks $\alpha_b$ and $\alpha_r$ indicating such areas are set. Herein, an area in which a blue false color is to be generated (areas labeled with "B" in FIG. 30), the value of mask $\alpha_b$ is set to 1. For an area in which a red false color is to be generated (area labeled with "R" in FIG. 30), the value of mask $\alpha_r$ is set to 1. For areas in which no false color is to be generated (areas labeled with "N" in FIG. 30), the values of masks $\alpha_b$ and $\alpha_r$ are set to 0.

After the values of masks $\alpha_b$ and $\alpha_r$ are set in this manner, a weight in consideration of each false color (weight obtained by correcting the normal weight) is calculated. The resultant weight may be used for the rendering process.

Regarding the first virtual pixel VP1 (corresponding to the luminance components of the even-numbered columns), the normal weight vector, the weight vector for suppressing the blue false color, the weight vector for suppressing the red false color, and the post-correction weight vector are represented as shown in Table 3.

TABLE 3

FIRST VIRTUAL PIXEL (CORRESPONDING TO EVEN-NUMBERED COLUMNS)

| NORMAL WEIGHT VECTOR | WEIGHT VECTOR FOR SUPPRESSING BLUE FALSE COLOR | WEIGHT VECTOR FOR SUPPRESSING RED FALSE COLOR | POST-CORRECTION WEIGHT VECTOR |
|---|---|---|---|
| $\begin{bmatrix} w_{Beven} \\ w_{Geven} \\ w_{Reven} \\ w_{Yeven} \end{bmatrix}$ | $\begin{bmatrix} w_{B,Beven} \\ w_{B,Geven} \\ w_{B,Reven} \\ w_{B,Yeven} \end{bmatrix}$ | $\begin{bmatrix} w_{R,Beven} \\ w_{R,Geven} \\ w_{R,Reven} \\ w_{R,Yeven} \end{bmatrix}$ | $\begin{bmatrix} w'_{Beven} \\ w'_{Geven} \\ w'_{Reven} \\ w'_{Yeven} \end{bmatrix}$ |

Regarding the second virtual pixel VP2 (corresponding to the luminance components of the odd-numbered columns), the normal weight vector, the weight vector for suppressing the blue false color, the weight vector for suppressing the red false color, and the post-correction weight vector are represented as shown in Table 4.

TABLE 4

SECOND VIRTUAL PIXEL (CORRESPONDING TO ODD-NUMBERED COLUMNS)

| NORMAL WEIGHT VECTOR | WEIGHT VECTOR FOR SUPPRESSING BLUE FALSE COLOR | WEIGHT VECTOR FOR SUPPRESSING RED FALSE COLOR | POST-CORRECTION WEIGHT VECTOR |
|---|---|---|---|
| $\begin{bmatrix} w_{Bodd} \\ w_{Godd} \\ w_{Rodd} \\ w_{Yodd} \end{bmatrix}$ | $\begin{bmatrix} w_{B,Bodd} \\ w_{B,Godd} \\ w_{B,Rodd} \\ w_{B,Yodd} \end{bmatrix}$ | $\begin{bmatrix} w_{R,Bodd} \\ w_{R,Godd} \\ w_{R,Rodd} \\ w_{R,Yodd} \end{bmatrix}$ | $\begin{bmatrix} w'_{Bodd} \\ w'_{Godd} \\ w'_{Rodd} \\ w'_{Yodd} \end{bmatrix}$ |

In this case, the post-correction weight vector for the first virtual pixel VP1 and the post-correction weight vector for the second virtual pixel VP2 are represented by the following expressions.

$$\begin{bmatrix} w'_{B\,even} \\ w'_{G\,even} \\ w'_{R\,even} \\ w'_{Y\,even} \end{bmatrix} = $$

[Expression 3]

$$(1-\alpha_b-\alpha_r)\begin{bmatrix} w_{B\,even} \\ w_{G\,even} \\ w_{R\,even} \\ w_{Y\,even} \end{bmatrix} + \alpha_b \begin{bmatrix} w_{B,B\,even} \\ w_{B,G\,even} \\ w_{B,R\,even} \\ w_{B,Y\,even} \end{bmatrix} + \alpha_r \begin{bmatrix} w_{R,B\,even} \\ w_{R,G\,even} \\ w_{R,R\,even} \\ w_{R,Y\,even} \end{bmatrix}$$

$$\begin{bmatrix} w'_{B\,odd} \\ w'_{G\,odd} \\ w'_{R\,odd} \\ w'_{Y\,odd} \end{bmatrix} = (1-\alpha_b-\alpha_r)\begin{bmatrix} w_{B\,odd} \\ w_{G\,odd} \\ w_{R\,odd} \\ w_{Y\,odd} \end{bmatrix} +$$

$$\alpha_b \begin{bmatrix} w_{B,B\,odd} \\ w_{B,G\,odd} \\ w_{B,R\,odd} \\ w_{B,Y\,odd} \end{bmatrix} + \alpha_r \begin{bmatrix} w_{R,B\,odd} \\ w_{R,G\,odd} \\ w_{R,R\,odd} \\ w_{R,Y\,odd} \end{bmatrix}$$

It is preferable that the weight vector for suppressing a false color is set such that, for example, primary color components thereof for generating the false color are about half of that of the normal weight vector. The weight vector for suppressing the blue false color and the weight vector for suppressing the red false color for the first virtual pixel VP1 and the second virtual pixel VP2 are represented by, for example, the following expressions.

$$\begin{bmatrix} w_{B,B\,even} \\ w_{B,G\,even} \\ w_{B,R\,even} \\ w_{B,Y\,even} \end{bmatrix} = \begin{bmatrix} w_{B\,even}/2 \\ w_{G\,even} \\ w_{R\,even} \\ w_{Y\,even} \end{bmatrix}$$

[Expression 4]

$$\begin{bmatrix} w_{R,B\,even} \\ w_{R,G\,even} \\ w_{R,R\,even} \\ w_{R,Y\,even} \end{bmatrix} = \begin{bmatrix} w_{B\,even} \\ w_{G\,even} \\ w_{R\,even}/2 \\ w_{Y\,even} \end{bmatrix}$$

$$\begin{bmatrix} w_{B,B\,odd} \\ w_{B,G\,odd} \\ w_{B,R\,odd} \\ w_{B,Y\,odd} \end{bmatrix} = \begin{bmatrix} w_{B\,odd}/2 \\ w_{G\,odd} \\ w_{R\,odd} \\ w_{Y\,odd} \end{bmatrix}$$

$$\begin{bmatrix} w_{R,B\,odd} \\ w_{R,G\,odd} \\ w_{R,R\,odd} \\ w_{R,Y\,odd} \end{bmatrix} = \begin{bmatrix} w_{B\,odd} \\ w_{G\,odd} \\ w_{R\,odd}/2 \\ w_{Y\,odd} \end{bmatrix}$$

Depending on the set threshold value th, it may be possibly determined that false colors of a plurality of primary colors are to be generated (namely, $\alpha_b$ and $\alpha_r$ are to become 1 at the same time in a certain area). In the case where the weight vector for suppressing a false color is set by decreasing only the weight corresponding to the false color to be suppressed as represented by the expressions above, there is no problem.

By contrast, in the case where the weight vector for suppressing a false color is set by also changing a weight other than the weight corresponding to the false color to be suppressed (in the case where, for example, for suppressing a blue false color, the weight of green or yellow adjoining blue are also changed in addition to the weight of blue), the following may occur. When it is determined that a plurality of false colors are to be generated at the same time, a plurality of false color suppression processes interfere with each other and thus a preferable result may not be obtained. In such a case, it is preferable that the detection section 23a prioritizes the detection result on the maximum filter response r.

Figure 31:
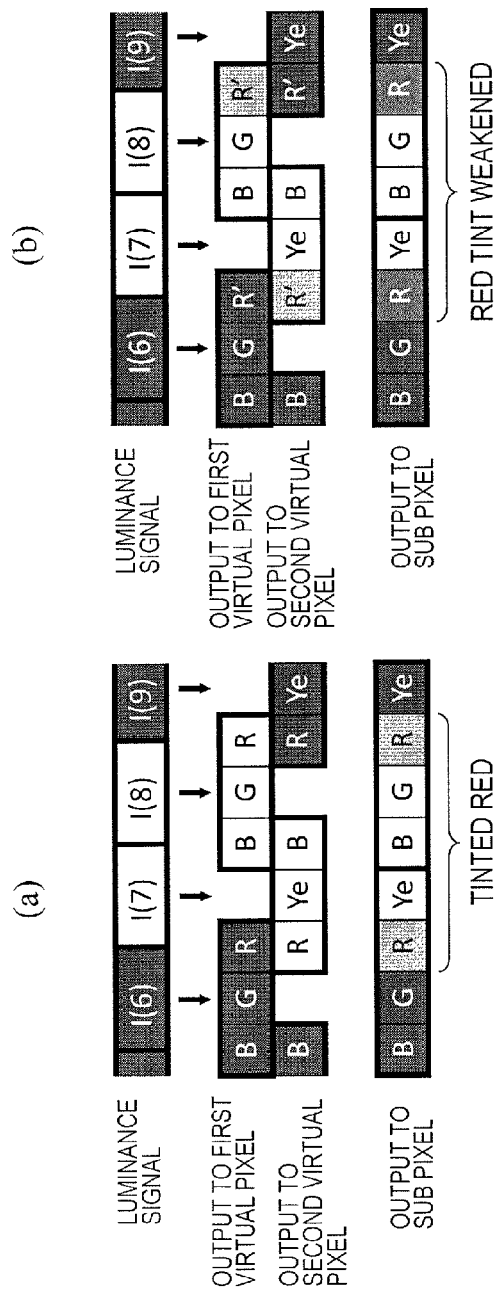
FIG. 31 shows the relationship among the luminance signal, the outputs to the plurality of virtual pixels, and the final output to each sub pixel; (a) shows such a relationship when a process for suppressing a false color is not performed, and (b) shows such a relationship when a process for suppressing a false color is performed.

FIGS. 31(a) and 31(b) show the relationship among the luminance signal, the outputs to the first virtual pixel VP1 and the second virtual pixel VP2, and the final output to the sub pixel. FIG. 31(a) shows such a relationship when a process for suppressing a false color is not performed (namely, when only the normal weight is kept being used). FIG. 31(b) shows such a relationship when a process for suppressing a false color is performed (namely, when the post-correction weight is used).

When the process for suppressing a false color is not performed, as shown in FIG. 31(a), a red output is made to each of the first virtual pixel VP1 and the second virtual pixel VP2 as routinely performed (represented as "R" in the figure). Therefore, when a final output to the sub pixel is made, the 2-pixel width line is tinted red. By contrast, when the process for suppressing a false color is performed, as shown in FIG. 31(b), the red output made to each of the first virtual pixel VP1 and the second virtual pixel VP2 is decreased as compared with the output routinely made (represented as "R'" in the figure). Therefore, when a final output to the sub pixel is made, the luminance of the red sub pixel R is lower than the luminance which would otherwise be exhibited. As a result, the red tint of the 2-pixel width line is weakened and the false color is less likely to be perceived.

EXAMPLE 2

4 Primary Colors; 4 Sub Pixels; 2 Virtual Pixels

Figure 32:
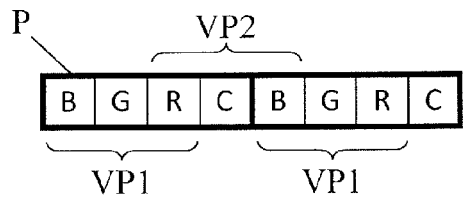
FIG. 32 shows a pixel structure (sub pixel arrangement) in Example 2.

FIG. 32 shows a pixel structure in Example 2. In the example shown in FIG. 32, each pixel P is formed of four sub pixels, specifically, a red sub pixel R, a green sub pixel G, a blue sub pixel B, and a cyan sub pixel C. In each pixel P, these sub pixels are located in the order of the blue sub pixel B, the green sub pixel G, the red sub pixel R and the cyan sub pixel C from left to right in the row direction. The first virtual pixel VP1 is formed of the blue sub pixel B, the green sub pixel G and the red sub pixel R, and the second virtual pixel VP2 is formed of the red sub pixel R, the cyan sub pixel C and the blue sub pixel B. In this case, the sub pixel shared by the first virtual pixel VP1 and the second virtual pixel VP2 is the red sub pixel R or the blue sub pixel B. Therefore, a red or blue false color may be generated.

Figure 33:
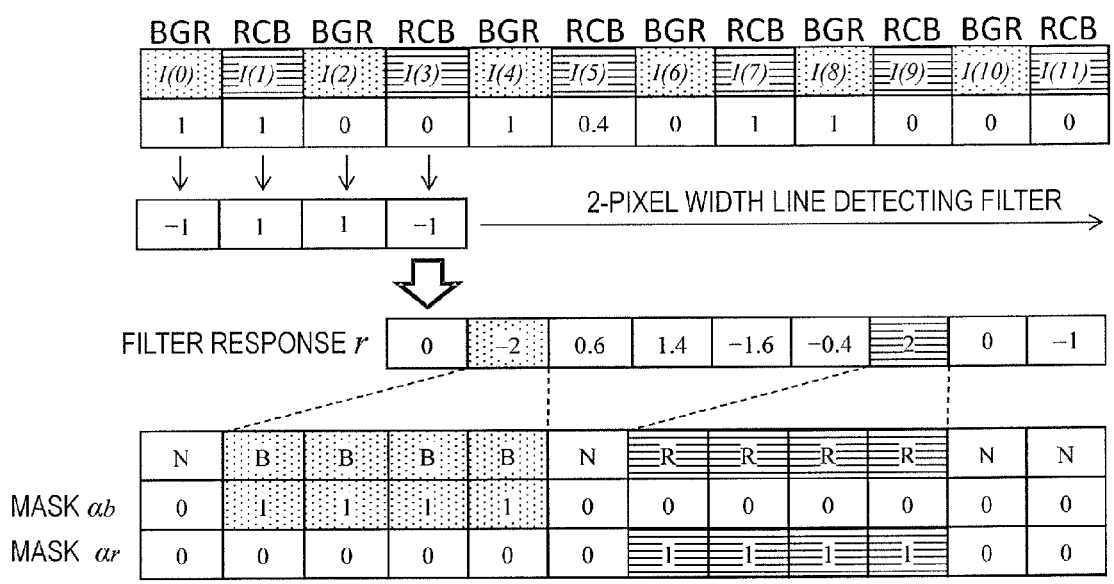
FIG. 33 shows a filter response r in the case where a [−1 1 1 −1] filter is used as a filter for detecting a 2-pixel width line in Example 2.

FIG. 33 shows a filter response r when a [−1 1 1 −1] filter is used as a filter for detecting a 2-pixel width line. Herein, the threshold value th is set to 1.75.

In the example shown in FIG. 33, the filter response r corresponding to an area of I(1) through I(4) is −2 (=1·(−1)+ 0·1+0·1+1·(−1)). Therefore, it is seen that a blue false color is generated in this area (namely, that a 2-pixel width black line corresponding to I(2) and I(3) is tinted blue). The filter response r corresponding to an area of I(6) through I(9) is 2 (=0·(−1)+1·1+1·1+0·(−1)). Therefore, it is seen that a red false color is generated in this area (namely, that a 2-pixel width white line corresponding to I(7) and I(8) is tinted red).

In this manner, areas in which false colors are to be generated are specified, and values of masks $\alpha_b$ and $\alpha_r$ indicating such areas are set. Herein, for an area in which a blue false color is to be generated (area labeled with "B" in FIG. 33), the value of mask $\alpha_b$ is set to 1. For an area in which a red false color is to be generated (area labeled with "R" in FIG. 33), the value of mask $\alpha_r$ is set to 1. For areas in which no false color is to be generated (areas labeled with "N" in FIG. 33), the values of masks $\alpha_b$ and $\alpha_r$ are set to 0.

After the values of masks $\alpha_b$ and $\alpha_r$ are set in this manner, a weight in consideration of each false color (weight obtained by correcting the normal weight) is calculated. The resultant weight may be used for the rendering process. As the post-correction weight vector, a weight vector obtained by substantially the same calculation as in Example 1 is usable.

Figure 34:
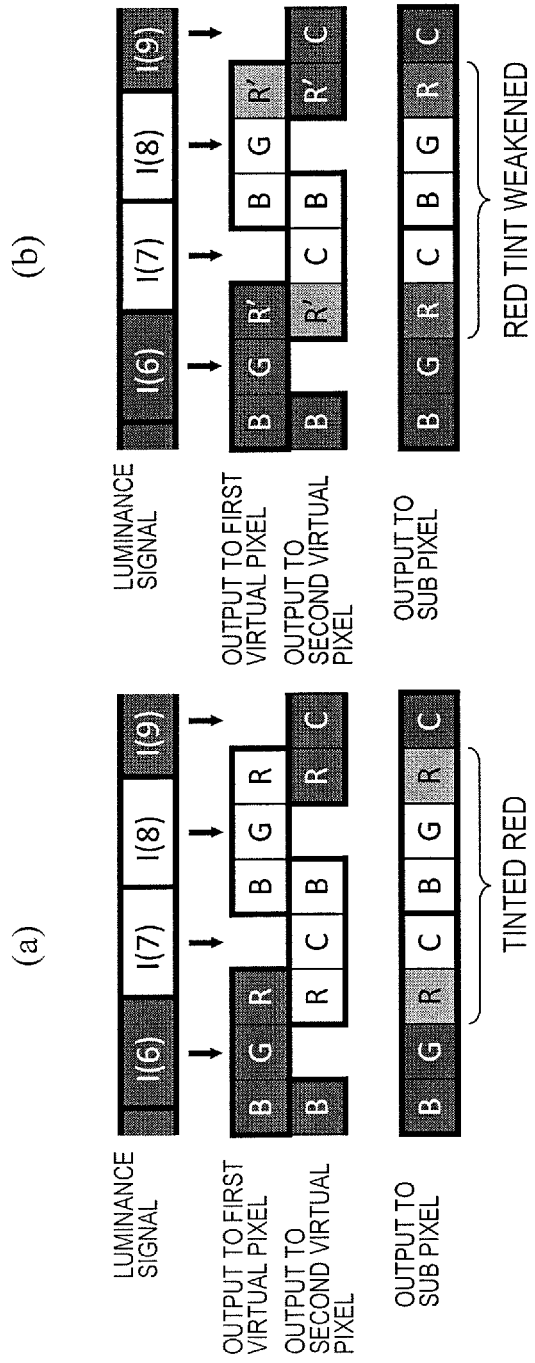
FIG. 34 shows the relationship among the luminance signal, the outputs to the plurality of virtual pixels, and the final output to each sub pixel; (a) shows such a relationship when a process for suppressing a false color is not performed, and (b) shows such a relationship when a process for suppressing a false color is performed.

FIGS. 34(a) and 34(b) show the relationship among the luminance signal, the outputs to the first virtual pixel VP1 and the second virtual pixel VP2, and the final output to the sub pixel. FIG. 34(a) shows such a relationship when a process for suppressing a false color is not performed (namely, when only the normal weight is kept being used). FIG. 34(b) shows such a relationship when a process for suppressing a false color is performed (namely, when the post-correction weight is used).

When the process for suppressing a false color is not performed, as shown in FIG. 34(a), a red output is made to each of the first virtual pixel VP1 and the second virtual pixel VP2 as routinely performed (represented as "R" in the figure). Therefore, when a final output to the sub pixel is made, the 2-pixel width line is tinted red. By contrast, when the process for suppressing a false color is performed, as shown in FIG. 34(b), the red output made to each of the first virtual pixel VP1 and the second virtual pixel VP2 is decreased as compared with the output routinely made (represented as "R'" in the figure). Therefore, when a final output to the sub pixel is made, the luminance of the red sub pixel R is lower than the luminance which would otherwise be exhibited. As a result, the red tint of the 2-pixel width line is weakened and the false color is less likely to be perceived.

EXAMPLE 3

5 Primary Colors; 5 Sub Pixels; 2 Virtual Pixels

Figure 35:
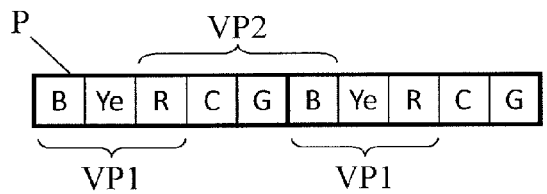
FIG. 35 shows a pixel structure (sub pixel arrangement) in Example 3.

FIG. 35 shows a pixel structure in Example 3. In the example shown in FIG. 35, each pixel P is formed of five sub pixels, specifically, a red sub pixel R, a green sub pixel G, a blue sub pixel B, a cyan sub pixel C, and a yellow sub pixel Ye. In each pixel P, these sub pixels are located in the order of the blue sub pixel B, the yellow sub pixel Ye, the red sub pixel R, the cyan sub pixel C and the green sub pixel G from left to right in the row direction. The first virtual pixel VP1 is formed of the blue sub pixel B, the yellow sub pixel Ye and the red sub pixel R, and the second virtual pixel VP2 is formed of the red sub pixel R, the cyan sub pixel C, the green sub pixel G and the blue sub pixel B. In this case, the sub pixel shared by the first virtual pixel VP1 and the second virtual pixel VP2 is the red sub pixel R or the blue sub pixel B. Therefore, a red or blue false color may be generated.

Figure 36:
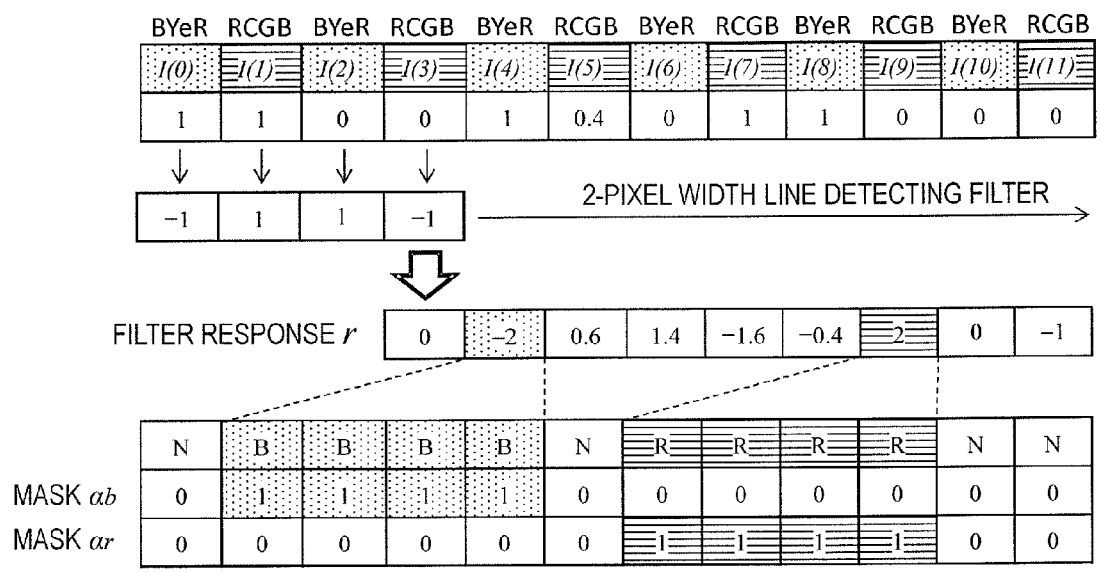
FIG. 36 shows a filter response r in the case where a [−1 1 1 −1] filter is used as a filter for detecting a 2-pixel width line in Example 3.

FIG. 36 shows a filter response r when a [−1 1 1 −1] filter is used as a filter for detecting a 2-pixel width line. Herein, the threshold value th is set to 1.75.

In the example shown in FIG. 36, the filter response r corresponding to an area of I(1) through I(4) is −2 (=1·(−1)+0·1+0·1+1·(−1)). Therefore, it is seen that a blue false color is generated in this area (namely, that a 2-pixel width black line corresponding to I(2) and I(3) is tinted blue). The filter response r corresponding to an area of I(6) through I(9) is 2 (=0·(−1)+1·1+1·1+0·(−1)). Therefore, it is seen that a red false color is generated in this area (namely, that a 2-pixel width white line corresponding to I(7) and I(8) is tinted red).

In this manner, areas in which false colors are to be generated are specified, and values of masks $\alpha_b$ and $\alpha_r$ indicating such areas are set. Herein, for an area in which a blue false color is to be generated (area labeled with "B" in FIG. 36), the value of mask $\alpha_b$ is set to 1. For an area in which a red false color is to be generated (area labeled with "R" in FIG. 36), the value of mask $\alpha_r$ is set to 1. For areas in which no false color is to be generated (areas labeled with "N" in FIG. 36), the values of masks $\alpha_b$ and $\alpha_r$ are set to 0.

After the values of masks $\alpha_b$ and $\alpha_r$ are set in this manner, a weight in consideration of each false color (weight obtained by correcting the normal weight) is calculated. The resultant weight may be used for the rendering process. As the post-correction weight vector, a weight vector obtained by substantially the same calculation as in Example 1 is usable.

FIGS. 37(a) and 37(b) show the relationship among the luminance signal, the outputs to the first virtual pixel VP1 and the second virtual pixel VP2, and the final output to the sub pixel. FIG. 37(a) shows such a relationship when a process for suppressing a false color is not performed (namely, when only the normal weight is kept being used). FIG. 37(b) shows such a relationship when a process for suppressing a false color is performed (namely, when the post-correction weight is used).

When the process for suppressing a false color is not performed, as shown in FIG. 37(a), a red output is made to each of the first virtual pixel VP1 and the second virtual pixel VP2 as routinely performed (represented as "R" in the figure). Therefore, when a final output to the sub pixel is made, the 2-pixel width line is tinted red. By contrast, when the process for suppressing a false color is performed, as shown in FIG. 37(b), the red output made to each of the first virtual pixel VP1 and the second virtual pixel VP2 is decreased as compared with the output routinely made (represented as "R'" in the figure). Therefore, when a final output to the sub pixel is made, the luminance of the red sub pixel R is lower than the luminance which would otherwise be exhibited. As a result, the red tint of the 2-pixel width line is weakened and the false color is less likely to be perceived.

EXAMPLE 4

5 Primary Colors; 5 Sub Pixels; 2 Virtual Pixels

Figure 38:
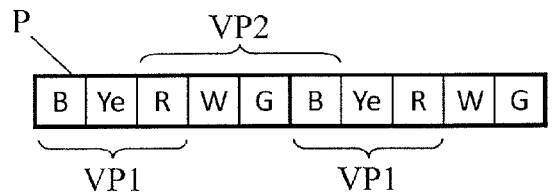
FIG. 38 shows a pixel structure (sub pixel arrangement) in Example 4.

FIG. 38 shows a pixel structure in Example 4. In the example shown in FIG. 38, each pixel P is formed of five sub pixels, specifically, a red sub pixel R, a green sub pixel G, a blue sub pixel B, a yellow sub pixel Ye, and a white sub pixel W. In each pixel P, these sub pixels are located in the order of the blue sub pixel B, the yellow sub pixel Ye, the red sub pixel R, the white sub pixel W and the green sub pixel G from left to right in the row direction. The first virtual pixel VP1 is formed of the blue sub pixel B, the yellow sub pixel Ye and the red sub pixel R, and the second virtual pixel VP2 is formed of the red sub pixel R, the white sub pixel W, the green sub pixel G and the blue sub pixel B. In this case, the sub pixel shared by the first virtual pixel VP1 and the second virtual pixel VP2 is the red sub pixel R or the blue sub pixel B. Therefore, a red or blue false color may be generated.

Figure 39:
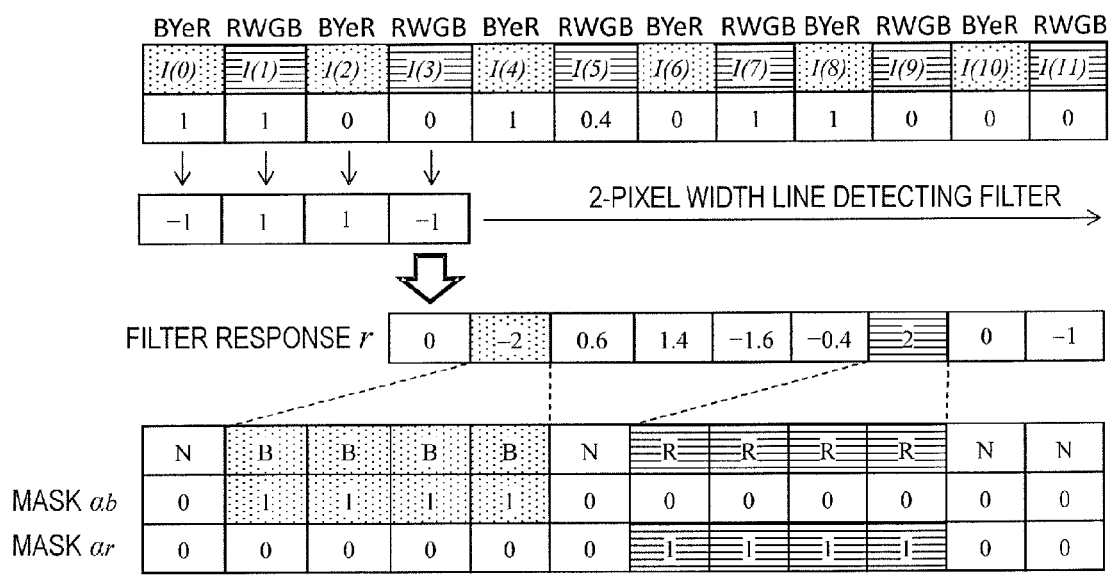
FIG. 39 shows a filter response r in the case where a [−1 1 1 −1] filter is used as a filter for detecting a 2-pixel width line in Example 4.

FIG. 39 shows a filter response r when a [−1 1 1 −1] filter is used as a filter for detecting a 2-pixel width line. Herein, the threshold value th is set to 1.75.

In the example shown in FIG. 39, the filter response r corresponding to an area of I(1) through I(4) is −2 (=1·(−1)+0·1+0·1+1·(−1)). Therefore, it is seen that a blue false color is generated in this area (namely, that a 2-pixel width black line corresponding to I(2) and I(3) is tinted blue). The filter response r corresponding to an area of I(6) through I(9) is 2 (=0·(−1)+1·1+1·1+0·(−1)). Therefore, it is seen that a red false color is generated in this area (namely, that a 2-pixel width white line corresponding to I(7) and I(8) is tinted red).

In this manner, areas in which false colors are to be generated are specified, and values of masks $\alpha_b$ and $\alpha_r$ indicating such areas are set. Herein, for an area in which a blue false color is to be generated (area labeled with "B" in FIG. 39), the value of mask $\alpha_b$ is set to 1. For an area in which a red false color is to be generated (area labeled with "R" in FIG. 39), the value of mask $\alpha_r$ is set to 1. For areas in which no false color is to be generated (areas labeled with "N" in FIG. 39), the values of masks $\alpha_b$ and $\alpha_r$ are set to 0.

After the values of masks $\alpha_b$ and $\alpha_r$ are set in this manner, a weight in consideration of each false color (weight obtained by correcting the normal weight) is calculated. The resultant weight may be used for the rendering process. As the post-correction weight vector, a weight vector obtained by substantially the same calculation as in Example 1 is usable.

Figure 40:
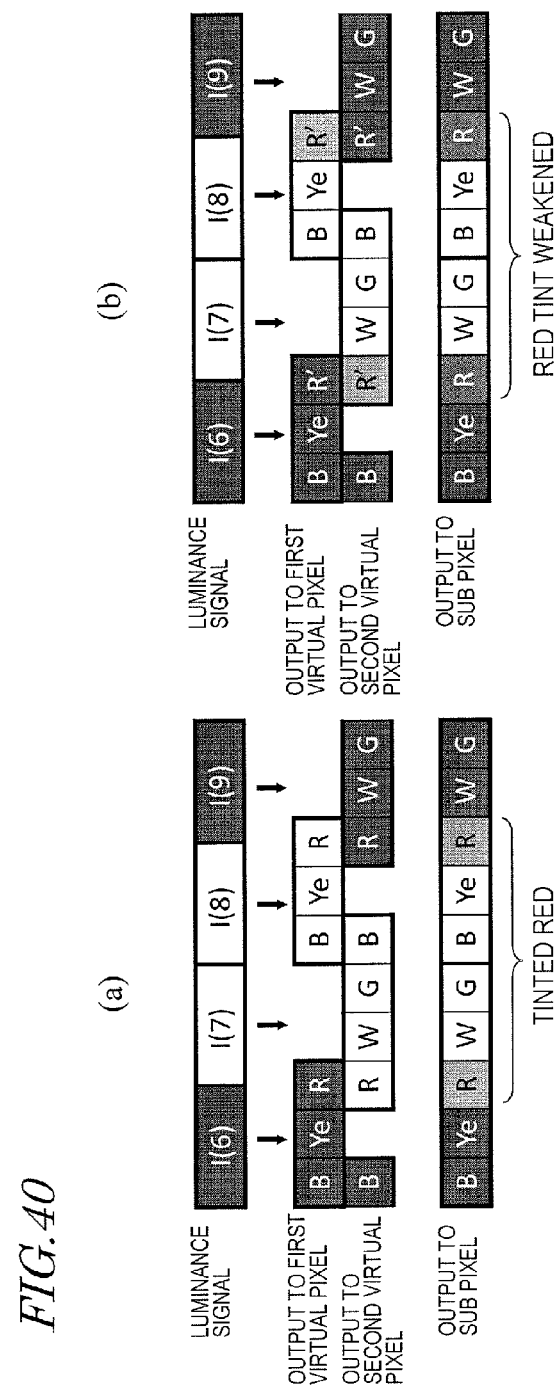
FIG. 40 shows the relationship among the luminance signal, the outputs to the plurality of virtual pixels, and the final output to each sub pixel; (a) shows such a relationship when a process for suppressing a false color is not performed, and (b) shows such a relationship when a process for suppressing a false color is performed.

FIGS. 40(a) and 40(b) show the relationship among the luminance signal, the outputs to the first virtual pixel VP1 and the second virtual pixel VP2, and the final output to the sub pixel. FIG. 40(a) shows such a relationship when a process for suppressing a false color is not performed (namely, when only the normal weight is kept being used). FIG. 40(b) shows such a relationship when a process for suppressing a false color is performed (namely, when the post-correction weight is used).

When the process for suppressing a false color is not performed, as shown in FIG. 40(a), a red output is made to each of the first virtual pixel VP1 and the second virtual pixel VP2 as routinely performed (represented as "R" in the figure). Therefore, when a final output to the sub pixel is made, the 2-pixel width line is tinted red. By contrast, when the process for suppressing a false color is performed, as shown in FIG. 40(b), the red output made to each of the first virtual pixel VP1 and the second virtual pixel VP2 is decreased as compared with the output routinely made (represented as "R'" in the figure). Therefore, when a final output to the sub pixel is made, the luminance of the red sub pixel R is lower than the luminance which would otherwise be exhibited. As a result, the red tint of the 2-pixel width line is weakened and the false color is less likely to be perceived.

EXAMPLE 5

5 Primary Colors; 5 Sub Pixels; 2 Virtual Pixels

Figure 41:
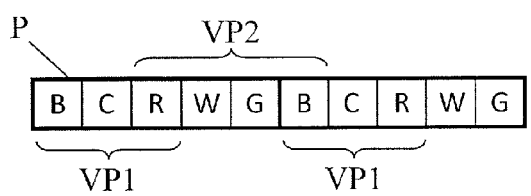
FIG. 41 shows a pixel structure (sub pixel arrangement) in Example 5.

FIG. 41 shows a pixel structure in Example 5. In the example shown in FIG. 41, each pixel P is formed of five sub pixels, specifically, a red sub pixel R, a green sub pixel G, a blue sub pixel B, a cyan sub pixel C, and a white sub pixel W. In each pixel P, these sub pixels are located in the order of the blue sub pixel B, the cyan sub pixel C, the red sub pixel R, the white sub pixel W and the green sub pixel G from left to right in the row direction. The first virtual pixel VP1 is formed of the blue sub pixel B, the cyan sub pixel C and the red sub pixel R, and the second virtual pixel VP2 is formed of the red sub pixel R, the white sub pixel W, the green sub pixel G and the blue sub pixel B. In this case, the sub pixel shared by the first virtual pixel VP1 and the second virtual pixel VP2 is the red sub pixel R or the blue sub pixel B. Therefore, a red or blue false color may be generated.

Figure 42:
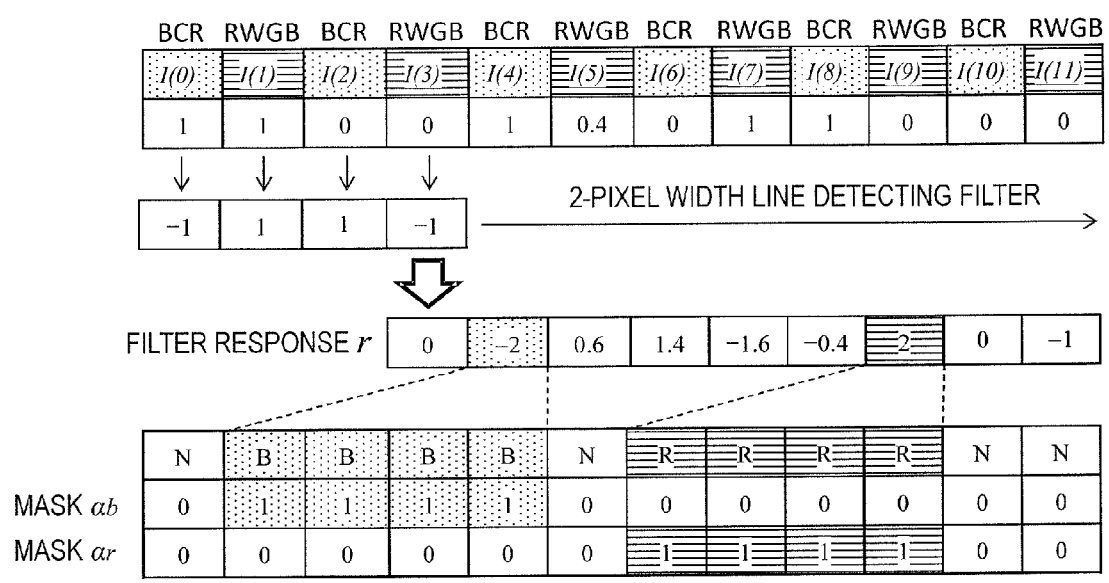
FIG. 42 shows a filter response r in the case where a [−1 1 1 −1] filter is used as a filter for detecting a 2-pixel width line in Example 5.

FIG. 42 shows a filter response r when a [−1 1 1 −1] filter is used as a filter for detecting a 2-pixel width line. Herein, the threshold value th is set to 1.75.

In the example shown in FIG. 42, the filter response r corresponding to an area of I(1) through I(4) is −2 (=1·(−1)+0·1+0·1+1·(−1)). Therefore, it is seen that a blue false color is generated in this area (namely, that a 2-pixel width black line corresponding to I(2) and I(3) is tinted blue). The filter response r corresponding to an area of I(6) through I(9) is 2 (=0·(−1)+1·1+1·1+0·(−1)). Therefore, it is seen that a red false color is generated in this area (namely, that a 2-pixel width white line corresponding to I(7) and I(8) is tinted red).

In this manner, areas in which false colors are to be generated are specified, and values of masks $\alpha_b$ and $\alpha_r$ indicating such areas are set. Herein, for an area in which a blue false color is to be generated (area labeled with "B" in FIG. 42), the value of mask $\alpha_b$ is set to 1. For an area in which a red false color is to be generated (area labeled with "R" in FIG. 42), the value of mask $\alpha_r$ is set to 1. For areas in which no false color is to be generated (areas labeled with "N" in FIG. 42), the values of masks $\alpha_b$ and $\alpha_r$ are set to 0.

After the values of masks $\alpha_b$ and $\alpha_r$ are set in this manner, a weight in consideration of each false color (weight obtained by correcting the normal weight) is calculated. The resultant weight may be used for the rendering process. As the post-correction weight vector, a weight vector obtained by substantially the same calculation as in Example 1 is usable.

Figure 43:
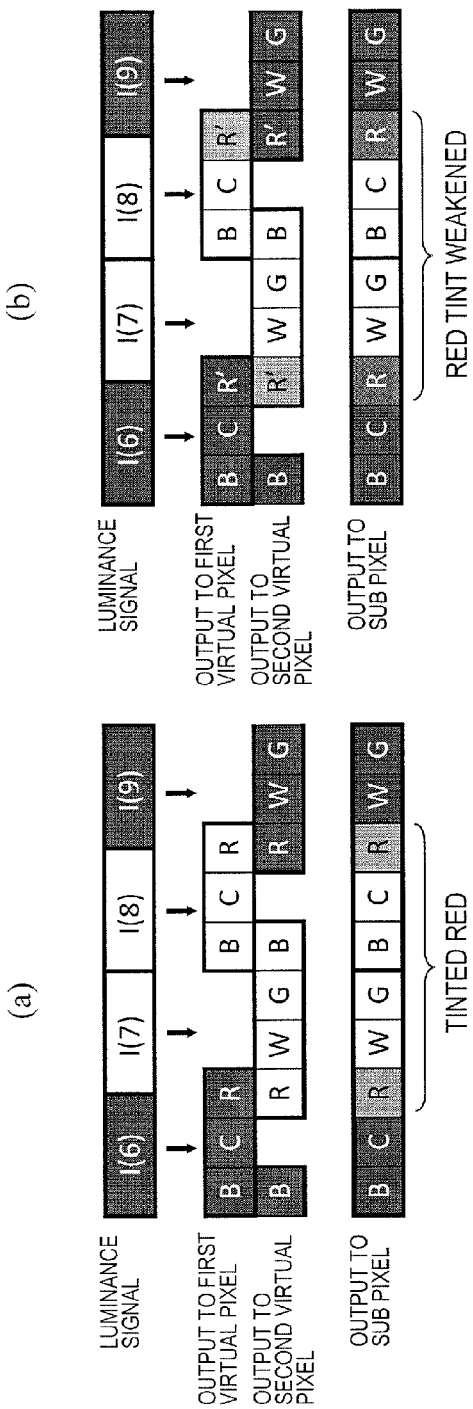
FIG. 43 shows the relationship among the luminance signal, the outputs to the plurality of virtual pixels, and the final output to each sub pixel; (a) shows such a relationship when a process for suppressing a false color is not performed, and (b) shows such a relationship when a process for suppressing a false color is performed.

FIGS. 43(a) and 43(b) show the relationship among the luminance signal, the outputs to the first virtual pixel VP1 and the second virtual pixel VP2, and the final output to the sub pixel. FIG. 43(a) shows such a relationship when a process for suppressing a false color is not performed (namely, when only the normal weight is kept being used). FIG. 43(b) shows such a relationship when a process for suppressing a false color is performed (namely, when the post-correction weight is used).

When the process for suppressing a false color is not performed, as shown in FIG. 43(a), a red output is made to each of the first virtual pixel VP1 and the second virtual pixel VP2 as routinely performed (represented as "R" in the figure). Therefore, when a final output to the sub pixel is made, the 2-pixel width line is tinted red. By contrast, when the process for suppressing a false color is performed, as shown in FIG. 43(b), the red output made to each of the first virtual pixel VP1 and the second virtual pixel VP2 is decreased as compared with the output routinely made (represented as "R'" in the figure). Therefore, when a final output to the sub pixel is made, the luminance of the red sub pixel R is lower than the luminance which would otherwise be exhibited. As a result, the red tint of the 2-pixel width line is weakened and the false color is less likely to be perceived.

EXAMPLE 6

5 Primary Colors; 6 Sub Pixels; 2 Virtual Pixels

Figure 44:
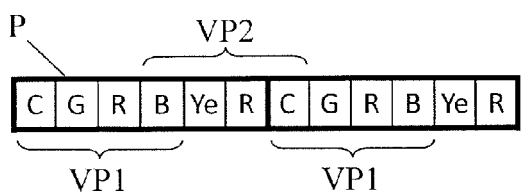
FIG. 44 shows a pixel structure (sub pixel arrangement) in Example 6.

FIG. 44 shows a pixel structure in Example 6. In the example shown in FIG. 44, each pixel P is formed of six sub pixels, specifically, two red sub pixels R, a green sub pixel G, a blue sub pixel B, a cyan sub pixel C, and a yellow sub pixel Ye. In each pixel P, these sub pixels are located in the order of the cyan sub pixel C, the green sub pixel G, the red sub pixel R, the blue sub pixel B, the yellow sub pixel Ye and the red sub pixel R from left to right in the row direction. The first virtual pixel VP1 is formed of the cyan sub pixel C, the green sub pixel G, the red sub pixel R and the blue sub pixel B, and the second virtual pixel VP2 is formed of the blue sub pixel B, the yellow sub pixel Ye, the red sub pixel R and the cyan sub pixel C. In this case, the sub pixel shared by the first virtual pixel VP1 and the second virtual pixel VP2 is the cyan sub pixel C or the blue sub pixel B. Therefore, a cyan or blue false color may be generated.

Figure 45:
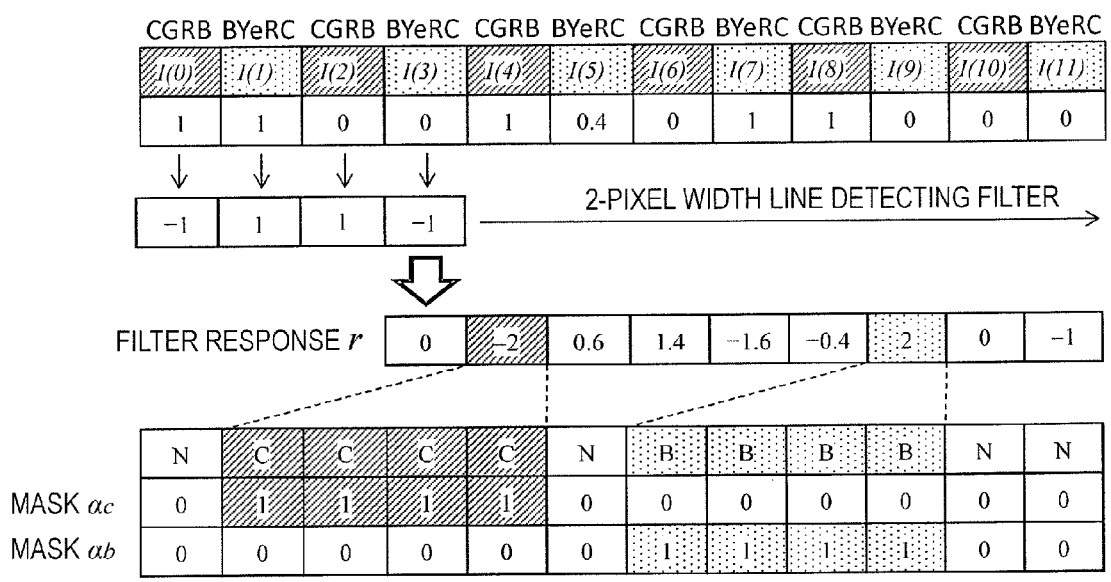
FIG. 45 shows a filter response r in the case where a [−1 1 1 −1] filter is used as a filter for detecting a 2-pixel width line in Example 6.

FIG. 45 shows a filter response r when a [−1 1 1 −1] filter is used as a filter for detecting a 2-pixel width line. Herein, the threshold value th is set to 1.75.

In the example shown in FIG. 45, the filter response r corresponding to an area of I(1) through I(4) is −2 (=1·(−1)+0·1+0·1+1·(−1)). Therefore, it is seen that a cyan false color is generated in this area (namely, that a 2-pixel width black line corresponding to I(2) and I(3) is tinted cyan). The filter response r corresponding to an area of I(6) through I(9) is 2 (=0·(−1)+1·1+1·1+0·(−1)). Therefore, it is seen that a blue false color is generated in this area (namely, that a 2-pixel width white line corresponding to I(7) and I(8) is tinted blue).

In this manner, areas in which false colors are to be generated are specified, and values of masks $\alpha_c$ and $\alpha_b$ indicating such areas are set. Herein, for an area in which a cyan false color is to be generated (area labeled with "C" in FIG. 45), the value of mask $\alpha_c$ is set to 1. For an area in which a blue false color is to be generated (area labeled with "B" in FIG. 45), the value of mask $\alpha_b$ is set to 1. For areas in which no false color is to be generated (areas labeled with "N" in FIG. 45), the values of masks $\alpha_c$ and $\alpha_b$ are set to 0.

After the values of masks $\alpha_c$ and $\alpha_b$ are set in this manner, a weight in consideration of each false color (weight obtained by correcting the normal weight) is calculated. The resultant weight may be used for the rendering process. As the post-correction weight vector, a weight vector obtained by substantially the same calculation as in Example 1 is usable.

FIGS. 46(a) and 46(b) show the relationship among the luminance signal, the outputs to the first virtual pixel VP1 and the second virtual pixel VP2, and the final output to the sub pixel. FIG. 46(a) shows such a relationship when a process for suppressing a false color is not performed (namely, when only the normal weight is kept being used). FIG. 46(b) shows such a relationship when a process for suppressing a false color is performed (namely, when the post-correction weight is used).

When the process for suppressing a false color is not performed, as shown in FIG. 46(a), a blue output is made to each of the first virtual pixel VP1 and the second virtual pixel VP2 as routinely performed (represented as "B" in the figure). Therefore, when a final output to the sub pixel is made, the 2-pixel width line is tinted blue. By contrast, when the process for suppressing a false color is performed, as shown in FIG. 46(b), the blue output made to each of the first virtual pixel VP1 and the second virtual pixel VP2 is decreased as compared with the output routinely made (represented as "B'" in the figure). Therefore, when a final output to the sub pixel is made, the luminance of the blue sub pixel B is lower than the luminance which would otherwise be exhibited. As a result, the blue tint of the 2-pixel width line is weakened and the false color is less likely to be perceived.

EXAMPLE 7

6 Primary Colors; 6 Sub Pixels; 2 Virtual Pixels

Figure 47:
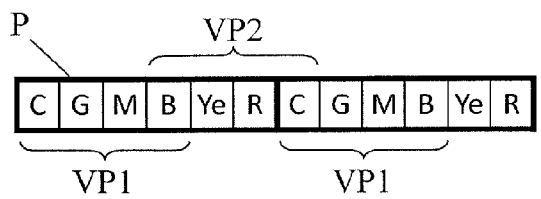
FIG. 47 shows a pixel structure (sub pixel arrangement) in Example 7.

FIG. 47 shows a pixel structure in Example V. In the example shown in FIG. 47, each pixel P is formed of six sub pixels, specifically, a red sub pixel R, a green sub pixel G, a blue sub pixel B, a cyan sub pixel C, a magenta sub pixel M, and a yellow sub pixel Ye. In each pixel P, these sub pixels are located in the order of the cyan sub pixel C, the green sub pixel G, the magenta sub pixel M, the blue sub pixel B, the yellow sub pixel Ye and the red sub pixel R from left to right in the row direction. The first virtual pixel VP1 is formed of the cyan sub pixel C, the green sub pixel G, the magenta sub pixel M and the blue sub pixel B, and the second virtual pixel VP2 is formed of the blue sub pixel B, the yellow sub pixel Ye, the red sub pixel R and the cyan sub pixel C. In this case, the sub pixel shared by the first virtual pixel VP1 and the second virtual pixel VP2 is the cyan sub pixel C or the blue sub pixel B. Therefore, a cyan or blue false color may be generated.

Figure 48:
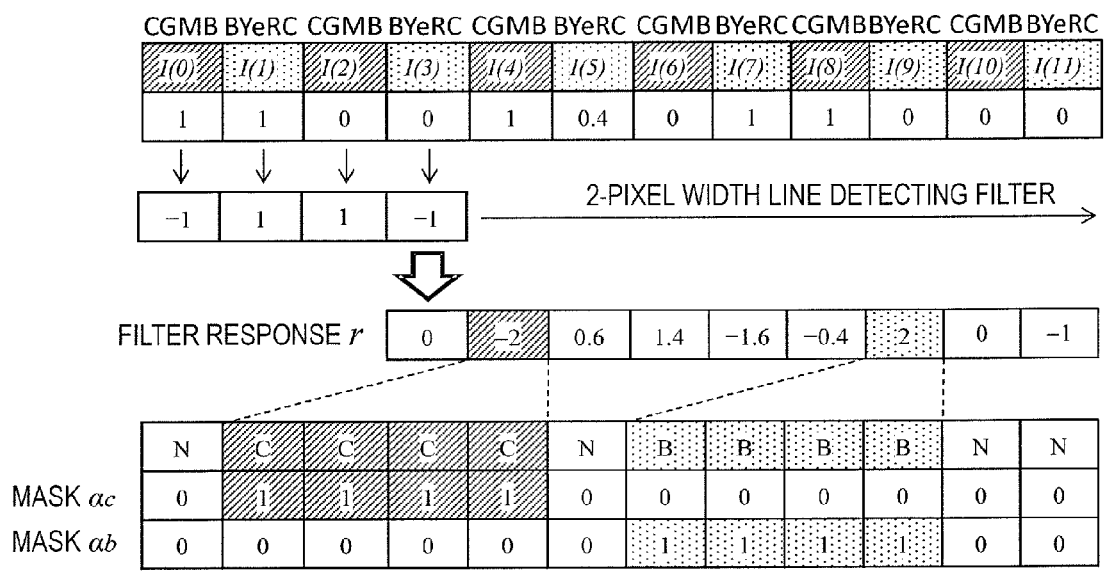
FIG. 48 shows a filter response r in the case where a [−1 1 1 −1] filter is used as a filter for detecting a 2-pixel width line in Example 7.

FIG. 48 shows a filter response r when a [−1 1 1 −1] filter is used as a filter for detecting a 2-pixel width line. Herein, the threshold value th is set to 1.75.

In the example shown in FIG. 48, the filter response r corresponding to an area of I(1) through I(4) is −2 (=1·(−1)+0·1+0·1+1·(−1)). Therefore, it is seen that a cyan false color is generated in this area (namely, that a 2-pixel width black line corresponding to I(2) and I(3) is tinted cyan). The filter response r corresponding to an area of I(6) through I(9) is 2 (=0·(−1)+1·1+1·1+0·(−1)). Therefore, it is seen that a blue false color is generated in this area (namely, that a 2-pixel width white line corresponding to I(7) and I(8) is tinted blue).

In this manner, areas in which false colors are to be generated are specified, and values of masks $\alpha_c$ and $\alpha_b$ indicating such areas are set. Herein, for an area in which a cyan false color is to be generated (area labeled with "C" in FIG. 48), the value of mask $\alpha_c$ is set to 1. For an area in which a blue false color is to be generated (area labeled with "B" in FIG. 48), the value of mask $\alpha_b$ is set to 1. For areas in which no false color is to be generated (areas labeled with "N" in FIG. 48), the values of masks $\alpha_c$ and $\alpha_b$ are set to 0.

After the values of masks $\alpha_c$ and $\alpha_b$ are set in this manner, a weight in consideration of each false color (weight obtained by correcting the normal weight) is calculated. The resultant weight may be used for the rendering process. As the post-correction weight vector, a weight vector obtained by substantially the same calculation as in Example 1 is usable.

Figure 49:
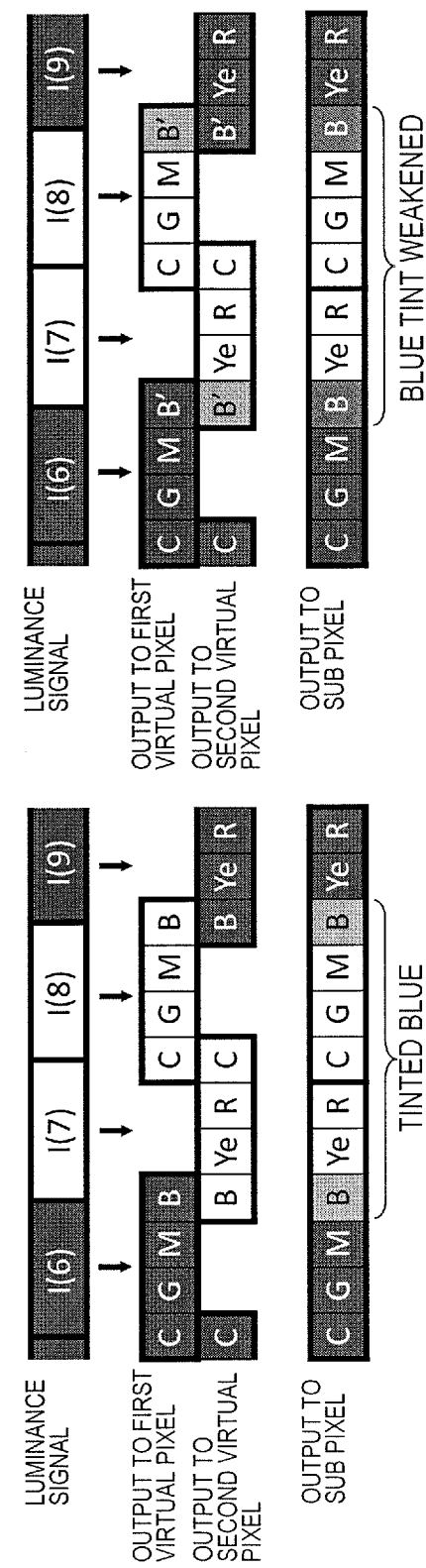
FIG. 49 shows the relationship among the luminance signal, the outputs to the plurality of virtual pixels, and the final output to each sub pixel; (a) shows such a relationship when a process for suppressing a false color is not performed, and (b) shows such a relationship when a process for suppressing a false color is performed.

FIGS. 49(a) and 49(b) show the relationship among the luminance signal, the outputs to the first virtual pixel VP1 and the second virtual pixel VP2, and the final output to the sub pixel. FIG. 49(a) shows such a relationship when a process for suppressing a false color is not performed (namely, when only the normal weight is kept being used). FIG. 49(b) shows such a relationship when a process for suppressing a false color is performed (namely, when the post-correction weight is used).

When the process for suppressing a false color is not performed, as shown in FIG. 49(a), a blue output is made to each of the first virtual pixel VP1 and the second virtual pixel VP2 as routinely performed (represented as "B" in the figure). Therefore, when a final output to the sub pixel is made, the 2-pixel width line is tinted blue. By contrast, when the process for suppressing a false color is performed, as shown in FIG. 49(b), the blue output made to each of the first virtual pixel VP1 and the second virtual pixel VP2 is decreased as compared with the output routinely made (represented as "B'" in the figure). Therefore, when a final output to the sub pixel is made, the luminance of the blue sub pixel B is lower than the luminance which would otherwise be exhibited. As a result, the blue tint of the 2-pixel width line is weakened and the false color is less likely to be perceived.

EXAMPLE 8

6 Primary Colors; 6 Sub Pixels; 2 Virtual Pixels

Figure 50:
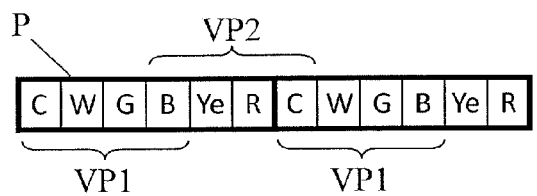
FIG. 50 shows a pixel structure (sub pixel arrangement) in Example 8.

FIG. 50 shows a pixel structure in Example 8. In the example shown in FIG. 50, each pixel P is formed of six sub pixels, specifically, a red sub pixel R, a green sub pixel G, a blue sub pixel B, a cyan sub pixel C, a yellow sub pixel Ye, and a white sub pixel W. In each pixel P, these sub pixels are located in the order of the cyan sub pixel C, the white sub pixel W, the green sub pixel G, the blue sub pixel B, the yellow sub pixel Ye and the red sub pixel R from left to right in the row direction. The first virtual pixel VP1 is formed of the cyan sub pixel C, the white sub pixel W, the green sub pixel G and the blue sub pixel B, and the second virtual pixel VP2 is formed of the blue sub pixel B, the yellow sub pixel Ye, the red sub pixel R and the cyan sub pixel C. In this case, the sub pixel shared by the first virtual pixel VP1 and the second virtual pixel VP2 is the cyan sub pixel C or the blue sub pixel B. Therefore, a cyan or blue false color may be generated.

Figure 51:
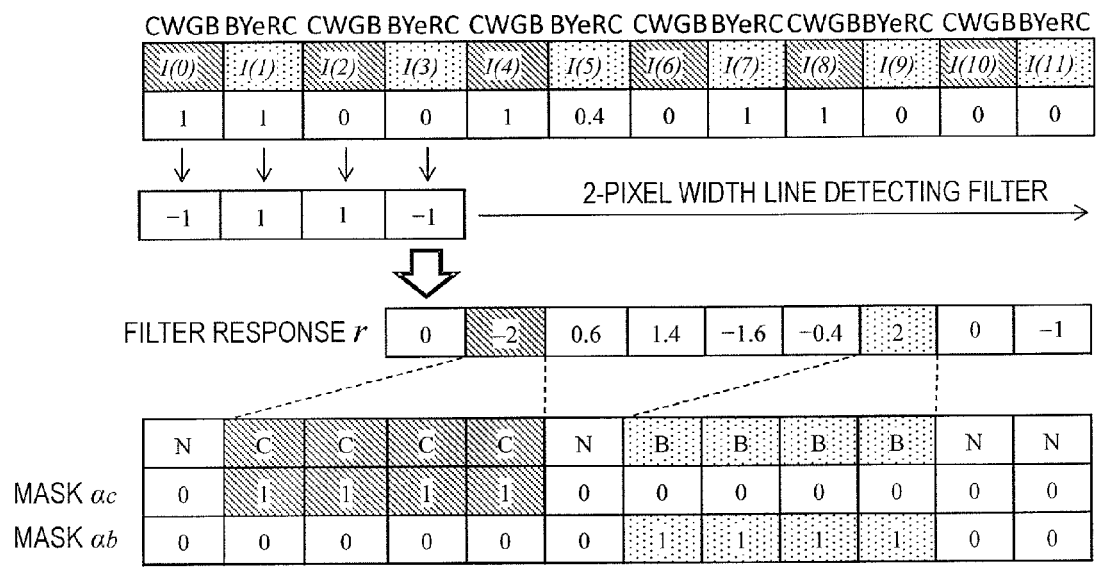
FIG. 51 shows a filter response r in the case where a [−1 1 1 −1] filter is used as a filter for detecting a 2-pixel width line in Example 8.

FIG. 51 shows a filter response r when a [−1 1 1 −1] filter is used as a filter for detecting a 2-pixel width line. Herein, the threshold value th is set to 1.75.

In the example shown in FIG. 51, the filter response r corresponding to an area of I(1) through I(4) is −2 (=1·(−1)+ 0·1+0·1+1·(−1)). Therefore, it is seen that a cyan false color is generated in this area (namely, that a 2-pixel width black line corresponding to I(2) and I(3) is tinted cyan). The filter response r corresponding to an area of I(6) through I(9) is 2 (=0·(−1)+1·1+1·1+0·(−1)). Therefore, it is seen that a blue false color is generated in this area (namely, that a 2-pixel width white line corresponding to I(7) and I(8) is tinted blue).

In this manner, areas in which false colors are to be generated are specified, and values of masks $\alpha_c$ and $\alpha_b$ indicating such areas are set. Herein, for an area in which a cyan false color is to be generated (area labeled with "C" in FIG. 51), the value of mask $\alpha_c$ is set to 1. For an area in which a blue false color is to be generated (area labeled with "B" in FIG. 51), the value of mask $\alpha_b$ is set to 1. For areas in which no false color is to be generated (areas labeled with "N" in FIG. 51), the values of masks $\alpha_c$ and $\alpha_b$ are set to 0.

After the values of masks $\alpha_c$ and $\alpha_b$ are set in this manner, a weight in consideration of each false color (weight obtained by correcting the normal weight) is calculated. The resultant weight may be used for the rendering process. As the post-correction weight vector, a weight vector obtained by substantially the same calculation as in Example 1 is usable.

Figure 52:
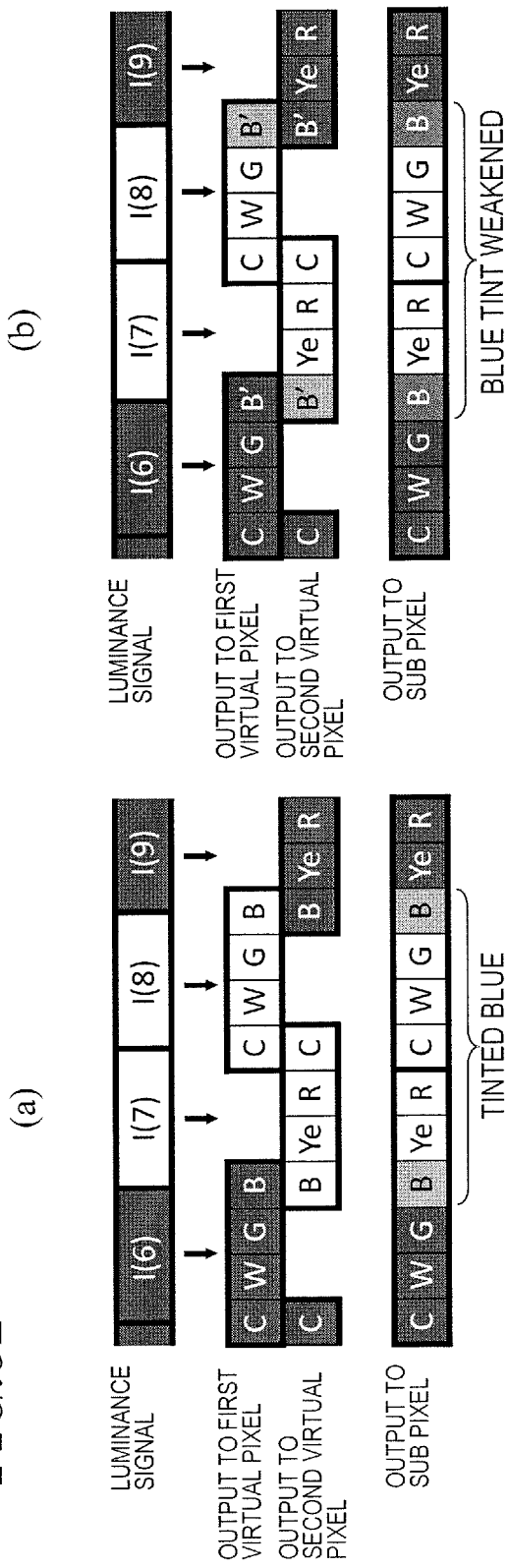
FIG. 52 shows the relationship among the luminance signal, the outputs to the plurality of virtual pixels, and the final output to each sub pixel; (a) shows such a relationship when a process for suppressing a false color is not performed, and (b) shows such a relationship when a process for suppressing a false color is performed.

FIGS. 52(*a*) and 52(*b*) show the relationship among the luminance signal, the outputs to the first virtual pixel VP1 and the second virtual pixel VP2, and the final output to the sub pixel. FIG. 52(*a*) shows such a relationship when a process for suppressing a false color is not performed (namely, when only the normal weight is kept being used). FIG. 52(*b*) shows such a relationship when a process for suppressing a false color is performed (namely, when the post-correction weight is used).

When the process for suppressing a false color is not performed, as shown in FIG. 52(*a*), a blue output is made to each of the first virtual pixel VP1 and the second virtual pixel VP2 as routinely performed (represented as "B" in the figure). Therefore, when a final output to the sub pixel is made, the 2-pixel width line is tinted blue. By contrast, when the process for suppressing a false color is performed, as shown in FIG. 52(*b*), the blue output made to each of the first virtual pixel VP1 and the second virtual pixel VP2 is decreased as compared with the output routinely made (represented as "B'" in the figure). Therefore, when a final output to the sub pixel is made, the luminance of the blue sub pixel B is lower than the luminance which would otherwise be exhibited. As a result, the blue tint of the 2-pixel width line is weakened and the false color is less likely to be perceived.

EXAMPLE 9

5 Primary Colors; 6 Sub Pixels; 3 Virtual Pixels

Figure 53:
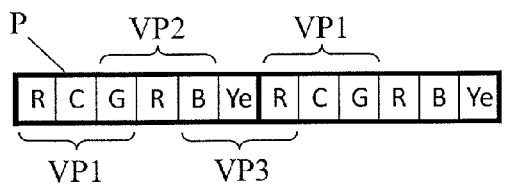
FIG. 53 shows a pixel structure (sub pixel arrangement) in Example 9.

FIG. 53 shows a pixel structure in Example 9. In the example shown in FIG. 53, each pixel P is formed of six sub pixels, specifically, two red sub pixels R, a green sub pixel G, a blue sub pixel B, a cyan sub pixel C, and a yellow sub pixel Ye. In each pixel P, these sub pixels are located in the order of the red sub pixel R, the cyan sub pixel C, the green sub pixel G, the red sub pixel R, the blue sub pixel B and the yellow sub pixel Ye from left to right in the row direction. The first virtual pixel VP1 is formed of the red sub pixel R, the cyan sub pixel C and the green sub pixel G. The second virtual pixel VP2 is formed of the green sub pixel G, the red sub pixel R and the blue sub pixel B. The third virtual pixel VP3 is formed of the blue sub pixel B, the yellow sub pixel Ye and the red sub pixel R. In this case, the sub pixel shared by the first virtual pixel VP1 and the second virtual pixel VP2 is the green sub pixel G, the sub pixel shared by the second virtual pixel VP2 and the third virtual pixel VP3 is the blue sub pixel B, and the sub pixel shared by the third virtual pixel VP3 and the first virtual pixel VP1 is the red sub pixel R. Therefore, a green, blue or red false color may be generated.

Figure 54:
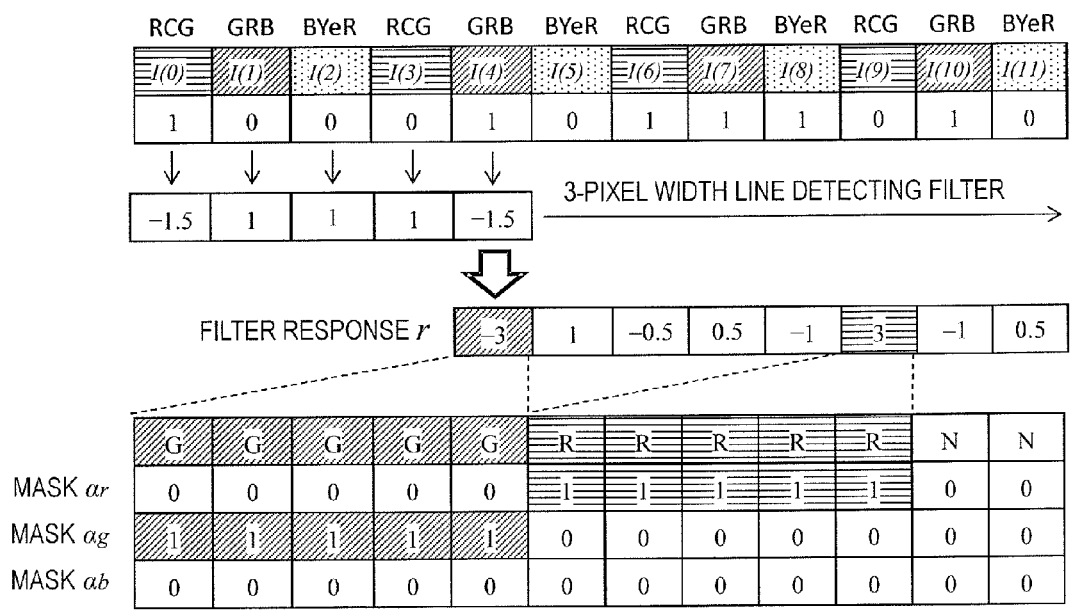
FIG. 54 shows a filter response r in the case where a [−1.5 1 1 1 −1.5] filter is used as a filter for detecting a 3-pixel width line in Example 9.

FIG. 54 shows a filter response r when a [−1.5 1 1 1 −1.5] filter is used as a filter for detecting a 3-pixel width line. Herein, the threshold value th is set to 2.5.

In the example shown in FIG. 54, the filter response r corresponding to an area of I(0) through I(4) is −3 (=1·(−1.5)+ 0·1+0·1+0·1+1·(−1.5)). Therefore, it is seen that a green false color is generated in this area (namely, that a 3-pixel width black line corresponding to I(1), I(2) and I(3) is tinted green). The filter response r corresponding to an area of I(5) through I(9) is 3 (=0·(−1.5)+1·1+1·1+1·1+0·(−1.5)). Therefore, it is seen that a red false color is generated in this area (namely, that a 3-pixel width white line corresponding to I(6), I(7) and I(8) is tinted red).

In this manner, areas in which false colors are to be generated are specified, and values of masks $\alpha_r$, $\alpha_g$ and $\alpha_b$ indicating such areas are set. Herein, for an area in which a red false color is to be generated (area labeled with "R" in FIG. 54), the value of mask $\alpha_r$ is set to 1. For an area in which a green false color is to be generated (area labeled with "G" in FIG. 54), the value of mask $\alpha_g$ is set to 1. For an area in which no false color is to be generated (area labeled with "N" in FIG. 54), the values of masks $\alpha_r$, $\alpha_g$ and $\alpha_b$ are set to 0.

After the values of masks $\alpha_r$, $\alpha_g$ and $\alpha_b$ are set in this manner, a weight in consideration of each false color (weight obtained by correcting the normal weight) is calculated. The resultant weight may be used for the rendering process. As the post-correction weight vector, a weight vector obtained by substantially the same calculation as in Example 1 is usable.

FIGS. 55(*a*) and 55(*b*) show the relationship among the luminance signal, the outputs to the first virtual pixel VP1, the second virtual pixel VP2 and the third virtual pixel VP3, and the final output to the sub pixel. FIG. 55(*a*) shows such a relationship when a process for suppressing a false color is not performed (namely, when only the normal weight is kept being used). FIG. 55(*b*) shows such a relationship when a process for suppressing a false color is performed (namely, when the post-correction weight is used).

When the process for suppressing a false color is not performed, as shown in FIG. 55(a), a green output is made to each of the first virtual pixel VP1 and the second virtual pixel VP2 as routinely performed (represented as "G" in the figure). Therefore, when a final output to the sub pixel is made, the 3-pixel width line is tinted green. By contrast, when the process for suppressing a false color is performed, as shown in FIG. 55(b), the green output made to each of the first virtual pixel VP1 and the second virtual pixel VP2 is decreased as compared with the output routinely made (represented as "G'" in the figure). Therefore, when a final output to the sub pixel is made, the luminance of the green sub pixel G is lower than the luminance which would otherwise be exhibited. As a result, the green tint of the 3-pixel width line is weakened and the false color is less likely to be perceived.

EXAMPLE 10

6 Primary Colors; 6 Sub Pixels; 3 Virtual Pixels

Figure 56:
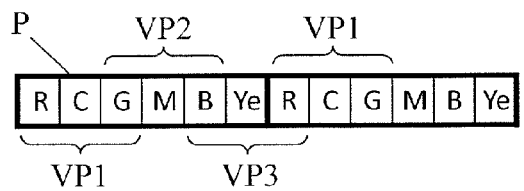
FIG. 56 shows a pixel structure (sub pixel arrangement) in Example 10.

FIG. 56 shows a pixel structure in Example 10. In the example shown in FIG. 56, each pixel P is formed of six sub pixels, specifically, a red sub pixel R, a green sub pixel G, a blue sub pixel B, a cyan sub pixel C, a magenta sub pixel M, and a yellow sub pixel Ye. In each pixel P, these sub pixels are located in the order of the red sub pixel R, the cyan sub pixel C, the green sub pixel G, the magenta sub pixel M, the blue sub pixel B and the yellow sub pixel Ye from left to right in the row direction. The first virtual pixel VP1 is formed of the red sub pixel R, the cyan sub pixel C and the green sub pixel G. The second virtual pixel VP2 is formed of the green sub pixel G, the magenta sub pixel M and the blue sub pixel B. The third virtual pixel VP3 is formed of the blue sub pixel B, the yellow sub pixel Ye and the red sub pixel R. In this case, the sub pixel shared by the first virtual pixel VP1 and the second virtual pixel VP2 is the green sub pixel G, the sub pixel shared by the second virtual pixel VP2 and the third virtual pixel VP3 is the blue sub pixel B, and the sub pixel shared by the third virtual pixel VP3 and the first virtual pixel VP1 is the red sub pixel R. Therefore, a green, blue or red false color may be generated.

Figure 57:
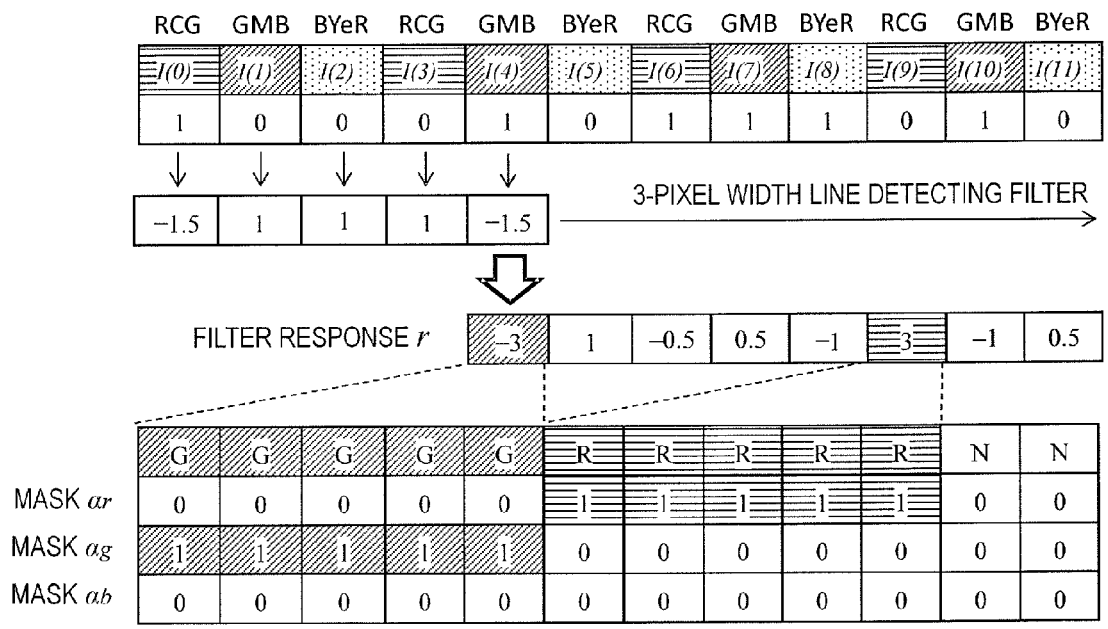
FIG. 57 shows a filter response r in the case where a [−1.5 1 1 1 −1.5] filter is used as a filter for detecting a 3-pixel width line in Example 10.

FIG. 57 shows a filter response r when a [−1.5 1 1 1 −1.5] filter is used as a filter for detecting a 3-pixel width line. Herein, the threshold value th is set to 2.5.

In the example shown in FIG. 57, the filter response r corresponding to an area of I(0) through I(4) is −3 (=1·(−1.5)+ 0·1+0·1+0·1+1·(−1.5)). Therefore, it is seen that a green false color is generated in this area (namely, that a 3-pixel width black line corresponding to I(1), I(2) and I(3) is tinted green). The filter response r corresponding to an area of I(5) through I(9) is 3 (=0·(−1.5)+1·1+1·1+1·1+0·(−1.5)). Therefore, it is seen that a red false color is generated in this area (namely, that a 3-pixel width white line corresponding to I(6), I(7) and I(8) is tinted red).

In this manner, areas in which false colors are to be generated are specified, and values of masks $\alpha_r$, $\alpha_g$ and $\alpha_b$ indicating such areas are set. Herein, for an area in which a red false color is to be generated (area labeled with "R" in FIG. 57), the value of mask $\alpha_r$ is set to 1. For an area in which a green false color is to be generated (area labeled with "G" in FIG. 57), the value of mask $\alpha_g$ is set to 1. For an area in which no false color is to be generated (area labeled with "N" in FIG. 57), the values of masks $\alpha_r$, $\alpha_g$ and $\alpha_b$ are set to 0.

After the values of masks $\alpha_r$, $\alpha_g$ and $\alpha_b$ are set in this manner, a weight in consideration of each false color (weight obtained by correcting the normal weight) is calculated. The resultant weight may be used for the rendering process. As the post-correction weight vector, a weight vector obtained by substantially the same calculation as in Example 1 is usable.

Figure 58:
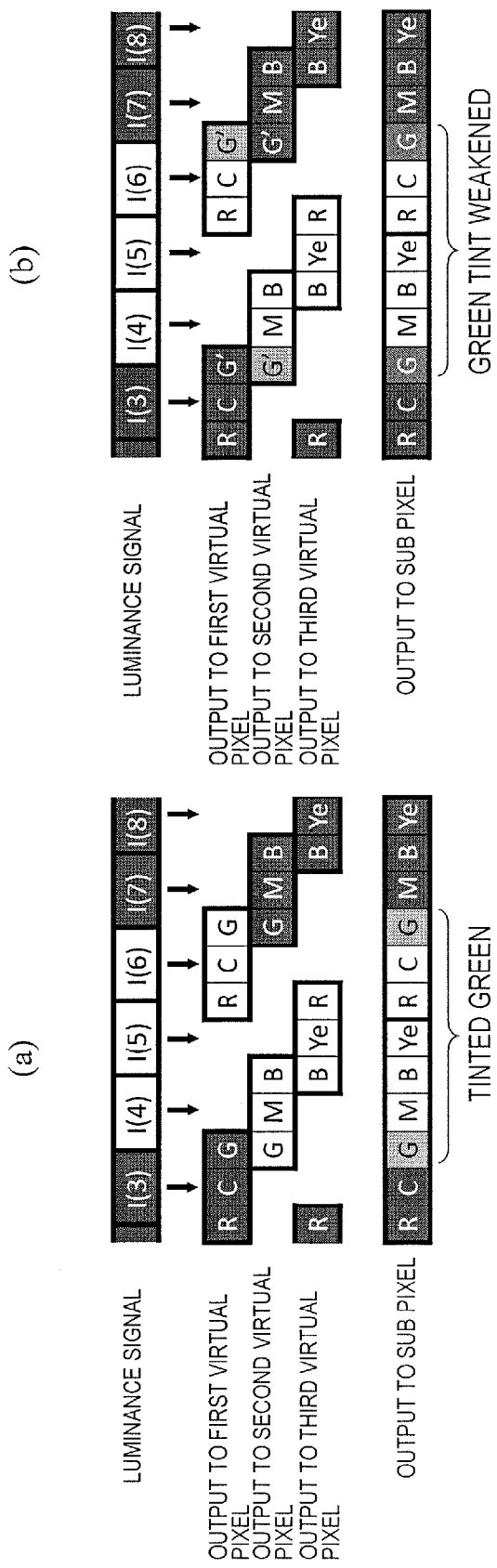
FIG. 58 shows the relationship among the luminance signal, the outputs to the plurality of virtual pixels, and the final output to each sub pixel; (a) shows such a relationship when a process for suppressing a false color is not performed, and (b) shows such a relationship when a process for suppressing a false color is performed.

FIGS. 58(a) and 58(b) show the relationship among the luminance signal, the outputs to the first virtual pixel VP1, the second virtual pixel VP2 and the third virtual pixel VP3, and the final output to the sub pixel. FIG. 58(a) shows such a relationship when a process for suppressing a false color is not performed (namely, when only the normal weight is kept being used). FIG. 58(b) shows such a relationship when a process for suppressing a false color is performed (namely, when the post-correction weight is used).

When the process for suppressing a false color is not performed, as shown in FIG. 58(a), a green output is made to each of the first virtual pixel VP1 and the second virtual pixel VP2 as routinely performed (represented as "G" in the figure). Therefore, when a final output to the sub pixel is made, the 3-pixel width line is tinted green. By contrast, when the process for suppressing a false color is performed, as shown in FIG. 58(b), the green output made to each of the first virtual pixel VP1 and the second virtual pixel VP2 is decreased as compared with the output routinely made (represented as "G'" in the figure). Therefore, when a final output to the sub pixel is made, the luminance of the green sub pixel G is lower than the luminance which would otherwise be exhibited. As a result, the green tint of the 3-pixel width line is weakened and the false color is less likely to be perceived.

EXAMPLE 11

Other Examples of False Suppression Process

In Examples 1 through 10, the filter response r is found in order to detect the n-pixel width line. When the absolute value |r| thereof exceeds a certain threshold value (i.e., |r|>th), it is determined that a false color is to be generated (perceived). When it is determined that a false color is to be perceived, a weight for suppressing the false color is selected and is used for the rendering process. However, the method for determining (selecting) the weight is not limited to this.

Figure 59:
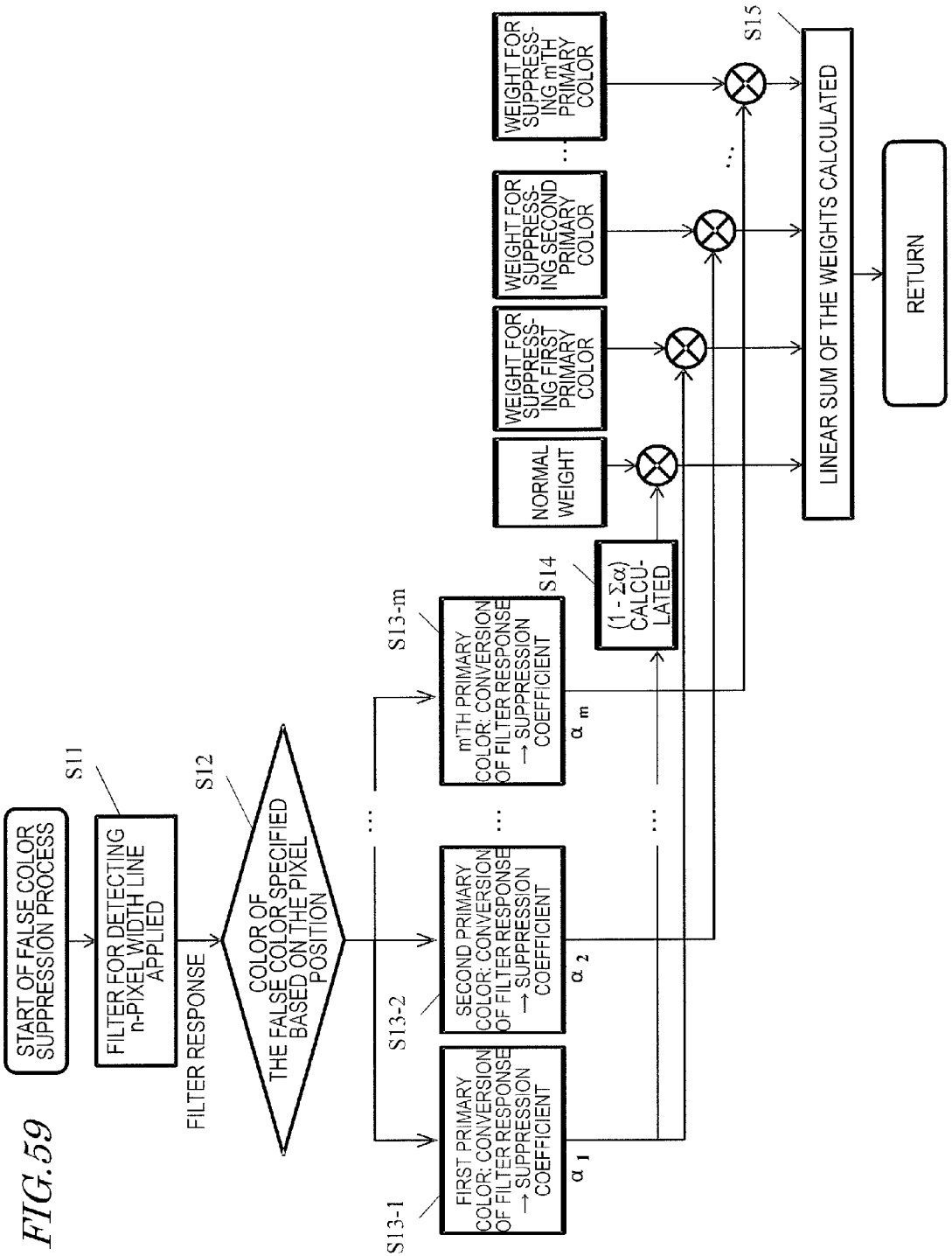
FIG. 59 is a flowchart showing an example of false color suppression process.

FIG. 59 is a flowchart which shows a more generalized process for detecting generation of a false color and determining the weight for suppressing the false color. In the flowchart shown in FIG. 59, a final weight to be used for the rendering process is determined based on a linear sum of the normal weight and a weight for suppressing the false color of each of the primary colors.

At the start of the false color suppression process, convolution is performed by use of a filter for detecting an n-pixel width line (step S11). As a result, the filter response r is obtained.

Next, the color of the false color is specified based on the pixel position (step S12). In this step, the relationship between each pixel position and a false color which may be generated at the each pixel position is specified. Based on this, a correspondence between the filter response r corresponding to each area and the color of the false color which may be generated in the area is found.

Next, the filter response r corresponding to the area in which the false color of a first primary color may be generated, the filter response r corresponding to the area in which the false color of a second primary color may be generated, . . . the filter response r corresponding to the area in which the false color of the m'th primary color may be generated are respectively converted into suppression coefficients $\alpha_1$ through $\alpha_m$ used for finding the corresponding weights (steps S13-1 through S13-m).

Then, a sum of the suppression coefficients $\alpha_1$ through $\alpha_m$ is subtracted from 1 to obtain $(1-\Sigma\alpha)$ (step S14). In a final step, a linear sum of the normal weight and the weight for suppressing the false color of each of the primary colors is calculated (step S15). In this manner, the final weight used for the rendering process is obtained.

Figure 60:
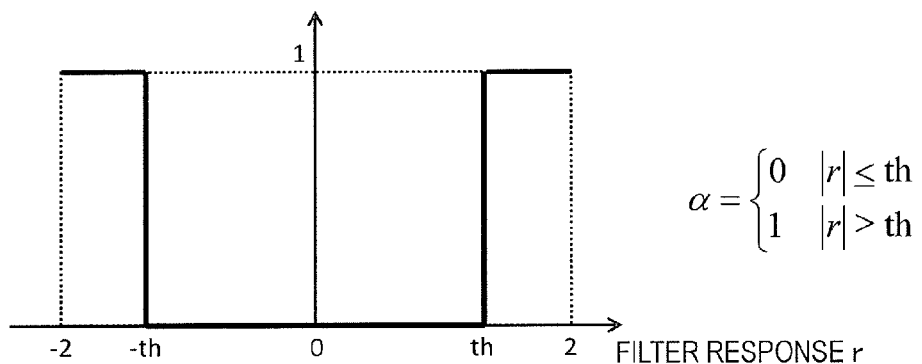
FIG. 60 is a graph showing an example of function used to convert the filter response r into suppression coefficients $\alpha_1$ through $\alpha_m$.

The technique of detecting an area in which a false color is to be generated by performing thresholding on the filter response r as described in Examples 1 through 10 is equivalent to application of a function shown in FIG. 60 to the above-described filter response r for converting the filter response r into the suppression coefficients $\alpha_1$ through $\alpha_m$ (i.e., in steps S13-1 through S13-m).

As the conversion function for thresholding, any of various functions is usable. Use of a conversion function for thresholding provides advantages such as simplification of hardware implementation, decrease in the amount of computation and the like.

Figure 61:
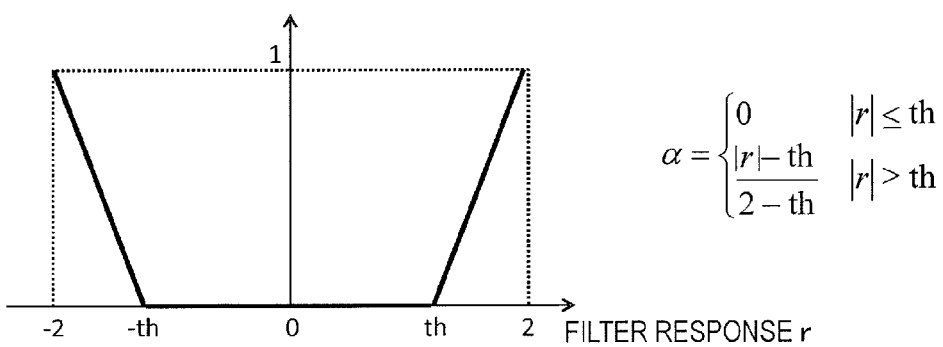
FIG. 61 is a graph showing an example of function used to convert the filter response r into the suppression coefficients $\alpha_1$ through $\alpha_m$.

As the conversion function for thresholding, a function shown in FIG. 61, for example, is usable instead of the function shown in FIG. 60. The function shown in FIG. 61 has the discontinuity in the vicinity of the threshold th suppressed as compared with the function shown in FIG. 60. When the function shown in FIG. 61 is used, perception of artifact can be suppressed in an image pattern in which a value in the vicinity of the threshold value is generated.

Figure 62:
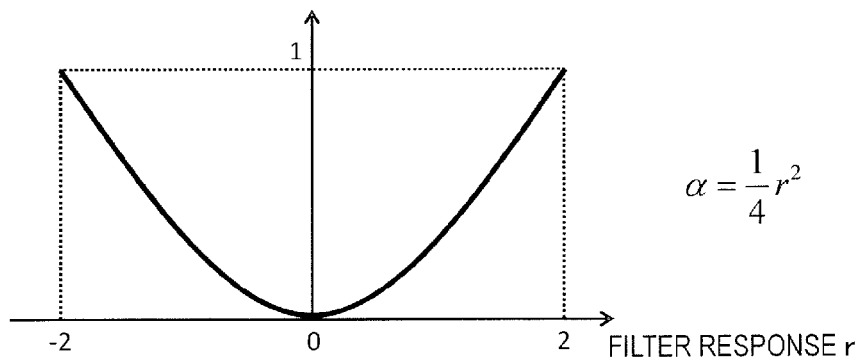
FIG. 62 is a graph showing an example of function used to convert the filter response r into the suppression coefficients $\alpha_1$ through $\alpha_m$.
Figure 63:
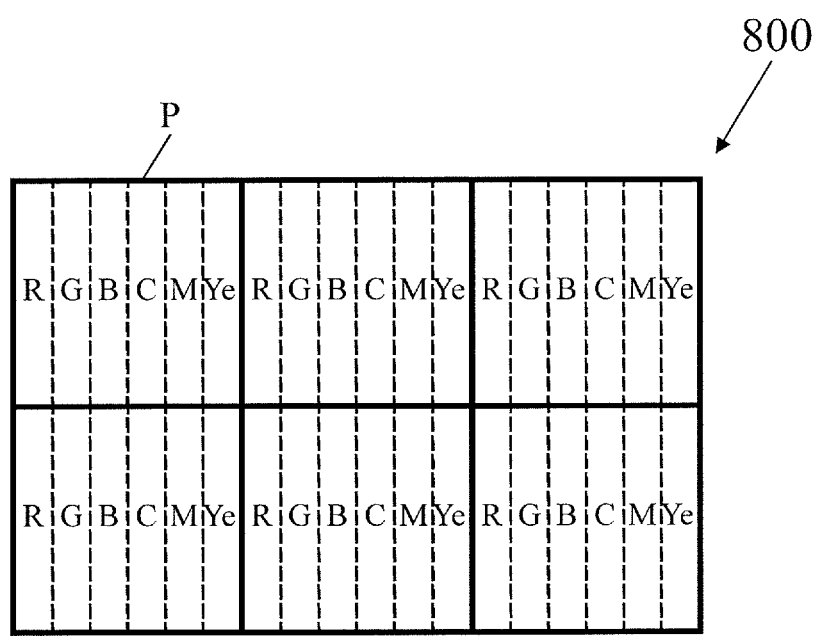
FIG. 63 schematically shows a conventional display device 800 for providing display by use of six primary colors.

A conversion function shown in FIG. 62 may be used. The conversion function shown in FIG. 62 causes the suppression coefficient $\alpha$ continuously to vary in accordance with the change in the filter response r, namely, does not require thresholding.

INDUSTRIAL APPLICABILITY

An embodiment of the present invention provides a multiple primary color display device capable of displaying an image having a resolution equivalent to, or higher than, that of an image provided by a three primary color display device without reducing the size of sub pixels as compared with the three primary color display device. According to the present invention, when display is provided by use of a plurality of virtual pixels in order to raise the resolution, generation of a false color, which would otherwise be caused when the display is provided in a particular manner, can be suppressed. A multiple primary color display device according to the present invention can provide high quality display, and therefore is preferably used for various electronic devices including liquid crystal TVs.

REFERENCE SIGNS LIST

10 Multiple primary color display device
20 Signal conversion circuit
21 Low range multiple primary color signal generation section
21a Low pass filter (low range component extraction section)
21b Multiple primary color conversion section
22 High range luminance signal generation section
22a Luminance conversion section
22b High pass filter (high range component extraction section)
23 False color suppression processing section
23a Detection section
23b Weight selection section
24 Rendering processing section
25 $\gamma$ correction section
26 Inverse $\gamma$ correction section
100 Liquid crystal display device (multiple primary color display device)
P Pixel
SP1-SP6 Sub pixel
R Red sub pixel
G Green sub pixel
B Blue sub pixel
C Cyan sub pixel
M Magenta sub pixel
Ye Yellow sub pixel
VP1 First virtual pixel
VP2 Second virtual pixel
VP3 Third virtual pixel

The invention claimed is:

1. A multiple primary color display device, comprising a plurality of pixels located in a matrix including a plurality of rows and a plurality of columns, the plurality of pixels being each formed of a plurality of sub pixels including at least four sub pixel for displaying different primary colors from one another, wherein:
the plurality of sub pixels which form each of the pixels are sorted into n number of virtual pixels (n is an integer of 2 or greater), each of which is formed of two or more sub pixels, and the n number of virtual pixels are each used as a minimum color display unit for providing display;
the two or more sub pixels which form each of the n number of virtual pixels include a sub pixel common to another of the n number of virtual pixels; and
when a line having a width corresponding to the n number of virtual pixels is displayed, two sub pixels which are located at both of two ends, in a width direction, of the line and which display a certain identical primary color to each other have a luminance lower than the luminance that the two sub pixels originally have.

2. The multiple primary color display device of claim 1, further comprising a signal conversion circuit that converts an input image signal corresponding to three primary colors into a multiple primary color image signal corresponding to four or more primary colors.

3. The multiple primary color display device of claim 2, wherein the signal conversion circuit includes a false color suppression processing section that performs a process for decreasing the luminance of the two sub pixels from the luminance that the two sub pixels originally have.

4. The multiple primary color display device of claim 3, wherein the false color suppression processing section includes:
a detection section that detects that the line having a width corresponding to the n number of virtual pixels is to be displayed; and
a weight selection section that selects a weight for each of the primary colors in each of the n number of virtual pixels in accordance with a detection result provided by the detection section.

5. The multiple primary color display device of claim 4, wherein when the detection section detects that the line having a width corresponding to the n number of virtual pixels is to be displayed, the weight selection section performs the selection such that the certain primary color displayed by the two sub pixels has a weight smaller than the weight when the detection section does not so detect.

6. The multiple primary color display device of claim 2, wherein the signal conversion circuit includes:
a low range multiple primary color signal generation section that generates, based on the input image signal, a low range multiple primary color signal obtained as a result of a low range component of the input image signal being multiple-primary-colored;

a high range luminance signal generation section that generates, based on the input image signal, a high range luminance signal obtained as a result of a luminance of a high range component of the input image signal being converted; and a rendering processing section that performs a rendering process on the n number of virtual pixels based on the low range multiple primary color signal generated by the low range multiple primary color signal generation section and the high range luminance signal generated by the high range luminance signal generation section.

7. The multiple primary color display device of claim 6, wherein the low range multiple primary color signal generation section includes:

a low range component extraction section that extracts a low range component from the input image signal; and a multiple primary color conversion section that performs multiple primary coloring on the low range component of the input image signal that is extracted by the low range component extraction section.

8. The multiple primary color display device of claim 6, wherein the high range luminance signal generation section includes:

a luminance conversion section that converts a luminance of the input image signal to generate a luminance signal; and a high range component extraction section that extracts a high range component of the luminance signal generated by the luminance conversion section as a high range luminance signal.

9. The multiple primary color display device of claim 1, further comprising a multiple primary color display panel including the plurality of sub pixels in each of the plurality of pixels.

10. The multiple primary color display device of claim 1, wherein:

the plurality of rows are generally parallel to a horizontal direction of a display plane;

the plurality of sub pixels are arrayed in one row by a plurality of columns in each of the plurality of pixels; and the line extends in a column direction.

11. The multiple primary color display device of claim 1, wherein the plurality of sub pixels include a red sub pixel for displaying red, a green sub pixel for displaying green, and a blue sub pixel for displaying blue.

12. The multiple primary color display device of claim 11, wherein the plurality of sub pixels include at least one of a cyan sub pixel for displaying cyan, a magenta sub pixel for displaying magenta, a yellow sub pixel for displaying yellow, and a white sub pixel for displaying white.

13. The multiple primary color display device of claim 11, wherein the plurality of sub pixels include another red sub pixel for displaying red.

14. The multiple primary color display device of claim 1, which is a liquid crystal display device.

* * * * *